(12) United States Patent
Hall et al.

(10) Patent No.: US 10,997,388 B2
(45) Date of Patent: May 4, 2021

(54) DARKFIELD CONTAMINATION DETECTION

(71) Applicant: InvenSense, Inc., San Jose, CA (US)

(72) Inventors: Daniela Hall, Eybens (FR); Bruno Flament, Saint Julien de Ratz (FR); Jonathan Baudot, Grenoble (FR); Etienne DeForas, Saint Nazaire les Eymes (FR); Harihar Narasimha-Iyer, Livermore, CA (US)

(73) Assignee: InvenSense, Inc., San Jose, CA (US)

( * ) Notice: Subject to any disclaimer, the term of this patent is extended or adjusted under 35 U.S.C. 154(b) by 98 days.

(21) Appl. No.: 16/270,480

(22) Filed: Feb. 7, 2019

(65) Prior Publication Data

US 2019/0188441 A1   Jun. 20, 2019

Related U.S. Application Data

(63) Continuation-in-part of application No. 16/206,527, filed on Nov. 30, 2018.

(60) Provisional application No. 62/593,848, filed on Dec. 1, 2017, provisional application No. 62/682,065, filed on
(Continued)

(51) Int. Cl.
| | | |
|---|---|---|
| *G06K 9/00* | (2006.01) | |
| *G06T 7/00* | (2017.01) | |
| *G06K 9/03* | (2006.01) | |

(52) U.S. Cl.
CPC ....... *G06K 9/0002* (2013.01); *G06K 9/00087* (2013.01); *G06K 9/036* (2013.01); *G06T 7/0002* (2013.01); *G06T 2207/20221* (2013.01); *G06T 2207/30168* (2013.01)

(58) Field of Classification Search
CPC ............ G06K 9/0002; G06K 9/00006; G06K 9/00093; G06K 9/036; G06K 9/00087; G06T 7/0002; G06T 2207/20221; G06T 2207/30168
See application file for complete search history.

(56) References Cited

U.S. PATENT DOCUMENTS

| | | | |
|---|---|---|---|
| 5,575,286 A | 11/1996 | Weng et al. | |
| 5,684,243 A | 11/1997 | Gururaja et al. | |
| 5,808,967 A | 9/1998 | Yu et al. | |

(Continued)

FOREIGN PATENT DOCUMENTS

| | | | |
|---|---|---|---|
| CN | 1826631 A | 8/2006 | |
| CN | 102159334 A | 8/2011 | |

(Continued)

OTHER PUBLICATIONS

Tang, et al., "Pulse-Echo Ultrasonic Fingerprint Sensor on a Chip", IEEE Transducers, Anchorage, Alaska, USA, Jun. 21-25, 2015, pp. 674-677.

(Continued)

*Primary Examiner* — Chuong A Ngo

(57) ABSTRACT

In a method for evaluating a darkfield image for contamination, it is determined whether an object is interacting with a fingerprint sensor. Provided an object is not interacting with the fingerprint sensor, a darkfield candidate image is captured at a fingerprint sensor. The darkfield candidate image is evaluated for contamination. Based on the evaluating, it is determined whether the darkfield candidate image includes contamination.

22 Claims, 24 Drawing Sheets

Related U.S. Application Data on Jun. 7, 2018, provisional application No. 62/724,200, filed on Aug. 29, 2018.

(56) References Cited

U.S. PATENT DOCUMENTS

| | | |
|---|---|---|
| 5,867,302 A | 2/1999 | Fleming |
| 5,911,692 A | 6/1999 | Hussain et al. |
| 6,071,239 A | 6/2000 | Cribbs et al. |
| 6,104,673 A | 8/2000 | Cole et al. |
| 6,289,112 B1 | 9/2001 | Jain et al. |
| 6,350,652 B1 | 2/2002 | Libera et al. |
| 6,428,477 B1 | 8/2002 | Mason |
| 6,500,120 B1 | 12/2002 | Anthony |
| 6,676,602 B1 | 1/2004 | Barnes et al. |
| 6,736,779 B1 | 5/2004 | Sano et al. |
| 7,067,962 B2 | 6/2006 | Scott |
| 7,109,642 B2 | 9/2006 | Scott |
| 7,243,547 B2 | 7/2007 | Cobianu et al. |
| 7,400,750 B2 | 7/2008 | Nam |
| 7,433,034 B1 * | 10/2008 | Huang .............. G01N 21/94 356/237.5 |
| 7,459,836 B2 | 12/2008 | Scott |
| 7,471,034 B2 | 12/2008 | Schlote-Holubek et al. |
| 7,489,066 B2 | 2/2009 | Scott et al. |
| 7,634,117 B2 | 12/2009 | Cho |
| 7,739,912 B2 | 6/2010 | Schneider et al. |
| 8,018,010 B2 | 9/2011 | Tigli et al. |
| 8,139,827 B2 | 3/2012 | Schneider et al. |
| 8,255,698 B2 | 8/2012 | Li et al. |
| 8,311,514 B2 | 11/2012 | Bandyopadhyay et al. |
| 8,335,356 B2 | 12/2012 | Schmitt |
| 8,433,110 B2 | 4/2013 | Kropp et al. |
| 8,508,103 B2 | 8/2013 | Schmitt et al. |
| 8,515,135 B2 | 8/2013 | Clarke et al. |
| 8,666,126 B2 | 3/2014 | Lee et al. |
| 8,703,040 B2 | 4/2014 | Liufu et al. |
| 8,723,399 B2 | 5/2014 | Sammoura et al. |
| 8,805,031 B2 | 8/2014 | Schmitt |
| 9,056,082 B2 | 6/2015 | Liautaud et al. |
| 9,070,861 B2 | 6/2015 | Bibl et al. |
| 9,224,030 B2 | 12/2015 | Du et al. |
| 9,245,165 B2 | 1/2016 | Slaby et al. |
| 9,424,456 B1 | 8/2016 | Koteshwara et al. |
| 9,572,549 B2 | 2/2017 | Belevich et al. |
| 9,582,102 B2 | 2/2017 | Setlak |
| 9,607,203 B1 | 3/2017 | Yazdandoost et al. |
| 9,607,206 B2 | 3/2017 | Schmitt et al. |
| 9,613,246 B1 | 4/2017 | Gozzini et al. |
| 9,665,763 B2 | 5/2017 | Du et al. |
| 9,747,488 B2 | 8/2017 | Yazdandoost et al. |
| 9,785,819 B1 | 10/2017 | Oreifej |
| 9,815,087 B2 | 11/2017 | Ganti et al. |
| 9,817,108 B2 | 11/2017 | Kuo et al. |
| 9,818,020 B2 | 11/2017 | Schuckers et al. |
| 9,881,195 B2 | 1/2018 | Lee et al. |
| 9,881,198 B2 | 1/2018 | Lee et al. |
| 9,898,640 B2 | 2/2018 | Ghavanini |
| 9,904,836 B2 | 2/2018 | Yeke Yazdandoost et al. |
| 9,909,225 B2 | 3/2018 | Lee et al. |
| 9,922,235 B2 | 3/2018 | Cho et al. |
| 9,934,371 B2 | 4/2018 | Hong et al. |
| 9,939,972 B2 | 4/2018 | Shepelev et al. |
| 9,953,205 B1 | 4/2018 | Rasmussen et al. |
| 9,959,444 B2 | 5/2018 | Young et al. |
| 9,967,100 B2 | 5/2018 | Hong et al. |
| 9,983,656 B2 | 5/2018 | Merrell et al. |
| 9,984,271 B1 | 5/2018 | King et al. |
| 10,275,638 B1 | 4/2019 | Yousefpor et al. |
| 10,315,222 B2 | 6/2019 | Salvia et al. |
| 10,461,124 B2 | 10/2019 | Berger et al. |
| 10,478,858 B2 | 11/2019 | Lasiter et al. |
| 10,539,539 B2 | 1/2020 | Garlepp et al. |
| 10,600,403 B2 | 3/2020 | Garlepp et al. |
| 10,656,255 B2 | 5/2020 | Ng et al. |
| 10,670,716 B2 | 6/2020 | Apte et al. |
| 10,706,835 B2 | 7/2020 | Garlepp et al. |
| 10,755,067 B2 | 8/2020 | De Foras et al. |
| 2002/0135273 A1 | 9/2002 | Mauchamp et al. |
| 2003/0013955 A1 | 1/2003 | Poland |
| 2004/0085858 A1 | 5/2004 | Khuri-Yakub et al. |
| 2004/0122316 A1 | 6/2004 | Satoh et al. |
| 2004/0174773 A1 | 9/2004 | Thomenius et al. |
| 2005/0023937 A1 | 2/2005 | Sashida et al. |
| 2005/0057284 A1 | 3/2005 | Wodnicki |
| 2005/0100200 A1 | 5/2005 | Abiko et al. |
| 2005/0110071 A1 | 5/2005 | Ema et al. |
| 2005/0146240 A1 | 7/2005 | Smith et al. |
| 2005/0148132 A1 | 7/2005 | Wodnicki et al. |
| 2005/0162040 A1 | 7/2005 | Robert |
| 2006/0052697 A1 | 3/2006 | Hossack et al. |
| 2006/0079777 A1 | 4/2006 | Karasawa |
| 2007/0046396 A1 | 3/2007 | Huang |
| 2007/0047785 A1 | 3/2007 | Jang et al. |
| 2007/0073135 A1 | 3/2007 | Lee et al. |
| 2007/0202252 A1 | 8/2007 | Sasaki |
| 2007/0215964 A1 | 9/2007 | Khuri-Yakub et al. |
| 2007/0230754 A1 | 10/2007 | Jain et al. |
| 2008/0125660 A1 | 5/2008 | Yao et al. |
| 2008/0150032 A1 | 6/2008 | Tanaka |
| 2008/0194053 A1 | 8/2008 | Huang |
| 2008/0240523 A1 | 10/2008 | Benkley et al. |
| 2009/0005684 A1 | 1/2009 | Kristoffersen et al. |
| 2009/0182237 A1 | 7/2009 | Angelsen et al. |
| 2009/0274343 A1 | 11/2009 | Clarke |
| 2009/0303838 A1 | 12/2009 | Svet |
| 2010/0030076 A1 | 2/2010 | Vortman et al. |
| 2010/0046810 A1 | 2/2010 | Yamada |
| 2010/0113952 A1 | 5/2010 | Raguin et al. |
| 2010/0168583 A1 | 7/2010 | Dausch et al. |
| 2010/0195851 A1 | 8/2010 | Buccafusca |
| 2010/0201222 A1 | 8/2010 | Adachi et al. |
| 2010/0202254 A1 | 8/2010 | Roest et al. |
| 2010/0239751 A1 | 9/2010 | Regniere |
| 2010/0251824 A1 | 10/2010 | Schneider et al. |
| 2010/0256498 A1 | 10/2010 | Tanaka |
| 2010/0278008 A1 | 11/2010 | Ammar |
| 2011/0285244 A1 | 11/2011 | Lewis et al. |
| 2011/0291207 A1 | 12/2011 | Martin et al. |
| 2012/0016604 A1 | 1/2012 | Irving et al. |
| 2012/0092026 A1 | 4/2012 | Liautaud et al. |
| 2012/0095347 A1 | 4/2012 | Adam et al. |
| 2012/0147698 A1 | 6/2012 | Wong et al. |
| 2012/0232396 A1 | 9/2012 | Tanabe |
| 2012/0238876 A1 | 9/2012 | Tanabe et al. |
| 2012/0279865 A1 | 11/2012 | Regniere et al. |
| 2012/0288641 A1 | 11/2012 | Diatezua et al. |
| 2012/0300988 A1 | 11/2012 | Ivanov et al. |
| 2013/0051179 A1 | 2/2013 | Hong |
| 2013/0064043 A1 | 3/2013 | Degertekin et al. |
| 2013/0127592 A1 | 5/2013 | Fyke et al. |
| 2013/0133428 A1 | 5/2013 | Lee et al. |
| 2013/0201134 A1 | 8/2013 | Schneider et al. |
| 2013/0271628 A1 | 10/2013 | Ku et al. |
| 2013/0294202 A1 | 11/2013 | Hajati |
| 2014/0060196 A1 | 3/2014 | Falter et al. |
| 2014/0117812 A1 | 5/2014 | Hajati |
| 2014/0176332 A1 | 6/2014 | Alameh et al. |
| 2014/0208853 A1 | 7/2014 | Onishi et al. |
| 2014/0219521 A1 | 8/2014 | Schmitt et al. |
| 2014/0232241 A1 | 8/2014 | Hajati |
| 2014/0265721 A1 | 9/2014 | Robinson et al. |
| 2014/0313007 A1 | 10/2014 | Harding |
| 2014/0355387 A1 | 12/2014 | Kitchens et al. |
| 2015/0036065 A1 | 2/2015 | Yousefpor et al. |
| 2015/0049590 A1 | 2/2015 | Rowe et al. |
| 2015/0087991 A1 | 3/2015 | Chen et al. |
| 2015/0097468 A1 | 4/2015 | Hajati et al. |
| 2015/0145374 A1 | 5/2015 | Xu et al. |
| 2015/0164473 A1 | 6/2015 | Kim et al. |
| 2015/0165479 A1 | 6/2015 | Lasiter et al. |
| 2015/0169136 A1 | 6/2015 | Ganti et al. |
| 2015/0189136 A1 | 7/2015 | Chung et al. |
| 2015/0198699 A1 | 7/2015 | Kuo et al. |
| 2015/0206738 A1 | 7/2015 | Rastegar |

(56) References Cited

U.S. PATENT DOCUMENTS

| | | |
|---|---|---|
| 2015/0213180 A1 | 7/2015 | Herberholz |
| 2015/0220767 A1 | 8/2015 | Yoon et al. |
| 2015/0261261 A1 | 9/2015 | Bhagavatula et al. |
| 2015/0286312 A1 | 10/2015 | Kang et al. |
| 2015/0301653 A1 | 10/2015 | Urushi |
| 2015/0345987 A1 | 12/2015 | Hajati |
| 2015/0371398 A1 | 12/2015 | Qiao et al. |
| 2016/0051225 A1 | 2/2016 | Kim et al. |
| 2016/0063294 A1 | 3/2016 | Du et al. |
| 2016/0070967 A1 | 3/2016 | Du et al. |
| 2016/0086010 A1 | 3/2016 | Merrell et al. |
| 2016/0092716 A1 | 3/2016 | Yazdandoost et al. |
| 2016/0100822 A1 | 4/2016 | Kim et al. |
| 2016/0107194 A1 | 4/2016 | Panchawagh et al. |
| 2016/0180142 A1 | 6/2016 | Riddle et al. |
| 2016/0326477 A1 | 11/2016 | Fernandez-Alcon et al. |
| 2016/0350573 A1 | 12/2016 | Kitchens et al. |
| 2016/0358003 A1 | 12/2016 | Shen et al. |
| 2017/0004352 A1 | 1/2017 | Jonsson et al. |
| 2017/0330552 A1 | 1/2017 | Garlepp et al. |
| 2017/0032485 A1 | 2/2017 | Vemury |
| 2017/0075700 A1 | 3/2017 | Abudi et al. |
| 2017/0100091 A1 | 4/2017 | Eigil et al. |
| 2017/0110504 A1 | 4/2017 | Panchawagh et al. |
| 2017/0119343 A1 | 5/2017 | Pintoffl |
| 2017/0124374 A1 | 5/2017 | Rowe et al. |
| 2017/0168543 A1 | 6/2017 | Dai et al. |
| 2017/0185821 A1 | 6/2017 | Chen et al. |
| 2017/0194934 A1 | 7/2017 | Shelton et al. |
| 2017/0219536 A1 | 8/2017 | Koch et al. |
| 2017/0231534 A1 | 8/2017 | Agassy et al. |
| 2017/0255338 A1 | 9/2017 | Medina et al. |
| 2017/0293791 A1 | 10/2017 | Mainguet et al. |
| 2017/0316243 A1 | 11/2017 | Ghavanini |
| 2017/0316248 A1* | 11/2017 | He .................. G01L 1/142 |
| 2017/0322290 A1 | 11/2017 | Ng |
| 2017/0322291 A1 | 11/2017 | Salvia et al. |
| 2017/0322292 A1 | 11/2017 | Salvia et al. |
| 2017/0322305 A1 | 11/2017 | Apte et al. |
| 2017/0323133 A1 | 11/2017 | Tsai |
| 2017/0325081 A1 | 11/2017 | Chrisikos et al. |
| 2017/0326590 A1 | 11/2017 | Daneman |
| 2017/0326591 A1 | 11/2017 | Apte et al. |
| 2017/0326593 A1 | 11/2017 | Garlepp et al. |
| 2017/0326594 A1 | 11/2017 | Berger et al. |
| 2017/0328866 A1 | 11/2017 | Apte et al. |
| 2017/0328870 A1 | 11/2017 | Garlepp et al. |
| 2017/0330012 A1 | 11/2017 | Salvia et al. |
| 2017/0330553 A1 | 11/2017 | Garlepp et al. |
| 2017/0357839 A1 | 12/2017 | Yazdandoost et al. |
| 2018/0025202 A1 | 1/2018 | Ryshtun et al. |
| 2018/0101711 A1 | 4/2018 | D'Souza et al. |
| 2018/0129857 A1 | 5/2018 | Bonev |
| 2018/0206820 A1 | 7/2018 | Anand et al. |
| 2018/0229267 A1 | 8/2018 | Ono et al. |
| 2018/0349663 A1 | 12/2018 | Garlepp et al. |
| 2018/0357457 A1 | 12/2018 | Rasmussen et al. |
| 2018/0369866 A1 | 12/2018 | Sammoura et al. |
| 2019/0005300 A1 | 1/2019 | Garlepp et al. |
| 2019/0012673 A1 | 1/2019 | Chakraborty et al. |
| 2019/0018123 A1 | 1/2019 | Narasimha-Iyer et al. |
| 2019/0087632 A1 | 3/2019 | Raguin et al. |
| 2019/0102046 A1 | 4/2019 | Miranto et al. |
| 2019/0171858 A1 | 6/2019 | Ataya et al. |
| 2019/0188441 A1 | 6/2019 | Hall et al. |
| 2019/0188442 A1 | 6/2019 | Flament et al. |
| 2019/0370518 A1 | 12/2019 | Maor et al. |
| 2020/0030850 A1 | 1/2020 | Apte et al. |
| 2020/0050816 A1 | 2/2020 | Tsai |
| 2020/0050817 A1 | 2/2020 | Salvia et al. |
| 2020/0050820 A1 | 2/2020 | Iatsun et al. |
| 2020/0050828 A1 | 2/2020 | Li et al. |
| 2020/0074135 A1 | 3/2020 | Garlepp et al. |
| 2020/0158694 A1 | 5/2020 | Garlepp et al. |
| 2020/0210666 A1 | 7/2020 | Flament |
| 2020/0285882 A1 | 9/2020 | Skovgaard Christensen et al. |

FOREIGN PATENT DOCUMENTS

| | | |
|---|---|---|
| CN | 105264542 A | 1/2016 |
| CN | 109255323 A | 1/2019 |
| EP | 1214909 A1 | 6/2002 |
| EP | 2884301 A1 | 6/2015 |
| EP | 3086261 A2 | 10/2016 |
| JP | 2011040467 A | 2/2011 |
| WO | 2009096576 A2 | 8/2009 |
| WO | 2009137106 A2 | 11/2009 |
| WO | 2014035564 A1 | 3/2014 |
| WO | 2015009635 A1 | 1/2015 |
| WO | 2015112453 A1 | 7/2015 |
| WO | 2015120132 A1 | 8/2015 |
| WO | 2015131083 A1 | 9/2015 |
| WO | 2015134816 A1 | 9/2015 |
| WO | 2015183945 A1 | 12/2015 |
| WO | 2016007250 A1 | 1/2016 |
| WO | 2016011172 A1 | 1/2016 |
| WO | 2016040333 A2 | 3/2016 |
| WO | 2016061406 A1 | 4/2016 |
| WO | 2016061410 A1 | 4/2016 |
| WO | 2017003848 A1 | 1/2017 |
| WO | 2017053877 A2 | 3/2017 |
| WO | 2017192895 A1 | 11/2017 |
| WO | 2017196678 A1 | 11/2017 |
| WO | 2017196682 A1 | 11/2017 |
| WO | 2017192903 A3 | 12/2017 |

OTHER PUBLICATIONS

ISA/EP, International Search Report and Written Opinion for International Application No. PCT/US2017/031120, 12 pages, dated Aug. 29, 2017 (Aug. 29, 2017).

ISA/EP, International Search Report and Written Opinion for International Application No. PCT/US2017/031120, 13 pages, dated Sep. 1, 2017 (Sep. 1, 2017).

ISA/EP, International Search Report and Written Opinion for International Application No. PCT/US2017/031134, 12 pages, dated Aug. 30, 2017 (Aug. 30, 2017).

ISA/EP, International Search Report and Written Opinion for International Application No. PCT/US2017/031140, 18 pages, dated Nov. 2, 2017 (Nov. 2, 2017).

ISA/EP, International Search Report and Written Opinion for International Application No. PCT/US2017/031421 13 pages, dated Jun. 21, 2017 (Jun. 21, 2017).

ISA/EP, International Search Report and Written Opinion for International Application No. PCT/US2017/031426 13 pages, dated Jun. 22, 2017 (Jun. 22, 2017).

ISA/EP, International Search Report and Written Opinion for International Application No. PCT/US2017/031431, 14 pages, dated Aug. 1, 2017 (Aug. 1, 2017).

ISA/EP, International Search Report and Written Opinion for International Application No. PCT/US2017/031434, 13 pages, dated Jun. 26, 2017 (Jun. 26, 2017).

ISA/EP, International Search Report and Written Opinion for International Application No. PCT/US2017/031439, 10 pages, dated Jun. 20, 2017 (Jun. 20, 2017).

ISA/EP, International Search Report and Written Opinion for International Application No. PCT/US2017/031824, 18 pages, dated Sep. 22, 2017 (Sep. 22, 2017).

ISA/EP, International Search Report and Written Opinion for International Application No. PCT/US2017/031827, 16 pages, dated Aug. 1, 2017 (Aug. 1, 2017).

ISA/EP, International Search Report and Written Opinion for International Application No. PCT/US2017/031831, 12 pages, dated Jul. 21, 2017 (Jul. 21, 2017).

ISA/EP, International Search Report for International Application No. PCT/US2017/031826, 16 pages, dated Feb. 27, 2018 (Feb. 27, 2018).

(56) References Cited

OTHER PUBLICATIONS

ISA/EP, Partial International Search Report for International Application No. PCT/US2017/031140, 13 pages, dated Aug. 29, 2017 (Aug. 29, 2017).

ISA/EP, Partial International Search Report for International Application No. PCT/US2017/031823, 12 pages, dated Nov. 30, 2017 (Nov. 30, 2017).

Dausch, et al., "Theory and Operation of 2-D Array Piezoelectric Micromachined Ultrasound Transducers", IEEE Transactions on Ultrasonics, and Frequency Control, vol. 55, No. 11;, Nov. 2008, 2484-2492.

Hopcroft, et al., "Temperature Compensation of a MEMS Resonator Using Quality Factor as a Thermometer", Retrieved from Internet: http://micromachine.stanford.edu/~amanu/linked/MAH_MEMS2006.pdf, 2006, 222-225.

Hopcroft, et al., "Using the temperature dependence of resonator quality factor as a thermometer", Applied Physics Letters 91. Retrieved from Internet: http://micromachine.stanford.edu/~hopcroft/Publications/Hopcroft_QT_ApplPhysLett_91_013505.pdf, 2007, 013505-1-031505-3.

Lee, et al., "Low jitter and temperature stable MEMS oscillators", Frequency Control Symposium (FCS), 2012 IEEE International, May 2012, 1-5.

Li, et al., "Capacitive micromachined ultrasonic transducer for ultra-low pressure measurement: Theoretical study", AIP Advances 5.12. Retrieved from Internet: http://scitation.aip.org/content/aip/journal/adva/5/12/10.1063/1.4939217, 2015, 127231.

Qiu, et al., "Piezoelectric Micromachined Ultrasound Transducer (PMUT) Arrays for Integrated Sensing, Actuation and Imaging", Sensors 15, doi:10.3390/s150408020, Apr. 3, 2015, 8020-8041.

Rozen, et al., "Air-Coupled Aluminum Nitride Piezoelectric Micromachined Ultrasonic Transducers at 0.3 MHz to 0.9 MHz", 2015 28th IEEE International Conference on Micro Electro Mechanical Systems (MEMS), IEEE, Jan. 18, 2015, 921-924.

Savoia, et al., "Design and Fabrication of a cMUT Probe for Ultrasound Imaging of Fingerprints", 2010 IEEE International Ultrasonics Symposium Proceedings, Oct. 2010, 1877-1880.

Shen, et al., "Anisotropic Complementary Acoustic Metamaterial for Canceling out Aberrating Layers", American Physical Society, Physical Review X 4.4: 041033., Nov. 19, 2014, 041033-1-041033-7.

Thakar, et al., "Multi-resonator approach to eliminating the temperature dependence of silicon-based timing references", Hilton Head'14. Retrieved from the Internet: http://blog.narotama.ac.id/wp-content/uploads/2014/12/Multi-resonator-approach-to-eliminating-the-temperature-dependance-of-silicon-based-timing-references.pdf, 2014, 415-418.

ISA/EP, Partial International Search Report for International Application No. PCT/US2019/034032, 8 pages, dated Sep. 12, 2019, 8.

ISA/EP, International Search Report and Written Opinion for International Application # PCT/US2018/063431, pp. 1-15, dated Feb. 5, 2019.

ISA/EP, International Search Report and Written Opinion for International Application # PCT/US2019/015020, pp. 1-23, dated Jul. 1, 2019.

ISA/EP, International Search Report and Written Opinion for International Application # PCT/US2019/023440, pp. 1-10, dated Jun. 4, 2019.

ISA/EP, International Search Report and Written Opinion for International Application No. PCT/US2017/031120, 12 pages, Aug. 29, 2017.

ISA/EP, International Search Report and Written Opinion for International Application No. PCT/US2017/031434, 13 pages, dated Jun. 26, 2017.

ISA/EP, International Search Report and Written Opinion for International Application No. PCT/US2018/037364, 10 pages, dated Sep. 3, 2018.

ISA/EP, International Search Report and Written Opinion for International Application No. PCT/US2020/039208, 10 pages, dated Oct. 9, 2020.

ISA/EP, International Search Report and Written Opinion for International Application No. PCT/US2020/039452, 11 pages, dated Sep. 9, 2020.

ISA/EP, Partial Search Report and Provisional Opinion for International Application No. PCT/US2020/033854, 10 pages, dated Sep. 8, 2020.

ISA/EP, Partial Search Report and Provisional Opinion for International Application No. PCT/US2020/042427, 13 pages, dated Oct. 26, 2020.

"Moving Average Filters", Waybackmachine XP05547422, Retrieved from the Internet: URL:https://web.archive.org/web/20170809081353/https//www.analog.com/media/en/technical-documentation/dsp-book/dsp_book_Ch15.pdf—[retrieved on Jan. 24, 2019], Aug. 9, 2017, 1-8.

Office Action for CN App No. 201780029016.7 dated Mar. 24, 2020, 7 pages.

Office Action for CN App No. 201780029016.7 dated Sep. 25, 2020, 7 pages.

"Receiver Thermal Noise Threshold", Fisher Telecommunication Services, Satellite Communications. Retrieved from the Internet: URL:https://web.archive.org/web/20171027075705/http//www.fishercom.xyz:80/satellite-communications/receiver-thermal-noise-threshold.html, Oct. 27, 2017, 3.

"Sleep Mode", Wikipedia, Retrieved from the Internet: URL:https://web.archive.org/web/20170908153323/https://en.wikipedia.org/wiki/Sleep_mode [retrieved on Jan. 25, 2019], Sep. 8, 2017, 1-3.

"TMS320C5515 Fingerprint Development Kit (FDK) Hardware Guide", Texas Instruments, Literature No. SPRUFX3, XP055547651, Apr. 2010, 1-26.

"ZTE V7 MAX. 5,5" smartphone on MediaTeck Helio P10 cpu; Published on Apr. 20, 2016; https://www.youtube.com/watch?v=ncNCbpkGQzU (Year 2016).

Cappelli, et al., "Fingerprint Image Reconstruction from Standard Templates", IEEE Transactions on Pattern Analysis and Machine Intelligence, IEEE Computer Society, vol. 29, No. 9, Sep. 2007, 1489-1503.

Feng, et al., "Fingerprint Reconstruction: From Minutiae to Phase", IEEE Transactions on Pattern Analysis and Machine Intelligence, IEEE Computer Society, Vol. 33, No. 2, Feb. 2011, 209-223.

Jiang, et al., "Ultrasonic Fingerprint Sensor with Transmit Beamforming Based on a PMUT Array Bonded to CMOS Circuitry", IEEE Transactions on Ultrasonics Ferroelectrics and Frequency Control, Jan. 1, 2017, 1-9.

Kumar, et al., "Towards Contactless, Low-Cost and Accurate 3D Fingerprint Identification", IEEE Transactions on Pattern Analysis and Machine Intelligence, IEEE Computer Society, vol. 37, No. 3, Mar. 2015, 681-696.

Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.

Papageorgiou, et al., "Self-Calibration of Ultrasonic Transducers in an Intelligent Data Acquisition System", International Scientific Journal of Computing, 2003, vol. 2, Issue 2 Retrieved Online: URL: https://scholar.google.com/scholar?q=self-calibration+of+ultrasonic+transducers+in+an+intelligent+data+acquisition+system&hl=en&as_sdt=0&as_vis=1&oi=scholart, 2003, 9-15.

Ross, et al., "From Template to Image: Reconstructing Fingerprints from Minutiae Points", IEEE Transactions on Pattern Analysis and Machine Intelligence, IEEE Computer Society, vol. 29, No. 4, Apr. 2007, 544-560.

Tang, et al., "11.2 3D Ultrasonic Fingerprint Sensor-on-a-Chip", 2016 IEEE International Solid-State Circuits Conference, IEEE, Jan. 31, 2016, 202-203.

Zhou, et al., "Partial Fingerprint Reconstruction with Improved Smooth Extension", Network and System Security, Springer Berlin Heidelberg, Jun. 3, 2013, 756-762.

ISA/EP, International Search Report and Written Opinion for International Application No. PCT/US2020/033854, 16 pages, dated Nov. 3, 2020.

(56) References Cited

OTHER PUBLICATIONS

ISA/EP, International Search Report and Written Opinion for International Application No. PCT/US2020/042427, 18 pages, dated Dec. 14, 2020.

* cited by examiner

DARKFIELD CONTAMINATION DETECTION

RELATED APPLICATIONS

This application is a continuation-in-part application of and claims priority to and benefit of co-pending U.S. patent application Ser. No. 16/206,527, filed on Nov. 30, 2018, entitled "DARKFIELD TRACKING," by Ataya et al., and assigned to the assignee of the present application, which is incorporated herein by reference in its entirety.

The application with application Ser. No. 16/206,527 claims priority to and the benefit of then U.S. Provisional Patent Application 62/593,848, filed on Dec. 1, 2017, entitled "DARKFIELD TRACKER," by Abbas Ataya, and assigned to the assignee of the present application, which is incorporated herein by reference in its entirety.

This application also claims priority to and the benefit of U.S. Provisional Patent Application 62/682,065, filed on Jun. 7, 2018, entitled "FINGERPRINT BACKGROUND RECONSTRUCTION BASED ON TOF," by Akhbari, et al., and assigned to the assignee of the present application, which is incorporated herein by reference in its entirety.

This application also claims priority to and the benefit of U.S. Provisional Patent Application 62/724,200, filed on Aug. 29, 2018, entitled "SYSTEM AND METHOD FOR DETECTING AND PREVENTION DARKFIELD CONTAMINATION," by Daniella Hall, et al., and assigned to the assignee of the present application, which is incorporated herein by reference in its entirety.

BACKGROUND

Fingerprint sensors have become ubiquitous in mobile devices as well as other applications for authenticating a user's identity. They provide a fast and convenient way for the user to unlock a device, provide authentication for payments, etc. Current fingerprint sensors are typically area sensors that obtain a two-dimensional image of the user's finger area presented to the sensor. Different technologies can be used to image the finger such as capacitive, ultrasound, and optical sensing. Once an image is obtained, that image is processed by a matcher to extract features and to compare against stored images to authenticate the user. As such, accuracy of captured images is essential to the performance of image matching for user authentication.

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1A:
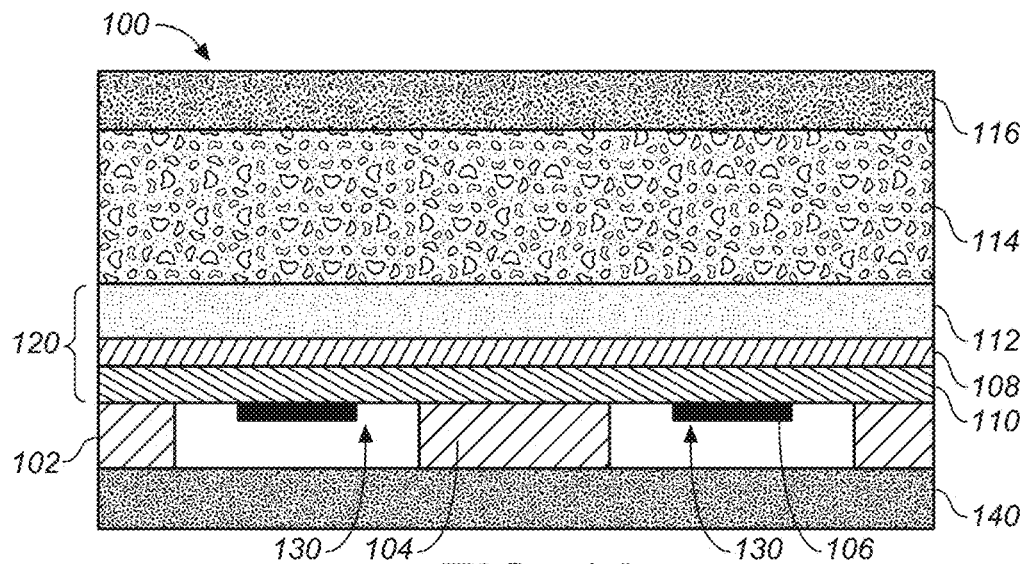
FIG. 1A is a diagram illustrating a piezoelectric micromachined ultrasonic transducer (PMUT) device having a center pinned membrane, according to some embodiments.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "making," "capturing," "updating," "generating," "merging," "storing," "transmitting," "receiving," "comparing," "updating," "correcting," "accessing," "modeling," "retrieving," "extracting," "evaluating," "acquiring," or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example piezoelectric micromachined ultrasonic transducer (PMUT), in accordance with various embodiments. Example sensors including arrays of ultrasonic transducers are then described. Example darkfield capture is then described. Example operations for the darkfield capture are then described.

Embodiments described herein provide a method and device for darkfield capture at a sensor. It is determined whether an object is interacting with the sensor. Provided an object is not interacting with the sensor, a determination is made that a darkfield candidate image can be captured at the sensor. It is determined whether to capture a darkfield candidate image at the sensor based at least in part on the determination that a darkfield candidate image can be captured at the sensor. Responsive to making a determination to capture the darkfield candidate image, the darkfield candidate image is captured at the sensor, wherein the darkfield candidate image is an image absent an object interacting with the sensor. A darkfield estimate is updated with the darkfield candidate image.

Piezoelectric Micromachined Ultrasonic Transducer (PMUT)

Systems and methods disclosed herein, in one or more aspects provide efficient structures for an acoustic transducer (e.g., a piezoelectric actuated transducer or PMUT). One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and devices are shown in block diagram form in order to facilitate describing the embodiments in additional detail.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. In addition, the word "coupled" is used herein to mean direct or indirect electrical or mechanical coupling. In addition, the word "example" is used herein to mean serving as an example, instance, or illustration.

FIG. 1A is a diagram illustrating a PMUT device 100 having a center pinned membrane, according to some embodiments. PMUT device 100 includes an interior pinned membrane 120 positioned over a substrate 140 to define a cavity 130. In one embodiment, membrane 120 is attached both to a surrounding edge support 102 and interior support 104. In one embodiment, edge support 102 is connected to an electric potential. Edge support 102 and interior support 104 may be made of electrically conducting materials, such as and without limitation, aluminum, molybdenum, or titanium. Edge support 102 and interior support 104 may also be made of dielectric materials, such as silicon dioxide, silicon nitride or aluminum oxide that have electrical connections the sides or in vias through edge support 102 or interior support 104, electrically coupling lower electrode 106 to electrical wiring in substrate 140.

In one embodiment, both edge support 102 and interior support 104 are attached to a substrate 140. In various embodiments, substrate 140 may include at least one of, and without limitation, silicon or silicon nitride. It should be appreciated that substrate 140 may include electrical wirings and connection, such as aluminum or copper. In one embodiment, substrate 140 includes a CMOS logic wafer bonded to edge support 102 and interior support 104. In one embodiment, the membrane 120 comprises multiple layers. In an example embodiment, the membrane 120 includes lower electrode 106, piezoelectric layer 110, and upper electrode 108, where lower electrode 106 and upper electrode 108 are coupled to opposing sides of piezoelectric layer 110. As shown, lower electrode 106 is coupled to a lower surface of piezoelectric layer 110 and upper electrode 108 is coupled to an upper surface of piezoelectric layer 110. It should be appreciated that, in various embodiments, PMUT device 100 is a microelectromechanical (MEMS) device.

In one embodiment, membrane 120 also includes a mechanical support layer 112 (e.g., stiffening layer) to mechanically stiffen the layers. In various embodiments, mechanical support layer 112 may include at least one of, and without limitation, silicon, silicon oxide, silicon nitride, aluminum, molybdenum, titanium, etc. In one embodiment, PMUT device 100 also includes an acoustic coupling layer 114 above membrane 120 for supporting transmission of acoustic signals. It should be appreciated that acoustic coupling layer can include air, liquid, gel-like materials, or other materials for supporting transmission of acoustic signals. In one embodiment, PMUT device 100 also includes platen layer 116 above acoustic coupling layer 114 for containing acoustic coupling layer 114 and providing a contact surface for a finger or other sensed object with PMUT device 100. It should be appreciated that, in various embodiments, acoustic coupling layer 114 provides a contact surface, such that platen layer 116 is optional. Moreover, it should be appreciated that acoustic coupling layer 114 and/or platen layer 116 may be included with or used in conjunction with multiple PMUT devices. For example, an array of PMUT devices may be coupled with a single acoustic coupling layer 114 and/or platen layer 116.

Figure 1B:
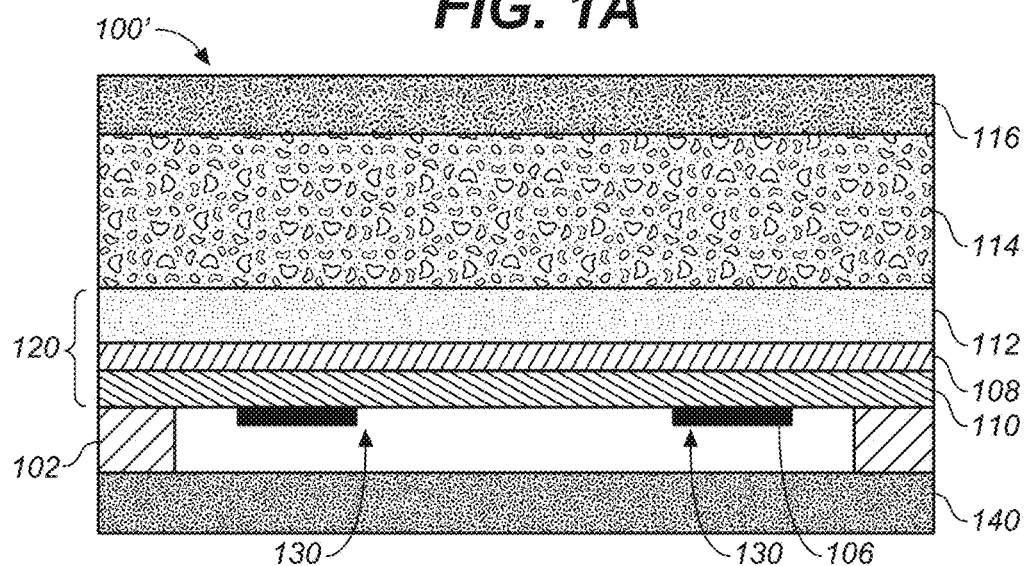
FIG. 1B is a diagram illustrating a PMUT device having an unpinned membrane, according to some embodiments.

FIG. 1B is identical to FIG. 1A in every way, except that the PMUT device 100' of FIG. 1B omits the interior support 104 and thus membrane 120 is not pinned (e.g., is "unpinned"). There may be instances in which an unpinned membrane 120 is desired. However, in other instances, a pinned membrane 120 may be employed.

Figure 2:
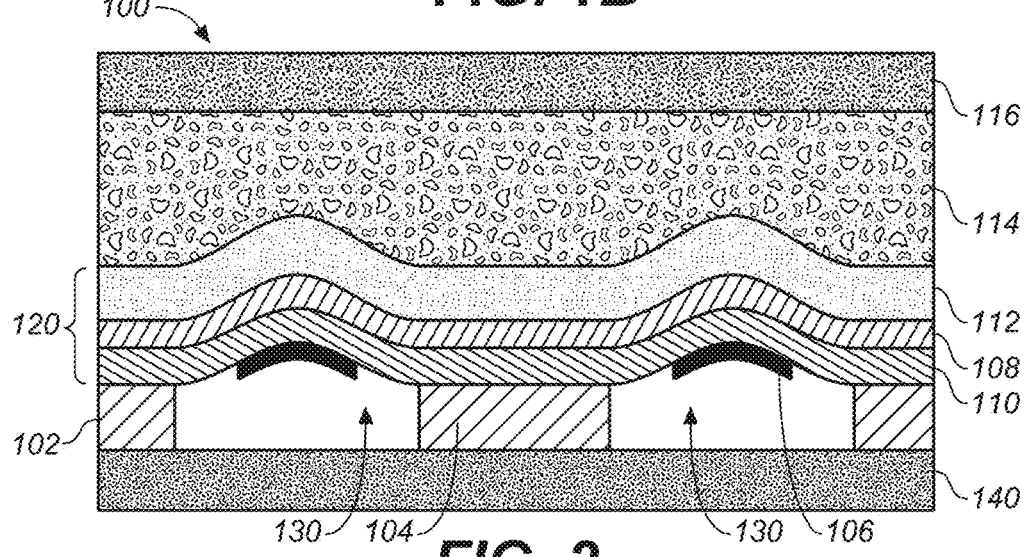
FIG. 2 is a diagram illustrating an example of membrane movement during activation of a PMUT device having a center pinned membrane, according to some embodiments.

FIG. 2 is a diagram illustrating an example of membrane movement during activation of pinned PMUT device 100, according to some embodiments. As illustrated with respect to FIG. 2, in operation, responsive to an object proximate platen layer 116, the electrodes 106 and 108 deliver a high frequency electric charge to the piezoelectric layer 110, causing those portions of the membrane 120 not pinned to the surrounding edge support 102 or interior support 104 to be displaced upward into the acoustic coupling layer 114. This generates a pressure wave that can be used for signal probing of the object. Return echoes can be detected as pressure waves causing movement of the membrane, with compression of the piezoelectric material in the membrane causing an electrical signal proportional to amplitude of the pressure wave.

The described PMUT device 100 can be used with almost any electrical device that converts a pressure wave into mechanical vibrations and/or electrical signals. In one aspect, the PMUT device 100 can comprise an acoustic sensing element (e.g., a piezoelectric element) that generates and senses ultrasonic sound waves. An object in a path of the generated sound waves can create a disturbance (e.g., changes in frequency or phase, reflection signal, echoes, etc.) that can then be sensed. The interference can be analyzed to determine physical parameters such as (but not limited to) distance, density and/or speed of the object. As an example, the PMUT device 100 can be utilized in various applications, such as, but not limited to, fingerprint or physiologic sensors suitable for wireless devices, industrial systems, automotive systems, robotics, telecommunications, security, medical devices, etc. For example, the PMUT device 100 can be part of a sensor array comprising a plurality of ultrasonic transducers deposited on a wafer, along with various logic, control and communication electronics. A sensor array may comprise homogenous or identical PMUT devices 100, or a number of different or heterogonous device structures.

In various embodiments, the PMUT device 100 employs a piezoelectric layer 110, comprised of materials such as, but not limited to, aluminum nitride (AlN), lead zirconate titanate (PZT), quartz, polyvinylidene fluoride (PVDF), and/or zinc oxide, to facilitate both acoustic signal production and sensing. The piezoelectric layer 110 can generate electric charges under mechanical stress and conversely experience a mechanical strain in the presence of an electric field. For example, the piezoelectric layer 110 can sense mechanical vibrations caused by an ultrasonic signal and produce an electrical charge at the frequency (e.g., ultrasonic frequency) of the vibrations. Additionally, the piezoelectric layer 110 can generate an ultrasonic wave by vibrating in an oscillatory fashion that might be at the same frequency (e.g., ultrasonic frequency) as an input current generated by an alternating current (AC) voltage applied across the piezoelectric layer 110. It should be appreciated that the piezoelectric layer 110 can include almost any material (or combination of materials) that exhibits piezoelectric properties, such that the structure of the material does not have a center of symmetry and a tensile or compressive stress applied to the material alters the separation between positive and negative charge sites in a cell causing a polarization at the surface of the material. The polarization is directly proportional to the applied stress and is direction dependent so that compressive and tensile stresses results in electric fields of opposite polarizations.

Further, the PMUT device 100 comprises electrodes 106 and 108 that supply and/or collect the electrical charge to/from the piezoelectric layer 110. It should be appreciated that electrodes 106 and 108 can be continuous and/or patterned electrodes (e.g., in a continuous layer and/or a patterned layer). For example, as illustrated, electrode 106 is a patterned electrode and electrode 108 is a continuous electrode. As an example, electrodes 106 and 108 can be comprised of almost any metal layers, such as, but not limited to, aluminum (Al)/titanium (Ti), molybdenum (Mo), etc., which are coupled with an on opposing sides of the piezoelectric layer 110.

According to an embodiment, the acoustic impedance of acoustic coupling layer 114 is selected to be similar to the acoustic impedance of the platen layer 116, such that the acoustic wave is efficiently propagated to/from the membrane 120 through acoustic coupling layer 114 and platen layer 116. As an example, the platen layer 116 can comprise various materials having an acoustic impedance in the range between 0.8 to 4 Mega Rayleigh (MRayl), such as, but not limited to, plastic, resin, rubber, Teflon, epoxy, etc. In another example, the platen layer 116 can comprise various materials having a high acoustic impedance (e.g., an acoustic impendence greater than 10 MRayl), such as, but not limited to, glass, aluminum-based alloys, sapphire, etc. Typically, the platen layer 116 can be selected based on an application of the sensor. For instance, in fingerprinting applications, platen layer 116 can have an acoustic impedance that matches (e.g., exactly or approximately) the acoustic impedance of human skin (e.g., $1.6 \times 10^6$ Rayl). Further, in one aspect, the platen layer 116 can further include a thin layer of anti-scratch material. In various embodiments, the anti-scratch layer of the platen layer 116 is less than the wavelength of the acoustic wave that is to be generated and/or sensed to provide minimum interference during propagation of the acoustic wave. As an example, the anti-scratch layer can comprise various hard and scratch-resistant materials (e.g., having a Mohs hardness of over 7 on the Mohs scale), such as, but not limited to sapphire, glass, titanium nitride (TiN), silicon carbide (SiC), diamond, etc. As an example, PMUT device 100 can operate at 20 MHz and accordingly, the wavelength of the acoustic wave propagating through the acoustic coupling layer 114 and platen layer 116 can be 70-150 microns. In this example scenario, insertion loss can be reduced and acoustic wave propagation efficiency can be improved by utilizing an anti-scratch layer having a thickness of 1 micron and the platen layer 116 as a whole having a thickness of 1-2 millimeters. It is noted that the term "anti-scratch material" as used herein relates to a material that is resistant to scratches and/or scratch-proof and provides substantial protection against scratch marks.

In accordance with various embodiments, the PMUT device 100 can include metal layers (e.g., aluminum (Al)/titanium (Ti), molybdenum (Mo), etc.) patterned to form electrode 106 in particular shapes (e.g., ring, circle, square, octagon, hexagon, etc.) that are defined in-plane with the membrane 120. Electrodes can be placed at a maximum strain area of the membrane 120 or placed at close to either or both the surrounding edge support 102 and interior support 104. Furthermore, in one example, electrode 108 can be formed as a continuous layer providing a ground plane in contact with mechanical support layer 112, which can be formed from silicon or other suitable mechanical stiffening material. In still other embodiments, the electrode 106 can be routed along the interior support 104, advantageously reducing parasitic capacitance as compared to routing along the edge support 102.

For example, when actuation voltage is applied to the electrodes, the membrane 120 will deform and move out of plane. The motion then pushes the acoustic coupling layer 114 it is in contact with and an acoustic (ultrasonic) wave is generated. Oftentimes, vacuum is present inside the cavity 130 and therefore damping contributed from the media within the cavity 130 can be ignored. However, the acoustic coupling layer 114 on the other side of the membrane 120 can substantially change the damping of the PMUT device 100. For example, a quality factor greater than 20 can be observed when the PMUT device 100 is operating in air with atmosphere pressure (e.g., acoustic coupling layer 114 is air) and can decrease lower than 2 if the PMUT device 100 is operating in water (e.g., acoustic coupling layer 114 is water).

Figure 3:
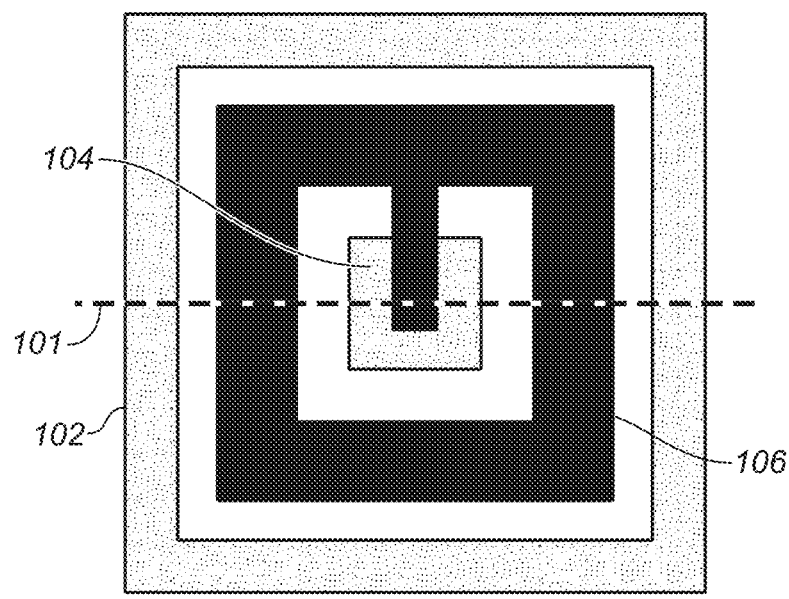
FIG. 3 is a top view of the PMUT device of FIG. 1A, according to some embodiments.

FIG. 3 is a top view of the PMUT device 100 of FIG. 1A having a substantially square shape, which corresponds in part to a cross section along dotted line 101 in FIG. 3. Layout of surrounding edge support 102, interior support 104, and lower electrode 106 are illustrated, with other continuous layers not shown. It should be appreciated that the term "substantially" in "substantially square shape" is intended to convey that a PMUT device 100 is generally square-shaped, with allowances for variations due to manufacturing processes and tolerances, and that slight deviation from a square shape (e.g., rounded corners, slightly wavering lines, deviations from perfectly orthogonal corners or intersections, etc.) may be present in a manufactured device. While a generally square arrangement PMUT device is shown, alternative embodiments including rectangular, hexagon, octagonal, circular, or elliptical are contemplated. In other embodiments, more complex electrode or PMUT device shapes can be used, including irregular and non-symmetric layouts such as chevrons or pentagons for edge support and electrodes.

Figure 4:
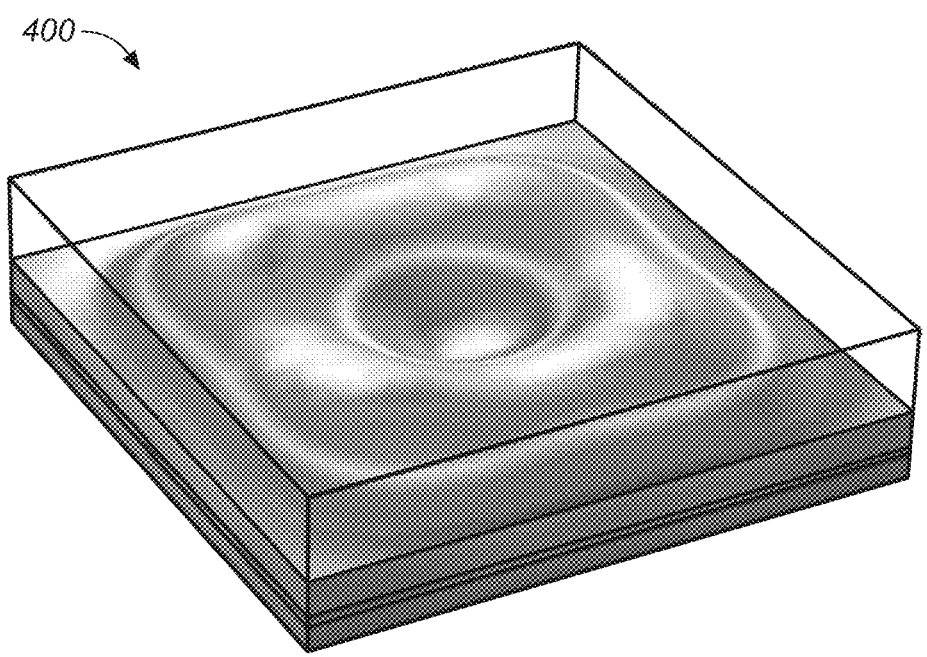
FIG. 4 is a simulated map illustrating maximum vertical displacement of the membrane of the PMUT device shown in FIGS. 1A, 2, and 3, according to some embodiments.

FIG. 4 is a simulated topographic map 400 illustrating maximum vertical displacement of the membrane 120 of the PMUT device 100 shown in FIGS. 1A-3. As indicated, maximum displacement generally occurs along a center axis of the lower electrode, with corner regions having the greatest displacement. As with the other figures, FIG. 4 is not drawn to scale with the vertical displacement exaggerated for illustrative purposes, and the maximum vertical displacement is a fraction of the horizontal surface area comprising the PMUT device 100. In an example PMUT device 100, maximum vertical displacement may be measured in nanometers, while surface area of an individual PMUT device 100 may be measured in square microns.

Figure 5:
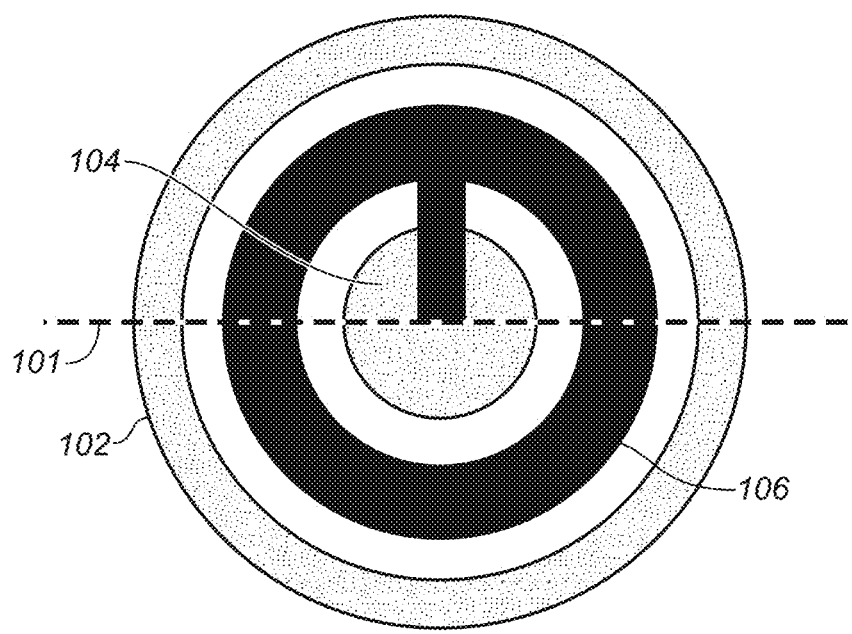
FIG. 5 is a top view of an example PMUT device having a circular shape, according to some embodiments.

FIG. 5 is a top view of another example of the PMUT device 100 of FIG. 1A having a substantially circular shape, which corresponds in part to a cross section along dotted line 101 in FIG. 5. Layout of surrounding edge support 102, interior support 104, and lower electrode 106 are illustrated, with other continuous layers not shown. It should be appreciated that the term "substantially" in "substantially circular shape" is intended to convey that a PMUT device 100 is generally circle-shaped, with allowances for variations due to manufacturing processes and tolerances, and that slight deviation from a circle shape (e.g., slight deviations on radial distance from center, etc.) may be present in a manufactured device.

Example Ultrasonic Fingerprint Sensor

Figure 6:
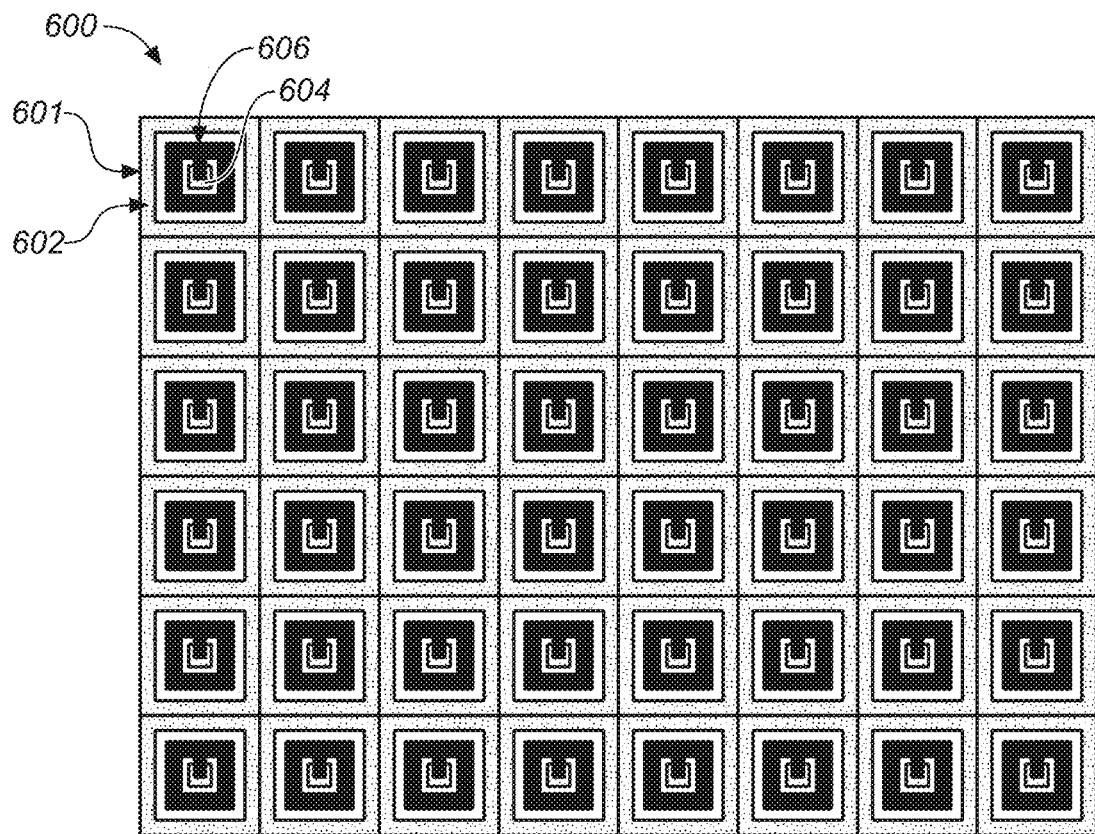
FIG. 6 illustrates an example array of square-shaped PMUT devices, according to some embodiments.

FIG. 6 illustrates an example two-dimensional array 600 of square-shaped PMUT devices 601 formed from PMUT devices having a substantially square shape similar to that discussed in conjunction with FIGS. 1A, 1B, 2, and 3. Layout of square surrounding edge support 602, interior support 604, and square-shaped lower electrode 606 surrounding the interior support 604 are illustrated, while other continuous layers are not shown for clarity. As illustrated, array 600 includes columns of square-shaped PMUT devices 601 that are in rows and columns. It should be appreciated that rows or columns of the square-shaped PMUT devices 601 may be offset. Moreover, it should be appreciated that square-shaped PMUT devices 601 may contact each other or be spaced apart. In various embodiments, adjacent square-shaped PMUT devices 601 are electrically isolated. In other embodiments, groups of adjacent square-shaped PMUT devices 601 are electrically connected, where the groups of adjacent square-shaped PMUT devices 601 are electrically isolated.

In operation, during transmission, selected sets of PMUT devices in the two-dimensional array can transmit an acoustic signal (e.g., a short ultrasonic pulse) and during sensing, the set of active PMUT devices in the two-dimensional array can detect an interference of the acoustic signal with an object (in the path of the acoustic wave). The received interference signal (e.g., generated based on reflections, echoes, etc. Of the acoustic signal from the object) can then be analyzed. As an example, an image of the object, a distance of the object from the sensing component, a density of the object, a motion of the object, etc., can all be determined based on comparing a frequency and/or phase of the interference signal with a frequency and/or phase of the acoustic signal. Moreover, results generated can be further analyzed or presented to a user via a display device (not shown).

Once an image is obtained, that image is processed by a matcher to extract features and to compare against stored images to authenticate the user. As such, accuracy of captured images is essential to the performance of image matching for user authentication. To get the best possible image for fingerprint matching, any background image or contributions to the image other than from the fingerprint should be removed or corrected for. The background image is the image obtained by the sensor when no finger is present. This background image is also referred to as the darkfield or offset. The embodiments described herein provide for capturing the darkfield image and correcting the fingerprint image for the darkfield image.

Various embodiments described herein provide a finger detection mode for identifying if an object has been placed on a fingerprint sensor. In some embodiments, if an object's presence is not detected on the fingerprint sensor, a darkfield candidate image can be captured at the sensor, where the darkfield candidate image is an image absent an object interacting with the sensor.

The disclosure recognizes and addresses, in at least certain embodiments, the issue of power consumption and a power efficient always-on approach to void detection for determining when to capture a darkfield image at the sensor. As utilized herein, a void is detected when it is determined that an object is not interacting with the sensor such that a darkfield image can be captured. The void detection stage is implemented continuously or nearly continuously and allows for the appropriate acquisition of the darkfield image.

Implementation of the low-power detection stage permits removal of physical actuation device (e.g., buttons or the like) while maintaining low power consumption. Absence of a physical actuation device does not hinder low-power consumption and does simplify user-device interaction when sensing human touch. While embodiments of the disclosure are illustrated with reference to a mobile electronic device, the embodiments are not limited in this respect and the embodiments can be applied to any device (mobile or otherwise) having a surface that is sensitive to touch and permits or otherwise facilitates control of the device by an end-user. Such a touch-sensitive surface can embody or can constitute, for example, a fingerprint sensor. Mobile devices can be embodied in or can include consumer electronics devices (e.g., smartphones, portable gaming devices); vehicular devices (such as navigation and/or entertainment system device); medical devices; keys (e.g., for locking and gaining access to buildings, storage receptacles, cars, etc.); and the like.

When compared to conventional technologies, embodiments described herein can provide numerous improvements. For example, splitting the sensing of human touch into a low power, always-on detection stage and a triggered, full-power analysis stage permits sensing human touch continuously or nearly continuously, without causing battery drainage or other inefficiencies. Furthermore, utilizing a low power, always-on detection stage allows for the detection of voids for capturing darkfield images using the sensor.

Figure 7A:
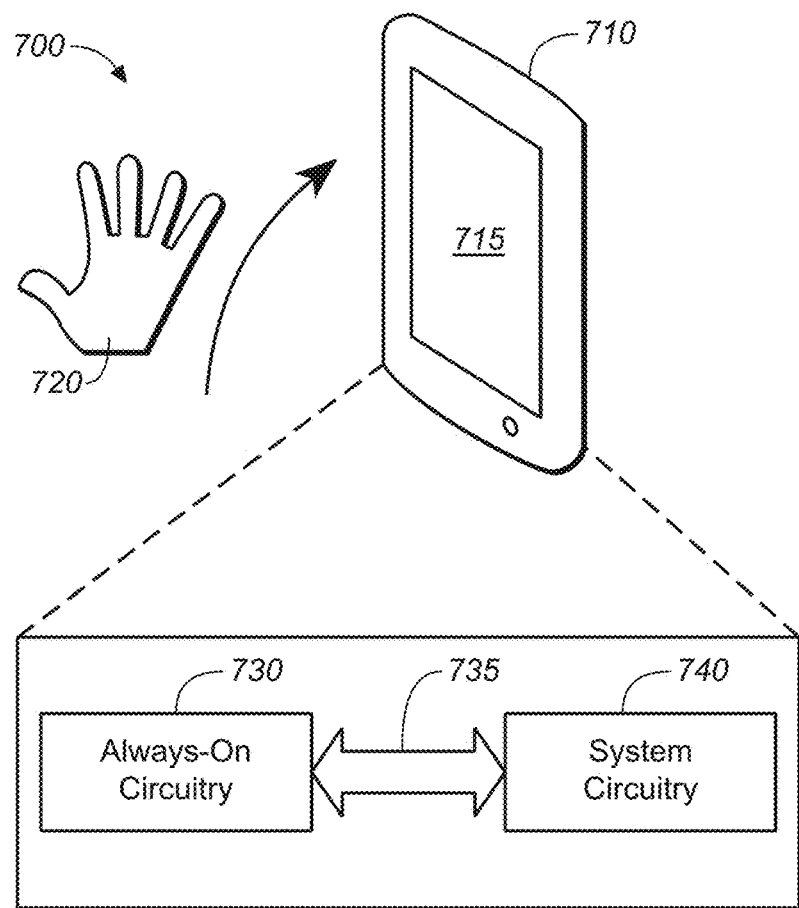
FIG. 7A illustrates an example of an operational environment for sensing of human touch, according to some embodiments.

With reference to the drawings, FIG. 7A illustrates an example of an operational environment 700 for sensing of human touch in accordance with one or more embodiments of the disclosure. As illustrated, a device 710 includes a fingerprint sensor 715 or other type of surface sensitive to touch. In one embodiment, fingerprint sensor 715 is disposed beneath a touch-screen display device of device 710. In another embodiment, fingerprint sensor 715 is disposed adjacent or close to a touch-screen display device of device 710. In another embodiment, fingerprint sensor 715 is comprised within a touch-screen display device of device 710. In another embodiment, fingerprint sensor 715 is disposed on the side or back of the device. It should be appreciated that device 710 includes a fingerprint sensor 715 for sensing a fingerprint of a finger interacting with device 710.

In one embodiment, a human finger (represented by a hand 720), can touch or interact with a specific area of device 710 proximate fingerprint sensor 715. In various embodiments, fingerprint sensor 715 can be hard and need not include movable parts, such as a sensor button configured to detect human touch or otherwise cause the device 710 to respond to human touch. The device 710 can include circuitry that can operate in response to touch (human or otherwise) of the touch-screen display device and/or fingerprint sensor 715 (or, in some embodiments, the other type of touch sensitive surface).

In accordance with the described embodiments, device 710 includes always-on circuitry 730 and system circuitry 740. It should be appreciated that components of always-on circuitry 730 and system circuitry 740 might be disposed within the same componentry, and are conceptually distinguished herein such that always-on circuitry 730 includes components that are always-on, or mostly always-on, and system circuitry 740 includes components that are powered off until they are powered on, for example, in response to an activation signal received from always-on circuitry 730. For example, such circuitry can be operatively coupled (e.g., electrically coupled, communicative coupled, etc.) via a bus architecture 735 (or bus 735) or conductive conduits configured to permit the exchange of signals between the always-on circuitry 730 and the system circuitry 740. In some embodiments, a printed circuit board (PCB) placed behind a touch-screen display device can include the always-on circuitry 730, the system circuitry 740, and the bus 735. In one embodiment, the always-on circuitry 730 and the system circuitry 740 can be configured or otherwise arranged in a single semiconductor die. In another embodiment, the always-on circuitry 730 can be configured or otherwise arranged in a first semiconductor die and the system circuitry 740 can be configured or otherwise arranged in a second semiconductor die. In addition, in some embodiments, the bus 735 can be embodied in or can include a dedicated conducting wire or a dedicated data line that connects the always-on circuitry 730 and the system circuitry 740. Always-on circuitry 730 may be a sensor processor (or included within a sensor processor) that also controls the fingerprint sensor, and system circuitry 740 may be the host processor or application processor or included within the host processor or application processor of device 710. In some embodiments, always-on circuitry 730 and/or system circuitry 740 includes a temperature sensor for sensing a temperature of fingerprint sensor 715.

The always-on circuitry 730 can operate as sensor for human touch and the system circuitry 740, or a portion thereof, can permit or otherwise facilitate analysis of the human touch. As described herein, always-on circuitry 730 includes fingerprint sensor 715. For example, responsive to capturing an image of a fingerprint, fingerprint sensor 715 can transmit the captured image to system circuitry 740 for analysis.

The analysis can include fingerprint recognition or other types of biometric evaluations. The always-on circuitry 730 can be energized or otherwise power-on continuously or nearly continuously and can be configured to monitor touch of fingerprint sensor 715. In addition, in response to human touch (e.g., touch by a human finger or other human body part), the always-on circuitry 730 can be further configured to trigger detection and/or another type of analysis of elements of the human touch or a human body associated therewith. To at least that end, the always-on circuitry 730 can be configured to implement void detection for determining when to capture a darkfield image at the sensor.

Figure 7B:
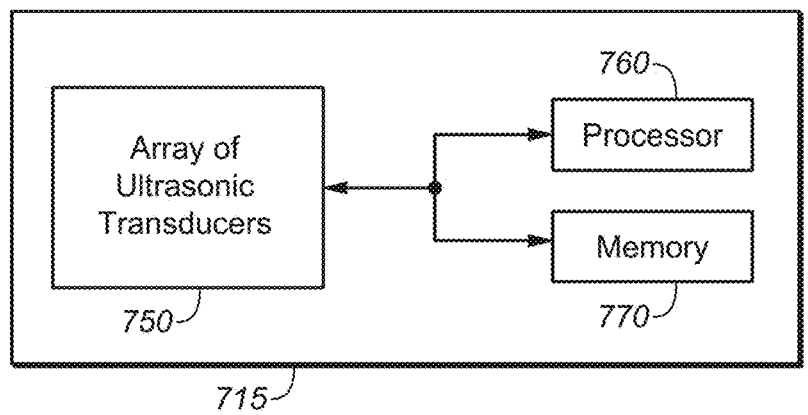
FIG. 7B illustrates an example fingerprint sensor, in accordance with various embodiments.

FIG. 7B illustrates an example fingerprint sensor 715, in accordance with various embodiments. In one embodiment, fingerprint sensor 715 includes an array 750 of ultrasonic transducers (e.g., PMUT devices), a processor 760, and a memory 770. In various embodiments, processor 760 performs certain operations in accordance with instructions stored within memory 770. It should be appreciated that components of fingerprint sensor 715 are examples, and that certain components, such as processor 760 and/or memory 770 may not be located within fingerprint sensor 715. For example, always-on circuitry 730 or system circuitry 740 may include a processor and/or memory for performing certain operations.

In one embodiment, fingerprint sensor 715 includes processor 760 for performing the pixel capture, where pixel capture is performed using subsets of ultrasonic transducers (e.g., PMUTs) of fingerprint sensor 715. In other embodiments, processor 760 can perform at least some signal analysis, e.g., void detection, to determine whether an object has interacted with fingerprint sensor 715. In some embodiments, responsive to detecting a void at fingerprint sensor 715, a darkfield image can be capture at fingerprint sensor 715. In some embodiments, system circuitry 740 is activated in response to detecting a void for capturing the darkfield image. Subsequent the capture of the darkfield image, system circuitry 740 can be deactivated.

While the embodiment of FIG. 7B includes processor 760 and memory 770, as described above, it should be appreciated that various functions of processor 760 and memory 770 may reside in other components of device 710 (e.g., within always-on circuitry 730 or system circuitry 740). Moreover, it should be appreciated that processor 760 may be any type of processor for performing any portion of the described functionality (e.g., custom digital logic).

In various embodiments, a power supply can energize at least a portion of the system circuitry 740 according with trigger signaling (or other type of control signal) provided (e.g., generated and transmitted) by the always-on circuitry 730. For example, system circuitry 740 can include a power controller that can receive trigger signaling (e.g., a control instruction) and, in response, can energize at least one processor of the system circuitry 740 from a power-save state to a full-power state. The at least one processor that transitions from the power-save state to the full power state can execute a darkfield image capture operation in response to the void detection of always-on circuitry 730.

In various embodiments, the analysis of a darkfield image or an image of a fingerprint can include computer-accessible instruction (e.g., computer-readable instructions and/or computer-executable instructions) that in response to execution by a processor can permit or otherwise facilitate the device 710 to implement a defined algorithm (or process) for darkfield image correction or fingerprint identification or analysis.

In various embodiments, fingerprint sensor 715 can include ultrasonic transducers (e.g., PMUTs) or capacitive micromachined ultrasonic transducers (CMUTs)) able to generate and detect acoustic/pressure waves. Examples of PMUT devices and arrays of PMUT devices are described in accordance with FIGS. 1A-6 above. In embodiments, a device 710 includes fingerprint sensor 715 comprised of an array of ultrasonic transducers that can facilitate ultrasonic signal generation and sensing. For example, fingerprint sensor 715 can include a silicon wafer having a two-dimensional (or one-dimensional) array of ultrasonic transducers.

Darkfield Acquisition for Correction of Fingerprint Images

Darkfield images are used for improving or correction of captured fingerprint images. As presented above, the darkfield image, also referred to as the background image or offset, is the image obtained by the sensor when no finger is present. In general, any image captured by a sensor may include temporal noise or spatial noise in addition to a signal related to an object being imaged. Temporal noise is considered as varying with time (e.g., successive images captured under similar conditions) and spatial noise is an offset that contributes to a captured signal (e.g., a ridge/valley signal). To get the best possible image for the fingerprint matcher any background image or contributions to the image other than from the fingerprint should be removed or corrected for. The embodiments described herein provide for capturing the darkfield image and using the darkfield image to correct the fingerprint image.

In various embodiments described herein, the fingerprint authentication or identification generates some constraints to the overall fingerprint sensing system. For instance, in some embodiments, a user is able to enter the authentication or identification system with no specific preparation steps. The fingerprint sensing system is in an always-on mode, waiting for the user to put his or her finger on the sensor, with no opportunities for a priori preparation prior to the user's finger interacting with the sensor. It is also of importance to consider that in many scenarios the fingerprint sensing system is autonomous, therefore the desire to consume as less power as possible despite the always-on mode. Since the fingerprint sensing system is capable of capturing a fingerprint at any time, the darkfield estimate used for correction should be as current as possible to provide for the best correction of the fingerprint image. In other words, in an ideal case, the darkfield image is captured just prior to a user placing their finger on the sensor. However, due to limitations on sensing and power consumption, it is not practical to actively acquire the darkfield in such a manner. Accordingly, the described embodiments provide for monitoring the darkfield such that a most current version of the darkfield estimate is captured, for improving the quality of the fingerprint image, thus providing for improved performance of fingerprint matching.

From the sensor side, it is also to be considered that the background image or sensor offset, also referred to herein as the darkfield, is subject to change over time. For example, changes to the darkfield in the short term may be due to the influence of external parameters such as temperature, and in the longer term due to evolution of the sensor itself. It is also noted that the integration process of the sensor in the fingerprint sensing system may comprise several manufacturing steps and module construction steps that may have an impact on the background image. An overall comprehensive calibration and storage of multiple darkfield images requires many resources in terms of manufacturing calibration steps, and would also require a huge memory amount which is usually costly and not compatible with the consumer market. Moreover, this is also likely to fail technically as darkfield will evolve during the product life cycle. Therefore, there is a need for a continuous darkfield tracker that would constantly update the darkfield as time goes by.

Figure 8:
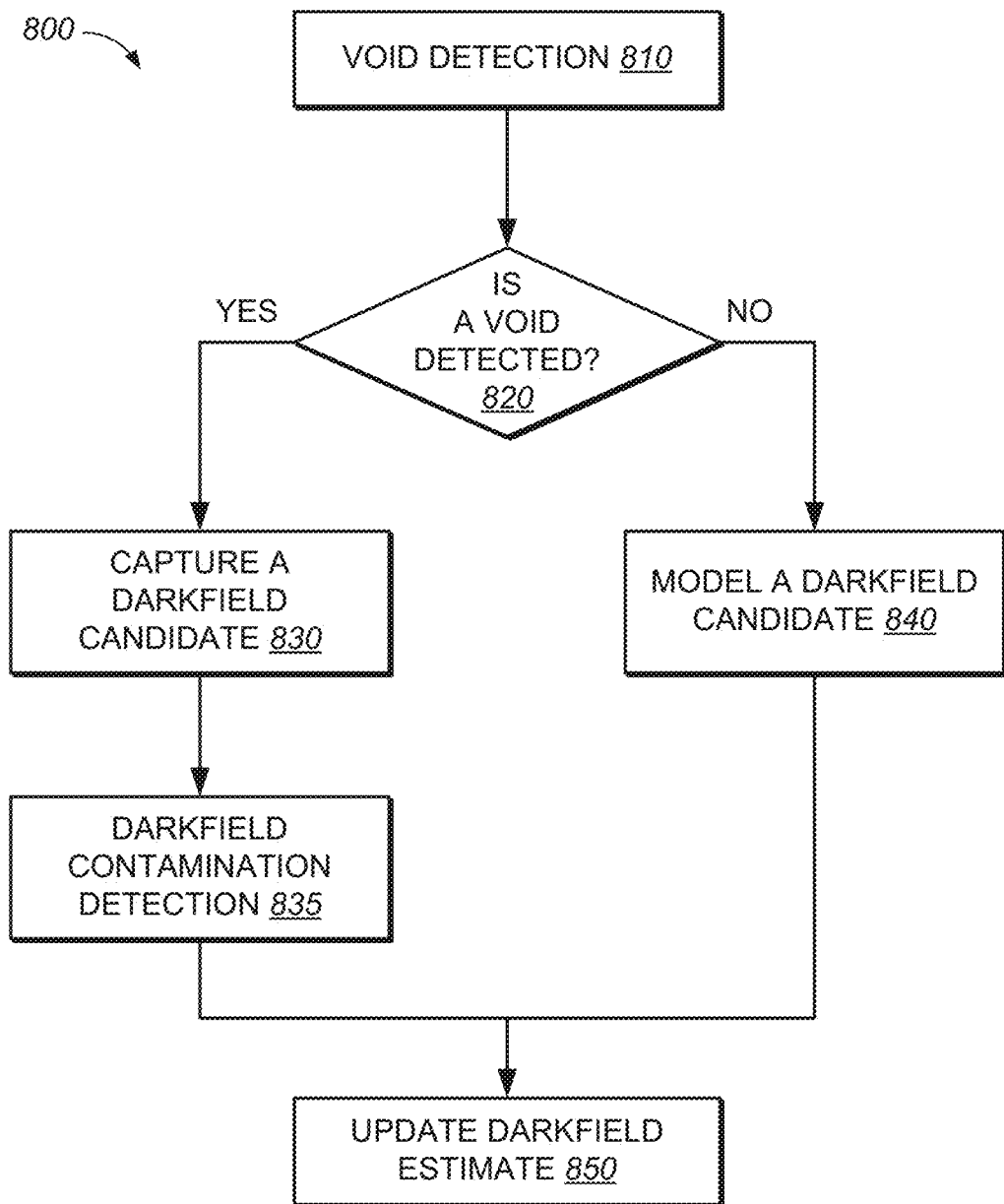
FIG. 8 illustrates a flow diagram of an example process for darkfield acquisition, according to some embodiments.

FIG. 8 illustrates a flow diagram 800 of an example process for darkfield acquisition, according to some embodiments. At procedure 810, void detection is performed. At procedure 820, it is determined whether a void (e.g., absence of interaction) is detected at the sensor. Provided a void is detected, as shown at procedure 830, a darkfield candidate image is captured. Various embodiments of void detection and capturing of a darkfield candidate image are described in accordance with FIGS. 9-15 below. In some embodiments, as shown at procedure 835, darkfield contamination detection is performed. Various embodiments of darkfield contamination detection are described in accordance with FIGS. 23-27 below. In one embodiment, provided contamination is detected, flow diagram 800 proceeds to procedure 840, where a darkfield candidate image is modeled. Provided a void is not detected, as shown at procedure 840, a darkfield candidate image is modeled. Various embodiments of modeling of a darkfield candidate image are described in accordance with FIGS. 16-22 below. In some embodiments, as shown at procedure 850, the darkfield estimate is updated (e.g., with a captured darkfield candidate image or a modeled darkfield candidate image).

Example Void Detection and Darkfield Capture

Figure 9:
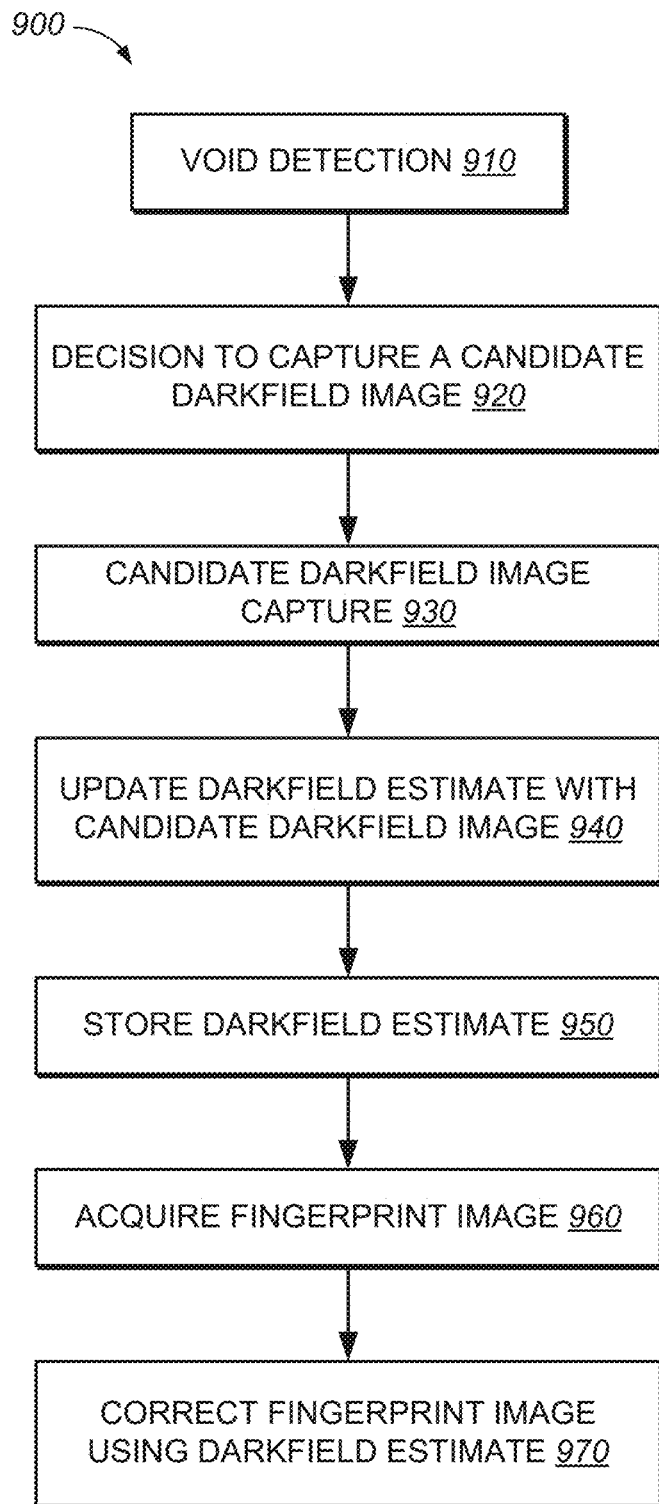
FIG. 9 illustrates a flow diagram of an example method for capturing a darkfield image, according to some embodiments

FIG. 9 illustrates a flow diagram 900 of an example method for capturing a darkfield image, according to some embodiments. Flow diagram 900 shows an overview of the different procedures involved in tracking the darkfield and then correcting a fingerprint image for the darkfield, The term darkfield and darkfield image may both be used below and represent the image captured by the sensor when no finger or object is touching the sensor. In an ideal situation, a sensor will provide a uniform darkfield when no object is present on the sensor. In the case of any actual sensor, e.g., an ultrasonic fingerprint sensor, the darkfield may be caused by ultrasound reflections within the sensor stack, and not due to any object on the sensor surface. The sensor surface (e.g., platen layer 116 of FIGS. 1A, 1B, and 2) is the part of the device where the user is expected to put his or her finger in order to measure the fingerprint.

The darkfield is measured directly at the sensor when no object such as a finger is present on the sensor surface, and as such a darkfield image is a sensor image acquired when no object is present on the sensor surface. At procedure 910 of flow diagram 900, void detection is performed. Void detection includes a determination as to whether an object is present on the sensor surface or not. In some embodiments, void detection is discussed on further detail below (e.g., as described in FIGS. 10 through 15). In other embodiments, an additional detection sensor is used for performing void detection. For example, the fingerprint sensor may include one or more additional electrodes on top of the fingerprint sensor or platen that detects the presence of an object or finger. A signal is received at the additional detection sensor, and a determination as to whether an object is interacting with the fingerprint sensor is based at least in part on the signal. It should be appreciated that an additional sensor may be used alone or in combination with the other embodiments of void detection described herein. Once the void detector has determined that there is no object on the sensor surface, a decision to capture a darkfield candidate image is made, as shown at procedure 920. The decision to capture the darkfield candidate image is optional and may be based on the monitoring of various parameters such as time and temperature. At procedure 930, a darkfield candidate image is captured, where the darkfield candidate image includes an image (full or partial) acquired by the sensor with no object contacting or otherwise interacting with the sensor. At procedure 940, the darkfield estimate (e.g., a previously stored darkfield image) is update with the darkfield candidate image. In one embodiment, the darkfield candidate image is merged with the estimated darkfield. In another embodiment, if no previous darkfield image or darkfield estimate is stored, the darkfield candidate image is stored as the darkfield estimate. A resulting darkfield estimate is then stored, as shown at procedure 950, as an output of the merge process, and is made available for the fingerprint imaging process.

The imaging process can use the so stored darkfield estimate to correct an acquired fingerprint image. At procedure 960, a fingerprint image is acquired and at procedure 970, the fingerprint image is corrected using the stored darkfield estimate. The corrected fingerprint image may then be sent to a matcher for authentication. The matcher is the part of the fingerprint sensing system that compares the fingerprint image to the fingerprint images acquired during enrollment of the user and authenticates the user of the sensor.

In accordance with the described embodiments, the fingerprint sensor is an always-on sensor, meaning that the fingerprint sensor should always be ready to acquire a fingerprint, without the user, or another part of the system instructing the fingerprint sensor to do so (e.g., as describe in FIGS. 7A and 7B). As a result, the fingerprint sensor is constantly in operation and constantly checking if a finger is present on the sensor surface. Accordingly, there should always be a correct darkfield stored and available so that as soon as a finger is detected, the fingerprint image can be acquired and corrected for the darkfield. Many techniques exist to determine if there is a finger present on the surface, but they consist of acquiring a complete image and then determining if the image has the characteristics of a fingerprint. For an always-on sensor such techniques would require too much power and processing resources because a complete image is constantly acquired.

The void detection of the described embodiments does not require complete image acquisition and subsequent image analysis. The void detection as described herein determines whether an object is in contact with, or otherwise interacting with, the sensor surface based only on a limited number of pixels (e.g., 5-50) of the fingerprint sensor. In some embodiments, the pixels are distributed over the fingerprint sensor. This subset of pixels can form a patch or one or multiple profile(s), or can be spatially distributed on the image without any image or profile cohesion. The pixels used to in void detection may be referred to as the darkfield pixels. It should be appreciated that the more pixels used in performing void detection, the performance of void detection improves and the power consumption of the void detection increases. The decision is a trade-off and may be adapted automatically based on the available power resources or power mode.

The subset of pixels can be analyzed, e.g., using either their temporal pattern or behavior, and/or the spatial pattern or behavior when the subset can form a patch image or a profile. For an always-on autonomous device to save power, the smaller the subset of pixels, the better it is for power consumption. A 1 mA always on darkfield tracker is so consuming 24 mAh per 24 hours, to be compared to a 1000 mAh battery for instance. On the other side, it is also of paramount importance that the darkfield tracker system does always maintain a good enough estimate of the current darkfield to allow at any time a proper correction of the image formed on the sensor.

Figure 10:
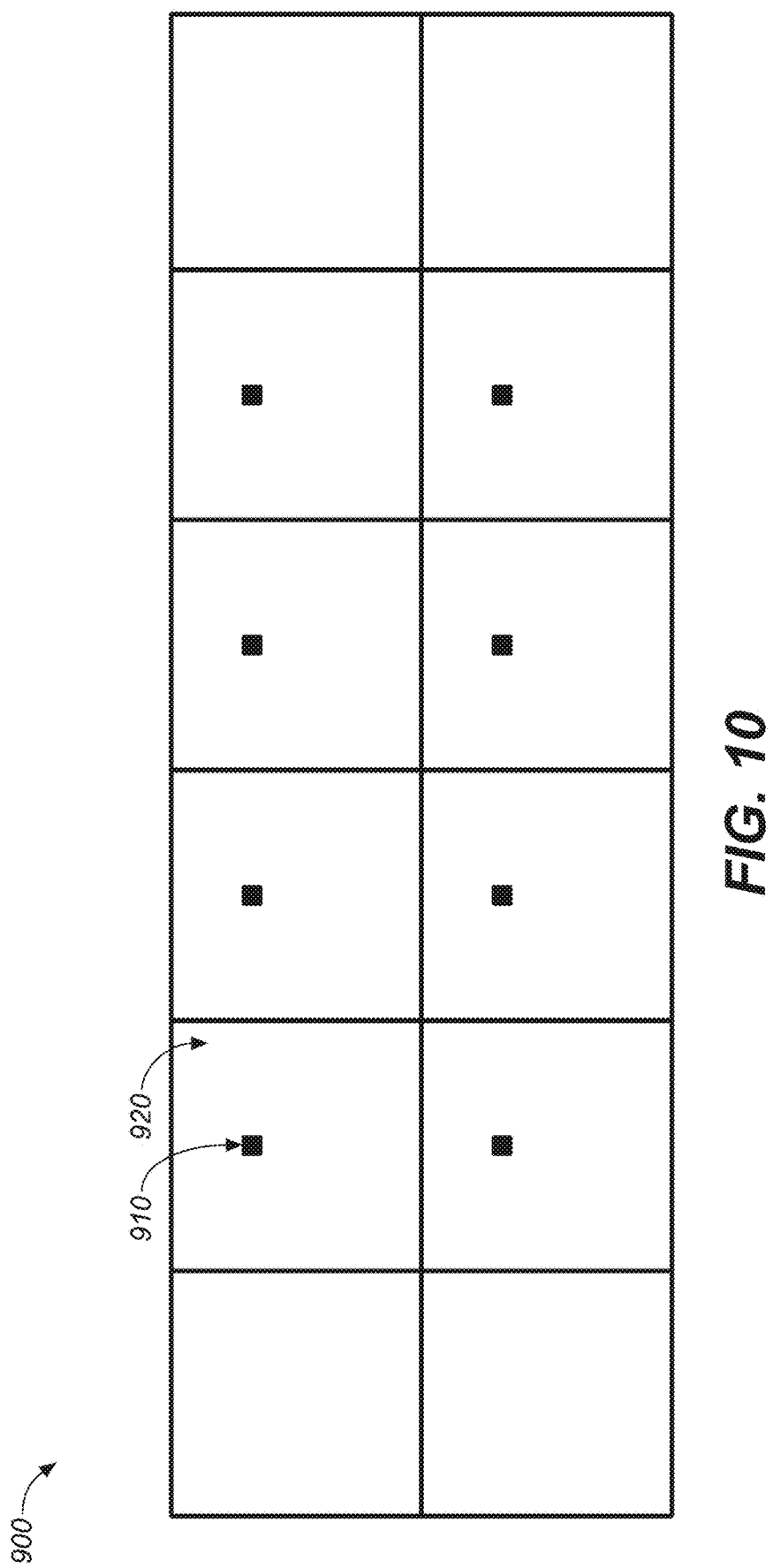
FIG. 10 illustrates example operation of void detection associated with a two-dimensional array of ultrasonic transducers, according to some embodiments.

FIG. 10 illustrates example operation void detection associated with a two-dimensional array 1000 of ultrasonic transducers, according to some embodiments. In one embodiment, the void detection includes the activation of a first subset of ultrasonic transducers for capturing single pixels (e.g., pixel 1010) within a block (e.g., block 1020) of two-dimensional array 1000. For example, two-dimensional array 1000 includes twelve blocks of 24×24 ultrasonic devices. It should be appreciated that blocks 1020 are independently controllable regions of two-dimensional array 1000 such that pixel acquisition can be performed concurrently for all blocks 1020. The usage of blocks 1020 is optional for allowing for concurrent pixel acquisition, and other methods of concurrent pixel acquisition can be utilized in the described embodiments.

As illustrated, the first phase includes activation of ultrasonic devices of the middle eight 24×24 blocks 1020 of ultrasonic transducers for capturing a single pixel or a closely grouped plurality of pixels within each activated block. While the illustrated embodiment shows only eight of the twelve blocks activated, and only ultrasonic transducers activated for capturing a single pixel within the activated blocks, it should be appreciated that any number of blocks may be activated, that the pixel may be located at any position within a block, that any number of ultrasonic transducers may be activated for capturing any number of pixels, and that the illustrated embodiment is an example of many different possibilities.

The pixels may be at the same position within the blocks since this may simplify driving electronics, or different pixels may be used in the different blocks. Moreover, it should be appreciated that the two-dimensional array can include any number of ultrasonic transducers, and the two-dimensional array may be divided into any number of independently operable blocks. Furthermore, as described above, embodiments described herein provide for utilizing multiple ultrasonic transducers, some of which may be time-delayed relative to each other, to focus a transmit beam to capture a pixel of an image. The pixels and blocks that are activated during void detection may also depend on the size of the sensor, the size of the finger, or the most likely position the user will touch the sensor. For example, for a small sensor where the finger most likely covers the entire sensor surface, pixels and blocks covering the entire surface may be activated. For larger sensors, where the finger may only cover a part of the sensor, only a central section of the sensor may be activated to save power resources. The central section may be adapted to the user, or the context of the device, e.g., the device orientation.

In the illustrated embodiment, pixel 1010 is periodically captured during void detection. Although a single pixel is illustrated, it will be understood that multiple pixels can be used, either grouped together or distributed throughout the array. Also, each pixel may be imaged by activating a plurality of ultrasonic transducers around the pixel. When a significant change in ultrasonic wave receive intensity occurs due to the presence of an object positioned near a sensor platen (not shown), circuitry is activated to indicate that a void is not detected. In one embodiment, when a void is detected, a darkfield image can be captured at the fingerprint sensor using the two-dimensional array 1000. In one embodiment, when a void is not detected (e.g., an object interacting with two-dimensional array 1000 is detected), a darkfield image is not able to be captured using two-dimensional array 1000. In one embodiment, void detection includes activating a small subset of the pixels in the array in a highly duty-cycled manner. For example, as illustrated, the 8-pixel pattern illustrated in FIG. 10 is activated. In various embodiments, these pixels are operated at a rate of 10-100 samples/second.

In some embodiments, the threshold defines an expected signal range such that signals falling within the expected signal range are indicative of no object interacting with the sensor. When a signal is outside of the expected signal range, it is determined that an object is interacting with the sensor. In one embodiment, on each transmit/receive cycle, the signal from each pixel would be compared to a mean pixel value plus/minus a threshold (e.g., an offset plus/minus a range), where the mean pixel value plus/minus the threshold is an example of the expected signal range. For example, if the signal on M or more pixels exceeds a single value, (where 'M' is a programmable setting), the system determines that an object is interacting with the fingerprint sensor, and that a void is not detected. In another example, if the signal on M or more pixels falls outside of a mean pixel value plus/minus a range, the system determines that an object is interacting with the fingerprint sensor, and that a void is not detected. Otherwise, the system determines that a void is detected. For example, in another embodiment, a sum of the received signals may be compared with a threshold, the received signals may be divided into groups and compared to a threshold, etc.

In one embodiment, the signal and mean pixel value are gray scale levels, and the threshold is plus/minus number of gray scale levels. For example, the total variance of gray scale levels could be fifteen levels, and the threshold could be plus/minus four gray scale levels. In such an example, a signal that falls outside four gray scale levels of the mean pixel value would trigger an event indicating an object is interacting with the fingerprint sensor, where a signal falling within four gray scale levels would not trigger an event (e.g., assumed to be a result of signal noise).

In order to properly identify an interaction with the fingerprint sensor, the mean pixel value is tracked over time, allowing for slow changes in signal values to not impact the determination of an object contacting the fingerprint sensor. For example, a gradual temperature change of a fingerprint sensor may impact the value of a received signal. Embodiments described herein provide for tracking the mean pixel value over time, and adjusting the threshold range accordingly, to avoid false accepts.

Figure 11A:
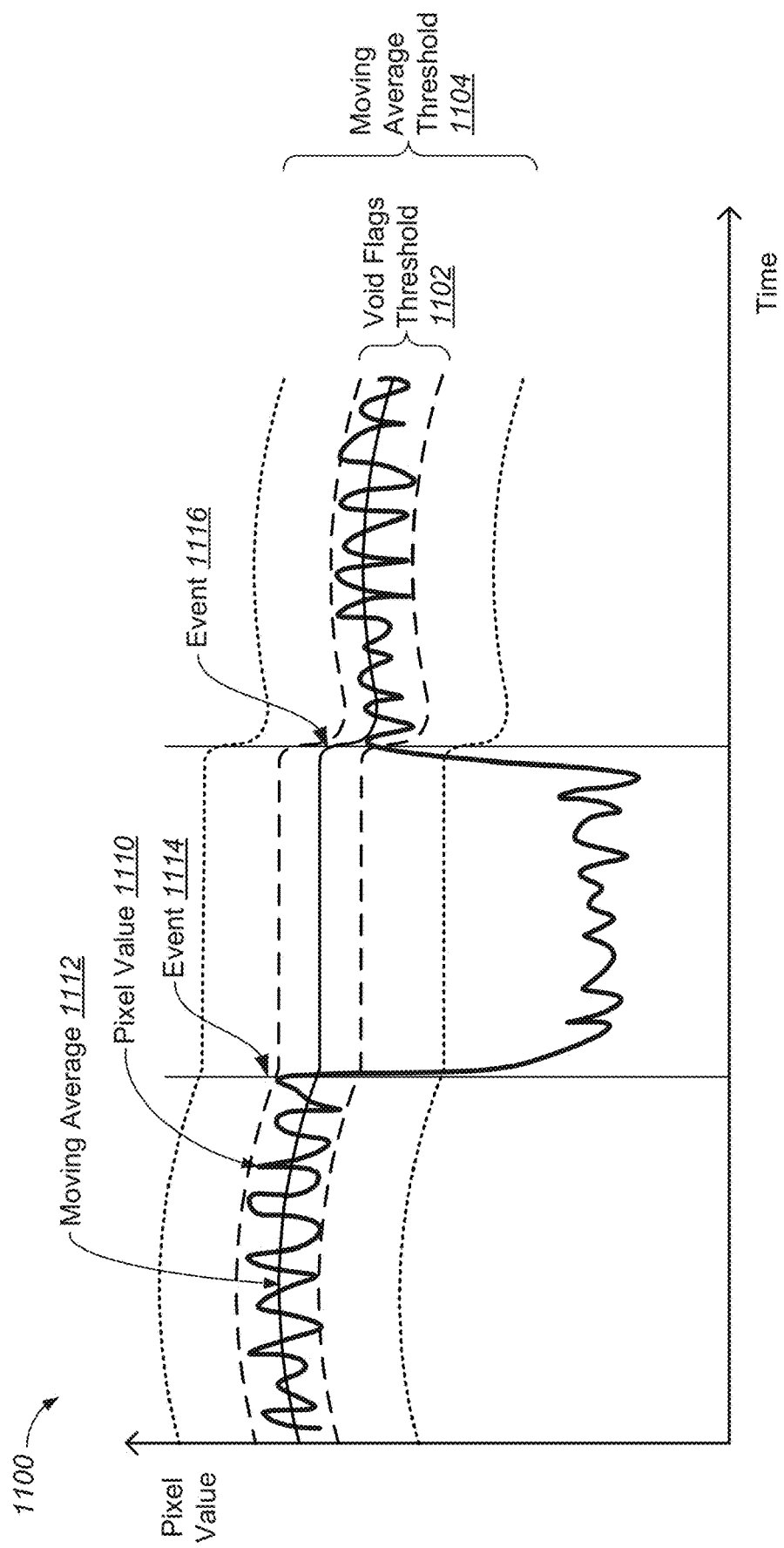
FIGS. 11A-11E illustrate graphs of pixel values relative to time during void detection at a sensor, according to an embodiment.

FIG. 11A illustrates a graph 1100 of pixel values relative to time during void detection at a sensor, according to an embodiment. For example, graph 1100 is the pixel value for pixel 1010 of FIG. 10, where the pixel value for each pixel captured in FIG. 10 is received and tracked. Pixel value 1110 is received and tracked over time, where pixel value 1110 is the signal value for the pixel received from the sensor and moving average 1112 is the mean pixel value over time (e.g., running average). A first threshold, also referred to as the void flags threshold 1102, is shown. A pixel value 1110 falling outside of the range defined by void flags threshold 1102, is indicative of an event 1114 (e.g., interaction of an object with the fingerprint sensor). The threshold value may be pre-defined, or may be adaptive, e.g., based on the noise level or variance of the signal, the available resources, or the required latency. The threshold may be expressed in pixel gray levels. For example, the first threshold may be of the order of 1-10 gray levels. If the sensor signal is within the void flags threshold 1102, a void flag may be set for the pixel. This means that, based on this pixel, there is an indication that there is no object on the sensor surface. The void flags threshold 1102 may be fixed in gray levels, or may be set as a relative value of the sensor signal. The void flags threshold 1102 may also depend on other factors, e.g., the noise level, signal-to-noise level (SNR), or contrast-to-noise-level (CNR). The void flags threshold 1102 may be identical for all pixels, or may be adapted individually for each pixel. The void flags threshold 1102 can be set according to the pixel temporal noise behavior. It should be appreciated that one of ordinary skill in the art of signal processing may be able to set void flags threshold 1102 according to the probability density or distribution function of the pixel noise. For example, for a Gaussian noise distribution a void flags threshold 1102 can be set to allow for a 99% probability that the current pixel value is indeed compliant for the "noise only" assumption. It should be appreciated that one of ordinary skill in the art of signal processing may utilize other practical experimental methods to get a correct setting of such a void flags threshold 1102. It should be appreciated that the objective is to get an overall void flag only when no object is on the sensor, to lower the probability of acquisition of a wrong darkfield candidate image, e.g., to avoid false reads of voids or objects. The void false reads rate (e.g., a void is declared and an object is on the sensor) should be kept very low, and void false rejection rate (e.g., a void is not declared and no object is on the sensor) can be kept high, as long as from time to time, a void is correctly declared.

Moving average 1112 is updated over time to account for environmental or other changes that impact signal values (e.g., temperature change). In one embodiment, if a pixel value 1110 falls within moving average threshold 1104, moving average 1112 is updated by averaging the pixel value 1110 with the previous moving average 1112, resulting in an updated moving average 1112. It should be appreciated that pixel value 1110 can be averaged with a number of previous values of moving average 1112, so as to control the impact of pixel value 1110 on moving average 1112. Updating moving average 1112, and thus void flags threshold 1102, allows for (e.g., slow) temporal evolution of factors impacting pixel signal values (e.g., temperature change).

The determination whether there is no object on the sensor surface, e.g., a void is detected, may be based on a combination of the plurality of pixels. For example, a void may be detected only if all the plurality of pixels have a void flag, meaning that for all pixels, the sensor signal for that pixel was within the void flags threshold 1102 of the moving average 1112. This will limit the void false alarm rate. Instead of all pixels have a void flag, it may be required that only a certain percentage of the pixels have a void flag (e.g., 50%-100%). In some embodiments, this is a voting scheme, where all pixels have a vote on the void status, and a final decision is made. Other techniques fusing the multiple pixel information can be used. The void flag can be updated for each sample of the pixels temporal input.

Once a void is detected, thanks to the subsequent steps of the darkfield tracker, the system may then acquire an image of the complete sensor by activating pixel acquisition over the entire two-dimensional array to capture the pixels of the image (or a decimated image), resulting in the capture of a darkfield candidate image. Alternatively, and beneficial for power, once a void is detected, the decision to capture a darkfield candidate image may also depend on other factors, e.g., the time passed since the last darkfield candidate image acquisition, the temperature change since the last darkfield candidate image acquisition, the available power resources or power mode of the device. When it is known that the overall system is already in a high-power mode (such as when a user interacts with his smartphone, so the application processor is on, and/or the screen is on), one can allow for more power consumption for the darkfield tracker and allow for more frequent updates. Alternatively, the settings of the darkfield tracker may also depends on an application running on the system that may have certain requirements on fingerprint image quality. For example, a banking application may need a high-quality fingerprint image, and the darkfield tracker may be configured accordingly. The different factors may also be combined to determine an urgency of the darkfield acquisition, and their weight may be different. For example, temperature change is known to affect the darkfield, so a change in temperature may be an important factor in determining whether a new darkfield is acquired. The temperature may be measured by a temperature sensor build into the fingerprint sensor, and may come from another temperature sensor in the device containing the fingerprint sensor.

FIG. 11A also shows a second threshold, also referred to as the moving average threshold 1104. Moving average 1112 is updated over time to account for environmental or other changes that impact signal values (e.g., temperature change). The moving average threshold 1104 range (e.g., 5-50) is shown here to have a larger value than the void flags threshold 1102 range. When the sensor signal passes outside the moving average threshold 1104 range (e.g. as indicated by event 1114), it may be an indication that there may be an object on the sensor surface. In one embodiment, if a pixel value 1110 falls within moving average threshold 1104, moving average 1112 is updated by averaging the pixel value 1110 with the previous moving average 1112, resulting in an updated moving average 1112 and if a pixel value falls outside of moving average threshold 1104 (e.g., at event 1114), moving average 1112 is not updated. It should be appreciated that pixel value 1110 can be averaged with a number of previous values of moving average 1112, so as to control the impact of pixel value 1110 on moving average 1112. Updating moving average 1112, and thus void flags threshold 1102, allows for (e.g., slow) temporal evolution of factors impacting pixel signal values (e.g., temperature change). In the present embodiment, when an object is placed on the sensor, the change in signal due to this event is much faster than any slow temporal evolution. The timescale of the averaging should therefore be larger than the timescale of the signal change due to the sudden presence of an object. Furthermore, the time scale of the averaging is adapted to the expected timescale of the temporal evolutions, e.g., due to temperature changes. After event 1114, the average may be reset so as to obtain an accurate average as soon as possible.

In one embodiment, responsive to event 1114, determination of moving average 1112 is stopped so as to avoid influencing or modifying moving average 1112 by any signal due to an object on the sensor surface. The void flags threshold 1102 is set to capture an object being put on the sensor and the system can use a priori knowledge that whenever an object is set on the sensor, the only possible variation of the pixel level is either negative or positive. This a priori information can be used to build a non-symmetrical threshold detector.

It should be appreciated that one of ordinary skill in the art of signal processing would understand how to calculate a moving average from a set of temporal values of an input signal. For the sake of memory space and calculus cost, it may be beneficial to use a recursive filter to implement such a moving average.

This stage where the moving average is stopped is indicated by the horizontal line at event 1114 once the pixel value 1110 goes beyond moving average threshold 1104. Moving average 1112 may be stopped for all darkfield pixels when at least one pixel indicates that the signal was outside moving average threshold 1104. Alternatively, this decision may be made when a predefined portion (e.g. <20%) of the darkfield pixels indicated that the pixel value 1110 was outside moving average threshold 1104. Similar to void flags threshold 1102, moving average threshold 1104 may be defined by several methods. It is beneficial that moving average threshold 1104 is larger than void flags threshold 1102. As explained above, the moving average thresholding method may be symmetrical compared to the moving average, or may be asymmetrical. Note that in the case of an ultrasound sensor, when there is no object on the sensor surface, the signal intensity is high because the signal reflected from the sensor surface is high due to the high acoustic impedance at the boundary with the air. When an object is present on the sensor surface, some of the acoustic waves may enter into the object, and thus less signal is reflected. Although this is a matter of convention it is usual that a ridge or any object on the sensor generates a darker value compared to air. Therefore, when an object is present on the sensor surface, the signal decreases, as indicated in FIG. 11A.

FIG. 11A also shows that when the object/finger is removed, as indicated at event 1116, the signal intensity increases again. Once the signal is within moving average threshold 1104, the moving average 1112 is updated again, as illustrated. Furthermore, once the signal is within the void flags threshold 1102, the void flags are regenerated. The void flags threshold 1102 and moving average threshold 1104 may be different whether the sensor signal is within or outside the threshold, thereby creating some sort of hysteresis. It may be beneficial to allow for an evolving threshold for at least the moving average threshold 1104, to make it more probable to catch the moment when the sensor is void again.

Figure 11B:
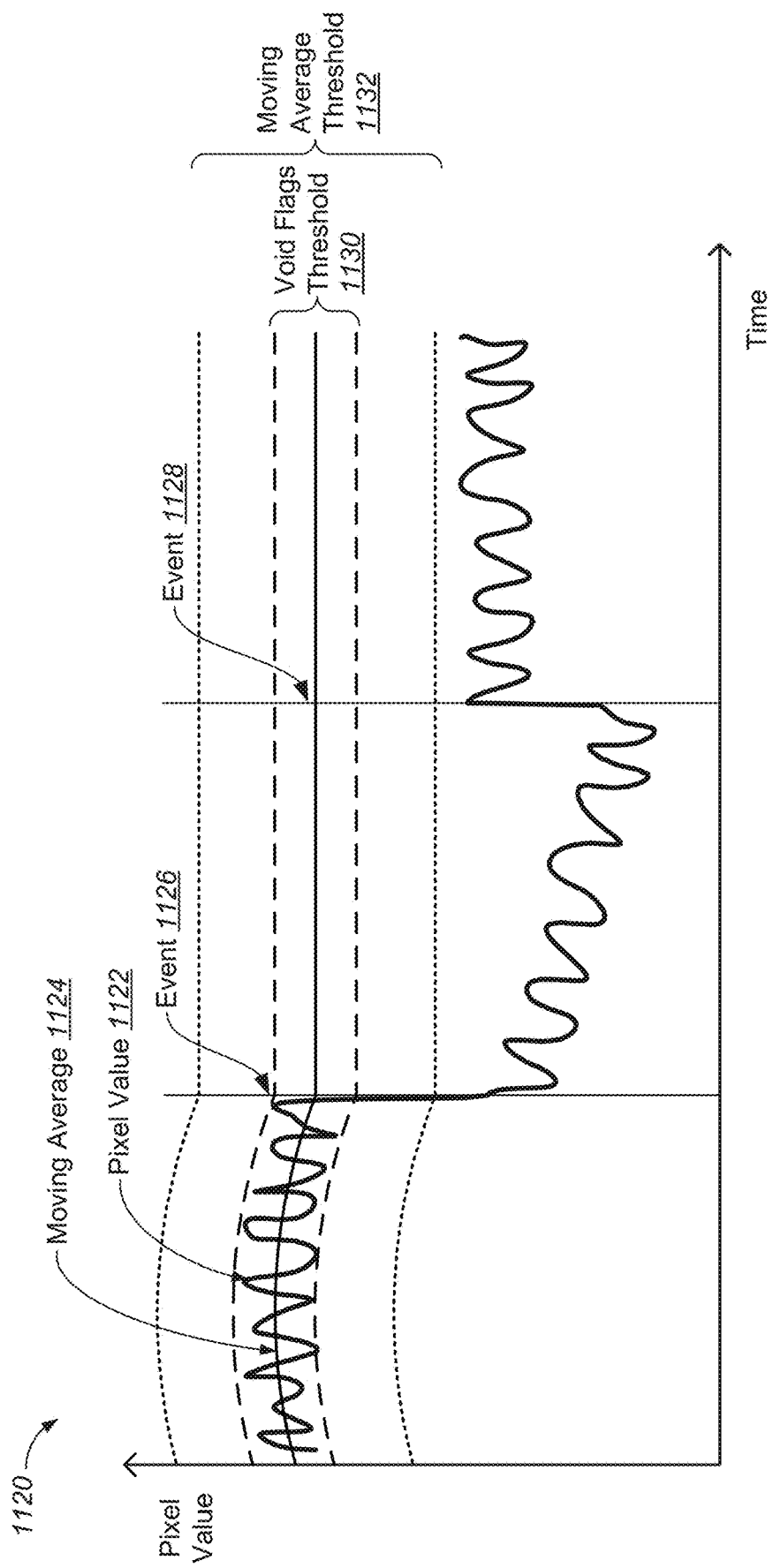

When a finger is in close contact with the sensor, the temperature of the sensor may change due to thermal conduction. This may increase or decrease the temperature of the sensor significantly, e.g., changing reflections within the sensor stack, so that the darkfield is affected. FIG. 11B shows an example graph 1120 of a signal value when a finger maintains contact with the sensor. Pixel value 1122 is received and tracked over time, where pixel value 1122 is the signal value for the pixel received from the sensor and moving average 1124 is the mean pixel value over time (e.g., running average). The pixel value 1122 of the sensor signal decreases over time, starting at event 1126 (finger contacts surface), due to changes in the sensor system caused by a temperature change. For example, the temperature change may change the properties of the material of the sensor and may change the speed of sound in the materials, and/or may create mechanical stress in the materials and so big enough mechanical distortions in these material, which can thereby impact reflections and the timing characteristics of the signal acquisition. When the finger is removed, as shown at event 1128, the temperature does not change immediately back to the value before the contact. As a consequence, when the finger is removed, the pixel value 1122 increases again, but the increase is not sufficient to get the signal within moving average threshold 1132. This means that the moving average 1124 is not activated, and the algorithm is blocked/frozen since the moving average is used for determining voids using void flags threshold 1130. The pixel value 1122 may slowly get back to within moving average threshold 1132 as the temperature slowly changes, however, these may cause the algorithm to not work properly for an unacceptable time period.

Figure 11C:
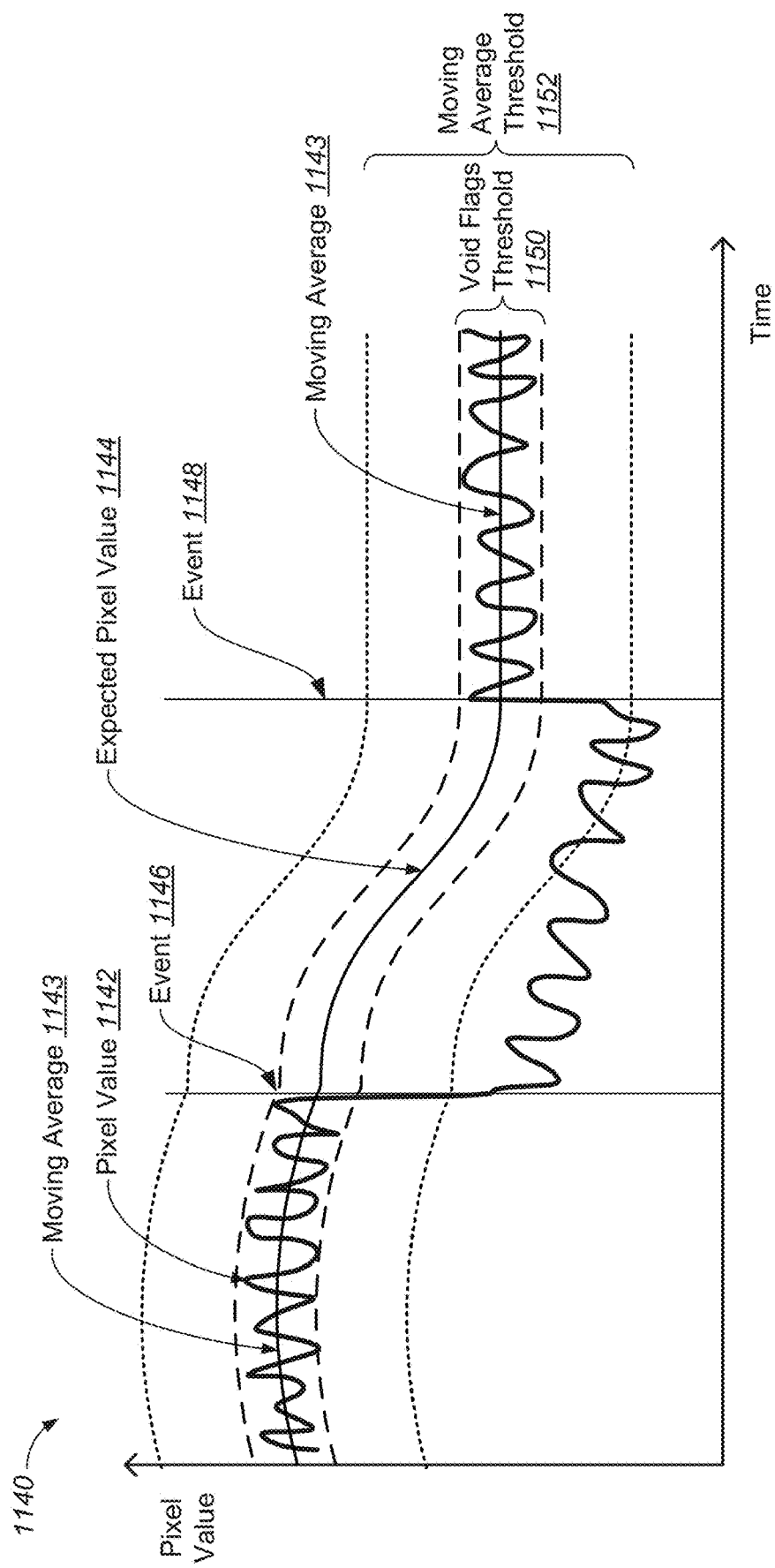

In another embodiment, the effect of the temperature on the moving average is predicted, as illustrated in graph 1140 of FIG. 11C. For example, in periods when the signal is within the void flags threshold 1150, the system may monitor the pixel value 1142 and the temperature change, and determine any possible correlation. As such, the expected pixel value 1144 for the darkfield pixels as a function of temperature is determined and stored. This correlation scheme can be obtained during normal use of the system or prior to the sensor system is launched in its final stage through a manufacturing calibration analysis step. If a strong enough correlation is found, the expected pixel value 1144 may be corrected for a change in temperature during the period of finger touch (e.g., between events 1146 and 1148). Void flags threshold 1150 is determined based on the expected pixel value 1144 when a finger is touching the sensor and is based on the moving average 1143 when a finger is not touching the sensor. When pixel value 1142 falls outside of moving average threshold 1152, moving average 1143 is not determined. The application of the correction may depend on the confidence in the correlation. These effects may be determined on a pixel basis, or on a sensor basis, e.g., by averaging effect for the different pixels. In such an embodiment, the expected pixel value 1144 and the associated void flags threshold 1150 would not be horizontal during the period of finger touch (between events 1146 and 1148), but would be modified based on the observed correlation, and follow the temperature dependence of the pixel value (sensor signal) 1142 more closely. Once the finger is lifted, as shown at event 1148, the algorithm would not be frozen because, if the correction was accurate enough, the pixel value 1142 would again be within the void flags threshold 1150.

Figure 11D:
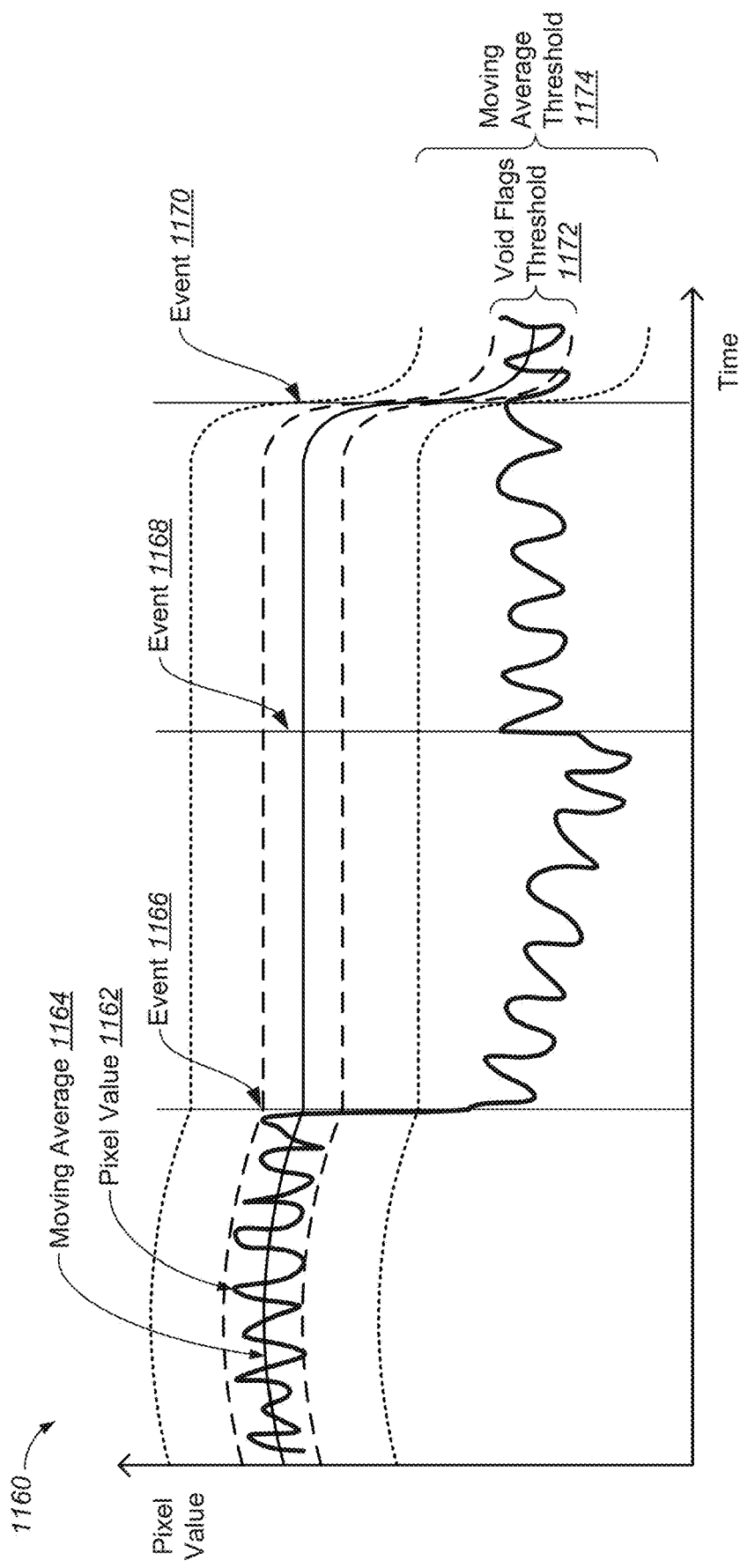

FIG. 11D illustrates an example graph 1160 of a signal value when a finger maintains contact with the sensor including a timer, according to embodiments. In some embodiment, a timer (e.g., 5-20 seconds) is introduced. It should be appreciated that the timer may be based on a predetermined time, e.g., the maximum time a user would be expected to keep their finger on the sensor, and may be dependent on the type of application being used and the context of the electronic device, e.g., activity of user, motion of device including the sensor. This timer is activated as soon as an object is detected on the sensor surface (at event 1166), as shown in FIG. 11C. This timer allows to reactivate the moving average 1164 after a predefined period, irrespective of the pixel value 1162. At event 1168 the object is removed from the sensor surface, but pixel value 1162 remains outside moving average threshold 1174. Using a timer, at event 1170 moving average 1164 acquisition is restarted, thereby adjusting void flags threshold 1172 and moving average threshold 1174. In one embodiment, upon the timer lapsing, a verification operation may be performed to analyze the image for characteristics of a fingerprint or object. If the verification operation indicates that a finger or other object is interacting with the sensor, the timer can be restarted or set for a longer time period to allow for the finger or object to be removed from the sensor.

In another embodiment, an Object up (or Finger up) detector is implemented within the sensor. This is to compensate for the possible drift in the pixel values during which an object has been put on the sensor as explained above and the need for a watchdog mechanism. The Object or Finger up detector is a reversed function of the Object or Finger down detector, that stops the moving average mechanism as soon as the current pixel value is outside the boundaries. Here, as soon as the moving average is stopped, a second moving average is initialized so as to capture the pixel average value while the first moving average is stopped and so when an Object or Finger is assumed on the sensor. The current pixel value is then compared, to the second moving average with a threshold principle similar to the thresholding explained above in FIGS. 11A through 11D. As soon as the current pixel value is considered outside the allowed boundaries, for the considered pixel, an Object or Finger up detection event is considered and can unblock the first moving average. A change in the second moving average (e.g., due to temperature variation) may also be used to correct to first moving average after the Object or Finger up event is detected. The boundaries/thresholds benefit again to be asymmetrical that is use the a priori information that Object or Finger lift will only increase the pixel value (according to the convention where a finger or object put on the sensor can only decrease the pixel value). So, with this option, either the pixel value back to the moving average threshold (as explained above) or the Object or Finger up detector explained here can reactivate the moving average and the void detector. The Object or Finger up detector will also benefit from a voting scheme for all the pixels that are used in the void detector.

Figure 11E:
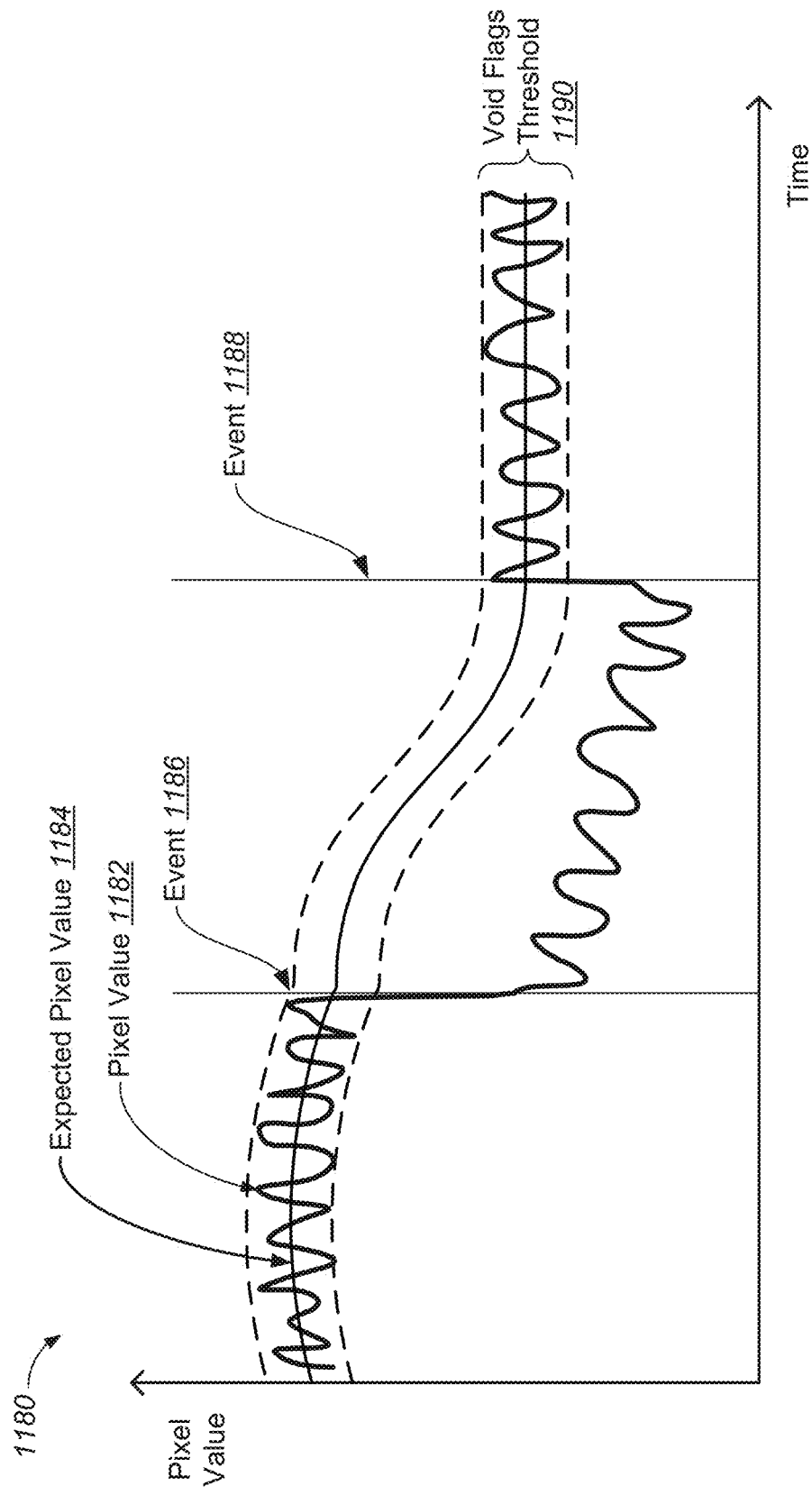

In another embodiment, temperature calibration of the subset of darkfield pixels used in the void detector is implemented. While the present embodiment is described as using temperature calibration, it should be appreciated that other parameters may be used in a similar manner. As discussed above, the expected pixel value of the darkfield pixels may be determined as a function of temperature. A table or other type of register is generated into which the expected darkfield values of the pixels are stored for each temperature or some temperature steps. This table consumes memory space, on one side, but remains very small compared to the more conventional principle to store all the darkfield values for all the pixels in the image for each temperature step. The expected darkfield pixels values as a function of temperature can be used to determine if an object is interacting with the sensor. FIG. 11E illustrates example graph 1180. The figure shows expected pixel value 1184 which changes over time as the temperature of the sensor changes. Expected pixel value 1184 is determined by measuring the temperature of the sensor, and then retrieving expected pixel value 1184 from memory based on the previously determined relation. The figure shows that when the finger is on the sensor, the temperature changes, e.g. by thermal conduction of the heat of the finger, which causes the expected pixel value to change. Void flags threshold 1190 is used in a similar matter as above to determine if an object is interacting with the sensor. When the pixel value is within void flags threshold 1190 around expected pixel value 1184, it is determined that no object is interacting with the sensor. On the other hand, when the pixel value is outside void flags threshold 1190 around expected pixel value 1184, for example at event 1186, it is determined that an object is interacting with the sensor. Because the expected pixel value is tracked as a function of temperature, when the finger is removed from the sensor, at event 1188, the pixel value falls again within void flags threshold 1190 around expected pixel value 1184, as seen in the figure. The void detector is so made robust to temperature changes, and the back to void state is also made robust. The temperature darkfield values can be filled in at some manufacturing calibration stage, or be filled in and updated during the product's life cycle. For example, when a void is detected and a temperature is read and is stable enough, the moving average value can be stored into the temperature pixel darkfield table. It can then be used either only for the back to void detection or whenever available for the non-void detection step. Combinations of the two techniques may be used depending on the context, application, and the reliability of the prediction of the expected darkfield pixel values. When reliable predictions can be made using the temperature, or even additional parameters, this technique can be very robust. In other embodiments, other techniques may be used to determine the expected darkfield value dependence on temperature, and other factors if needed. For example, in an initial stage imaging techniques may be used to determine if an object is interacting with the sensor, while the expected darkfield value dependence on temperature is determined. These imaging techniques consume more resources. However, as soon as the expected darkfield value dependence on temperature has been determined, the imaging techniques are no longer required.

It should be appreciated that for the void detector there should be a very high certainty that there is no object on the sensor before deciding to measure a darkfield. It is better to be conservative, and that when there is doubt, to decide not to declare a void is detected. This aspect is also illustrated by the fact that all darkfield pixels must be within the void flags threshold to indicate if a void is detected. Furthermore, it takes only one, or a few, pixels to be above the moving average threshold to stop the moving average in order to limit the change that an object on the sensor corrupts the darkfield image determination. The settings of the different threshold and conditions should reflect this principle. The settings may be adapted, e.g., to the different users, or the usage context.

Figure 12:
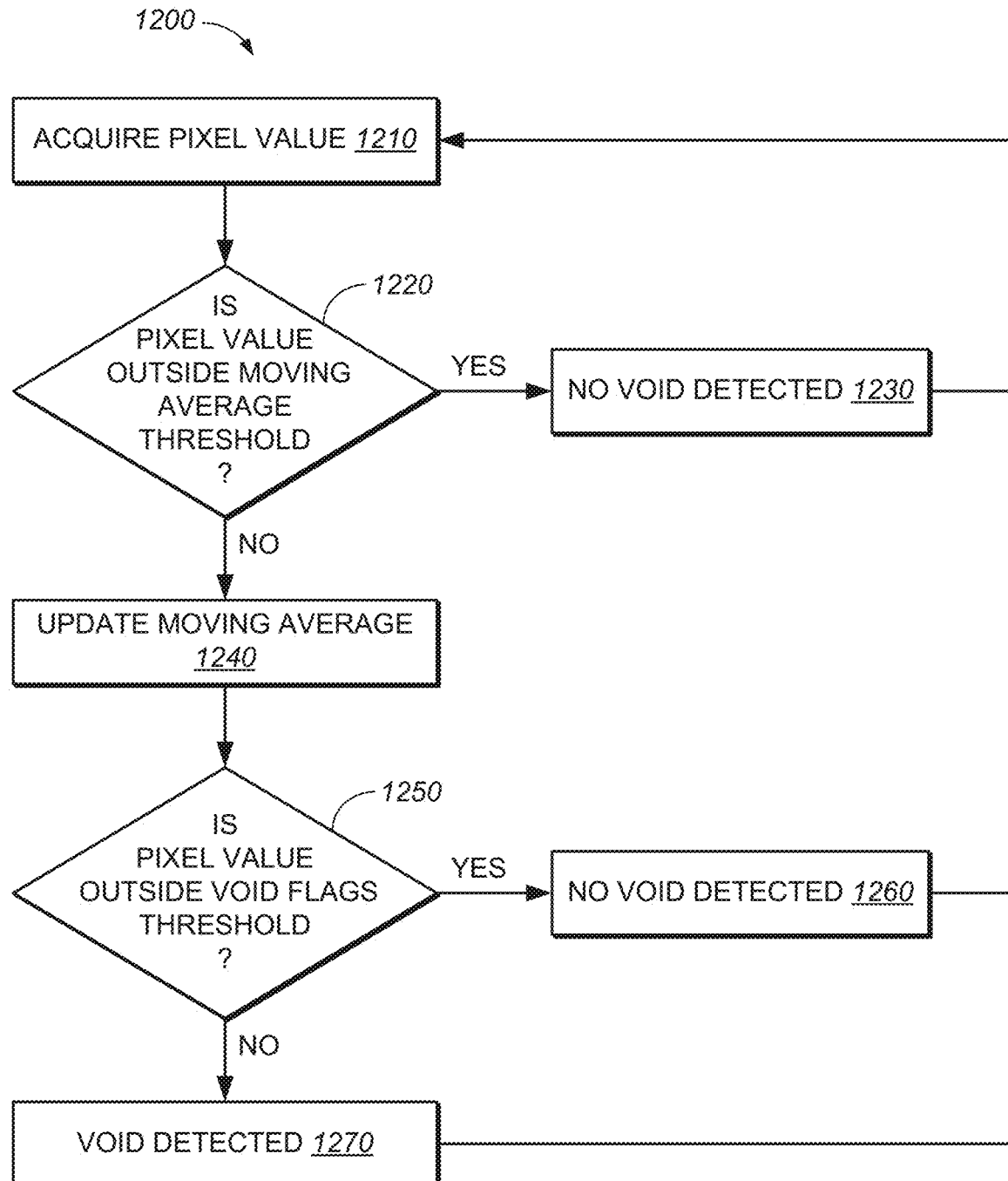
FIG. 12 illustrates a flow diagram of a method for void detection, according to various embodiments.

FIG. 12 illustrates a flow diagram 1200 of a method for void detection, according to various embodiments. It should be appreciated that not all procedures may be required, additional procedures may be performed, or the procedures may be performed in a different order. As is shown, at procedure 1210, the pixel value (sensor signal) is acquired for the darkfield pixels, e.g., in a continuous temporal manner. At procedure 1220, it is determined whether the pixel value is outside the moving average threshold. If the sensor signal is outside the moving average threshold, as shown at procedure 1230, no void is detected (an object is detected). Flow diagram 1200 then returns to procedure 1210. If the sensor signal is not outside the moving average threshold, as shown at procedure 1240, the moving average is updated.

At procedure 1250, it is determined whether the pixel value is outside the void flags threshold. If the sensor signal is outside the void flags threshold, as shown at procedure 1260, no void is detected (an object is detected). Flow diagram 1200 then returns to procedure 1210. If the sensor signal is not outside the void flags threshold, as shown at procedure 1270, a void is detected. Flow diagram 1200 then returns to procedure 1210. In one embodiment, a darkfield image is captured.

In some embodiments, after the void detector has determined a void status, and a darkfield candidate image has been captured, the darkfield may be merged with a previously determined darkfield image. It should be appreciated that capturing the darkfield candidate image may also be subject to satisfying a time delay since last darkfield capture or temperature change.

In one embodiment, as soon as the darkfield candidate image is captured, a test that the darkfield candidate image is indeed a darkfield image can be performed. This test can look for structures in the image to distinguish an actual darkfield image from a fingerprint image or an object Image. An additional darkfield quality verification step may be applied before merging the recently acquired darkfield candidate image. For example, an image analysis may be applied to scan for any image contribution that are not likely to constitute a darkfield. The image analysis may comprise looking for features resembling a fingerprint, or spatial frequencies related to a fingerprint. If such features are present, the darkfield candidate image may not be used, or used with a lesser weight. A darkfield quality factor may be determined, and the weight of the candidate darkfield in the merger may depend on the quality factor. The quality factor may also express a confidence in the fact that no object was detected. It may also be determined if the quality of the darkfield estimate will be negatively affected by the merger of the darkfield candidate image, and based on this determination, the weight of the darkfield candidate image may be adapted. The stored darkfield estimate may be subtracted from the recently acquired darkfield candidate image, since this represent the latest acquired image of the sensor. If the darkfield procedure is working properly, the so obtained corrected image should be nearly uniform but for a small contribution. The uniformity of quality of the image may be determined to analysis the quality of the darkfield correction, and any issue or errors may be used as feedback to automatically adapt the darkfield correction process.

In one embodiment, the darkfield estimate is updated. In some embodiments, only the last acquired darkfield candidate image may be used, without performing any merging. In other embodiments, the darkfield candidate image is merged with previously recorded darkfield images as the darkfield estimate. The darkfield estimate provides a gradual evolution of the darkfield and allows for a reduction of the temporal noise that is captured with the darkfield candidate image. The merging may be implemented as averaging the darkfield candidate image into the darkfield estimate. This may reduce, or remove, the temporal noise contribution. Many different types of averaging or merging may be used. For example, a recursive average filter may be used where the latest darkfield candidate image contribute with more weight than older darkfield candidate images.

In some embodiments, after the darkfield candidate image is merged with the darkfield estimate, and the darkfield estimate is stored, the stored darkfield estimate may be used in the darkfield correction of acquired images containing a fingerprint. Once the sensor determines that a finger is present on the sensor, and that a fingerprint image is acquired, the stored darkfield estimate may be subtracted from the fingerprint image to perform the darkfield correction. A quality verification may be applied to make sure the darkfield correction actually improves the image quality of the fingerprint image. For example, the CNR of the ridge/valley pattern should improve due to the darkfield correction.

Example Operations for Darkfield Tracking

Figure 13:
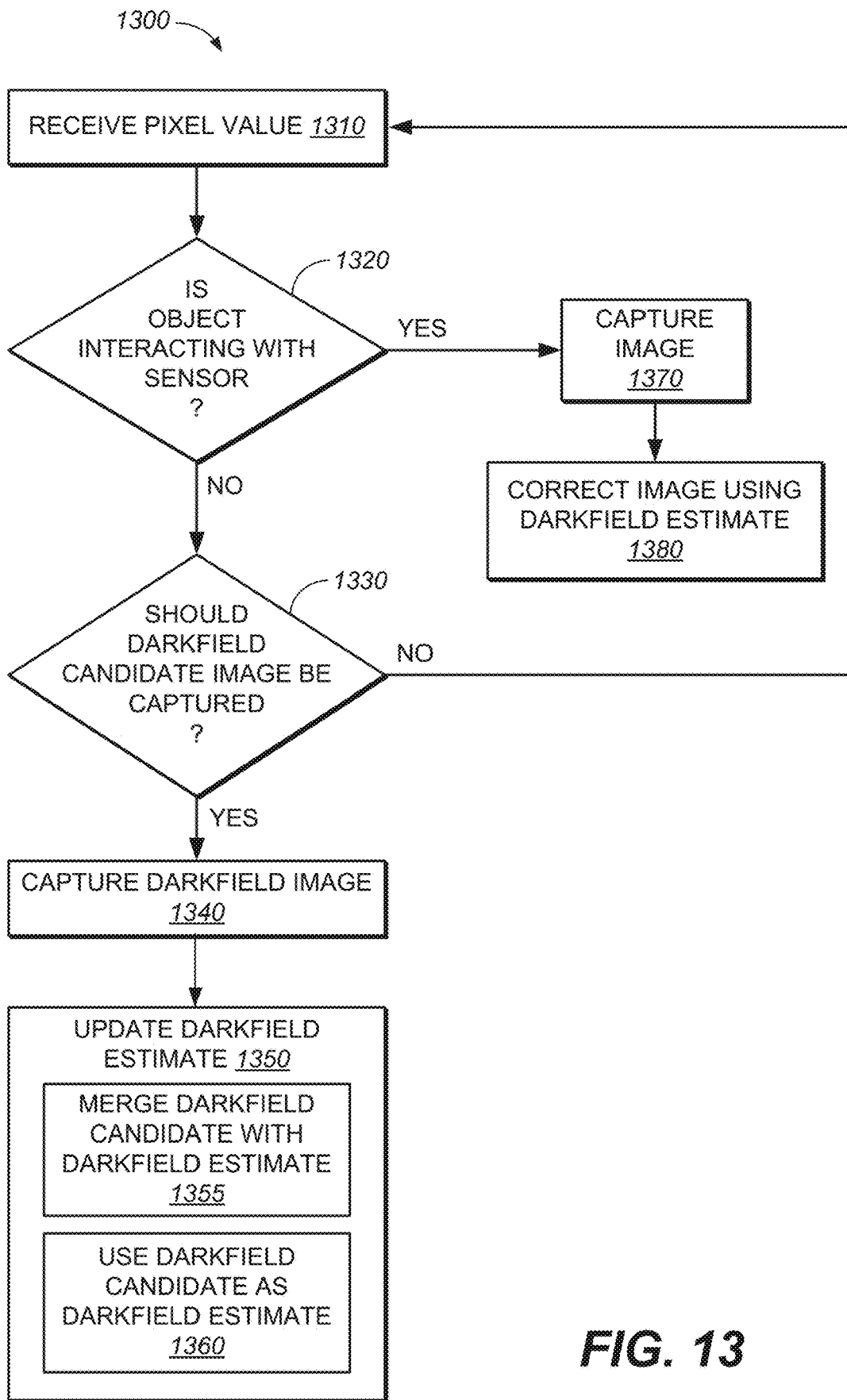
FIG. 13 illustrates a flow diagram of a method for darkfield tracking, according to various embodiments.
Figure 14:
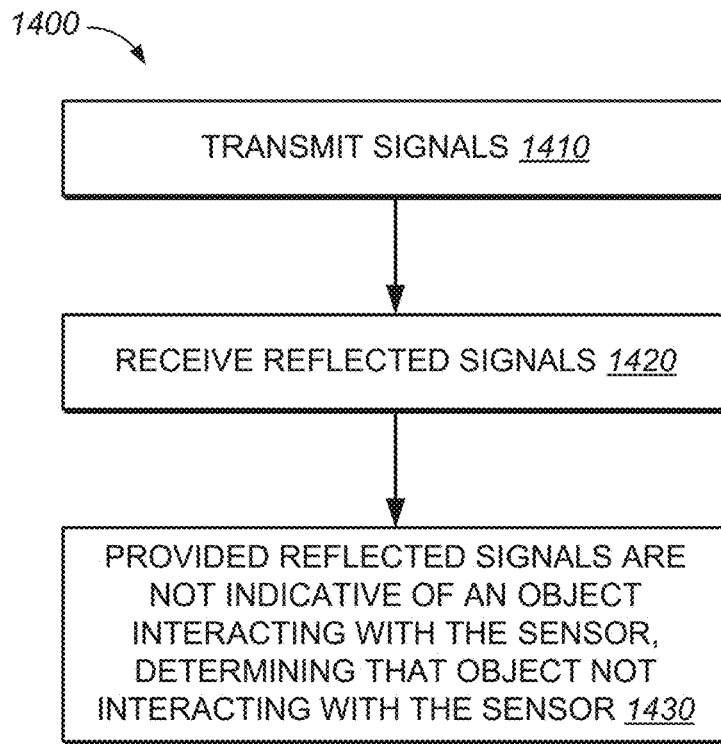
FIG. 14 illustrates a flow diagram an example method for determining whether an object is interacting with the sensor.
Figure 15:
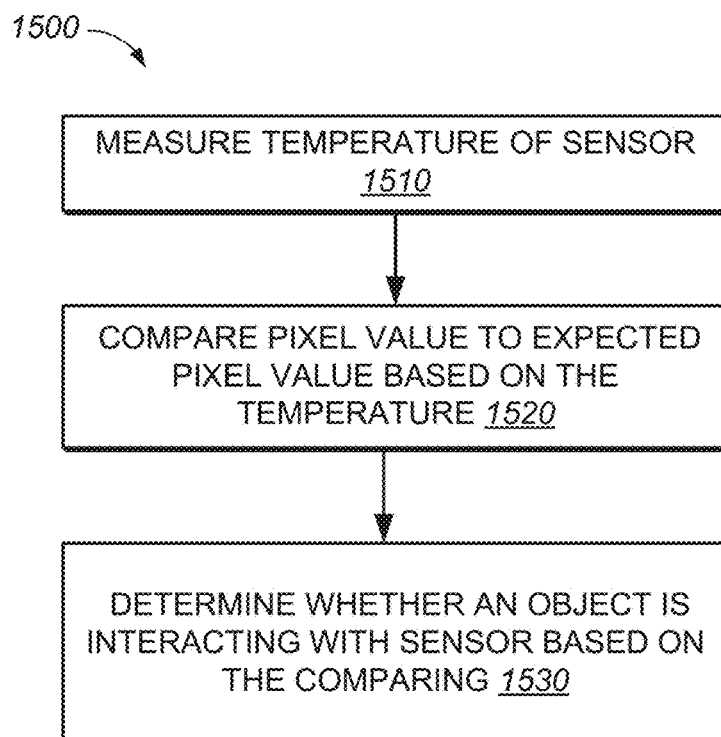
FIG. 15 illustrates a flow diagram another example method for determining whether an object is interacting with the sensor.

FIGS. 13 through 15 illustrate flow diagrams of example methods for darkfield tracking according to various embodiments. Procedures of these methods will be described with reference to elements and/or components of various figures described herein. It is appreciated that in some embodiments, the procedures may be performed in a different order than described, that some of the described procedures may not be performed, and/or that one or more additional procedures to those described may be performed. The flow diagrams include some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

With reference to FIG, 13, flow diagram 1300 illustrates an example method for darkfield tracking, according to various embodiments. In one embodiment, the method of flow diagram 1300 is performed at a fingerprint sensor. At procedure 1310 of flow diagram 1300, a pixel value is received. At procedure 1320, it is determined whether an object is interacting with the sensor. In one embodiment, procedure 1320 is performed according to flow diagram 1400 of FIG. 14. In another embodiment, procedure 1320 is performed according to flow diagram 1500 of FIG. 15.

Flow diagram 1400 if FIG. 14 illustrates an example method for determining whether an object is interacting with the sensor. At procedure 1410, signals are transmitted at ultrasonic transducers of the ultrasonic sensor. At procedure 1420, reflected signals are received at ultrasonic transducers of the ultrasonic sensor. At procedure 1430, provided the signals are not indicative of an object interacting with the ultrasonic sensor, it is determined that an object is not interacting with the ultrasonic sensor. In one embodiment, the reflected signals are compared to a void flags threshold around a moving average. Provided the reflected signals are within the void flags threshold, it is determined that the reflected signals are not indicative of an object interacting with the ultrasonic sensor. In one embodiment, the moving average is updated provided the signals are within a moving average threshold, wherein the moving average threshold is larger than the void flags threshold. In one embodiment, provided the reflected signals are within the void flags threshold, a determination is made that an object is not interacting with the ultrasonic sensor and that a darkfield candidate image can be captured at the sensor. Similar embodiments are described above with reference to flow diagram 1200 of FIG. 12. In one embodiment, provided an object is interacting with the sensor, an object lifting signal is generated when it is determined the object is no longer interacting with the sensor.

In one embodiment, provided an object is interacting with the sensor, a determination is made that a darkfield candidate image cannot be captured at the sensor. In one embodiment, responsive to making the determination that a darkfield candidate image cannot be captured at the sensor, a timer is activated. Responsive to a predetermined period of the timer lapsing, the determining whether an object is interacting with the sensor is repeated. In another embodiment, responsive to making the determination that a darkfield candidate image cannot be captured at the sensor, a signal received at the sensor is compared to a sensor temperature correlation scheme. Signal thresholds are modified according to the sensor temperature correlation scheme during the determining whether an object is interacting with the sensor. In one embodiment, an expected signal value as described in FIG. 11C can be used.

Flow diagram 1500 of FIG. 15 illustrates another example method for determining whether an object is interacting with the sensor, At procedure 1510, a temperature of the sensor is measured. At procedure 1520, the pixel value (e.g., received at procedure 1310) is compared to an expected pixel value based on the temperature. At procedure 1530, it is determined whether an object is interacting with the sensor based on the comparing the pixel value to an expected pixel value based on the temperature of the sensor. In one embodiment, a pixel value is received for a plurality of pixels.

With reference to FIG. 13, if it is determined that an object is not interacting with the sensor, flow diagram 1300 proceeds to procedure 1330. At procedure 1330, it is determined whether to capture a darkfield candidate image at the sensor based at least in part on the determination that a darkfield candidate image can be captured at the sensor. In one embodiment, the determination to capture the darkfield candidate image is also based at least in part on making a determination that a minimum amount of time has passed since a most recent darkfield candidate image capture. For example, if a darkfield candidate image was recently captured, it may not be necessary to capture another darkfield candidate image as there would be none or negligible changes. In another embodiment, the determination to capture the darkfield candidate image is also based at least in part on making a determination that a temperature change since a most recent darkfield candidate image capture has exceeded a temperature threshold. For example, if the temperature has been relatively constant, it may not be necessary to capture another darkfield candidate image as there would be none or negligible changes. It should be appreciated that in some embodiments, the determination to capture the darkfield candidate image may be based on a combination of time passed since the last darkfield candidate image was captured and the temperature of the sensor.

In one embodiment, provided an object is not interacting with the sensor, a temperature of the sensor is determined. The temperature is associated with a corresponding pixel value. The temperature and pixel value pair are then stored, e.g., as an expected pixel value. For example, the temperature and pixel value pair can be used in determining an expected pixel value of flow diagram 1500.

If it is not determined that a darkfield candidate image should be captured, flow diagram 1300 returns to procedure 1310. In one embodiment, flow diagram 1300 delays the performance of procedure 1310 a predetermined time period, e.g., to ensure that enough time has passed that a darkfield candidate image could be captured, given satisfaction of other conditions. If it is determined that a darkfield candidate image should be captured, flow diagram 1300 proceeds to procedure 1340.

At procedure 1340, a darkfield image is captured as a darkfield candidate image, where a. darkfield image is an image absent an object interacting with the sensor. At procedure 1350, the darkfield estimate is updated with the darkfield candidate image. In one embodiment, as shown at procedure 1355, the darkfield candidate image is merged with the darkfield estimate. In one embodiment, as shown at procedure 1360, provided the darkfield estimate is not stored, the darkfield candidate image is stored as the darkfield estimate.

In one embodiment, if it is determined that an object is interacting with the sensor at procedure 1320, flow diagram 1300 also proceeds to procedure 1370, where an image of the object is captured. In one embodiment, where the object is a finger, a fingerprint image is captured. At procedure 1380, the image is corrected using the darkfield estimate.

Example Darkfield Modeling

As presented above, one way to determine the darkfield image for a sensor is to capture an image when there is no finger present on the sensor. The darkfield image can be subtracted from a fingerprint image to correct for the variations from the background. In an ideal case, a darkfield image would be captured immediately before the user puts his or her finger on the sensor, and this background image would then be used to correct the fingerprint image. However, it is difficult to anticipate a moment immediately prior to a finger being placed on the sensor. Furthermore, darkfield images are dependent on the operational conditions or operating parameters of the sensor, e.g., the temperature of the sensor. For instance, one factor causing the temperature dependence is the fact that the speed of sound is temperature dependent. When the speed of sound changes, this may impact the timing of the sensor image capture. Therefore, when the user puts his or her finger on the sensor, the sensor temperature changes due to thermal conduction, and consequently the darkfield image may change. However, the darkfield image cannot be captured while the user finger is present. Embodiments provided herein provide for the prediction of the darkfield image for situations when capturing a background image is not possible, e.g., when an object or finger is present on the sensor and when the temperature change is significant resulting in a change to the darkfield image.

Embodiments described herein provide an ultrasonic sensor comprised of a two-dimensional array of ultrasonic transducers (e.g., PMUTs). In some embodiments, the ultrasonic fingerprint sensor is comprised of multiple layers, e.g., a CMOS layer, an ultrasonic transducer layer, an epoxy layer, and adhesion layer, and a contact layer where the user presses the finger. The layers are combined to form a package or stack forming the sensor. An example fingerprint sensor package is described above in accordance with FIGS. 1A through 7B. The principles discussed below may also be applied to other type of multi-layered sensors, where the two-dimensional array of ultrasonic transducers is replaced by other means of generating and or receiving ultrasonic signals. For example, piezoelectric films or piezoelectric bulb material may be used instead of the two-dimensional array of ultrasonic transducers.

Non-uniformities of the darkfield image may be caused by the package variations that result in pixel-to-pixel acoustic path difference during capture of the darkfield image. Theoretically, these variations can be calibrated out (if within the specified tolerances) at a single temperature. However, for an ultrasound fingerprint sensor, the transmitted wave may be reflected off any interface (material change in the path, or acoustic impedance change) that is in the acoustic path of the signal. For example, if the two layers on each side of the interface have different acoustic properties that results in a large acoustic impedance mismatch, a significant portion of the signal may be reflected. Such reflections can create non-uniformity within the background images because the interface may not be uniform. Furthermore, the time-of-flight (ToF) for the different interfaces/layers may change with the temperature variations, e.g., in the same direction or in opposite directions. The superposition of these interfacial reflection backgrounds creates backgrounds with phases and amplitudes that vary over temperature. The embodiments described herein provide methods and techniques to reconstruct background images, and their temperature dependence, based on interfacial reflections.

Figure 16:
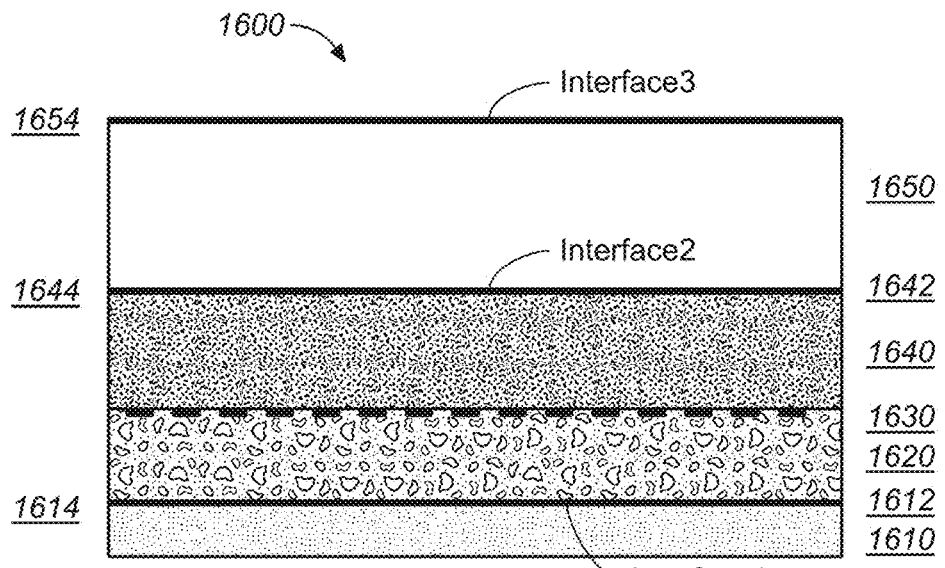
FIG. 16 illustrates an example fingerprint sensor comprising multiple layers, according to embodiments.

FIG. 16 illustrates an example fingerprint sensor 1600 comprising multiple layers. It should be appreciated that some or all of the different layers may have different acoustic properties, e.g., different acoustic impedances. Interfacial reflections may occur when a difference in acoustic impedance exist, e.g., an acoustic impedance mismatch occurs. When the impedance difference is small, no significant interfacial reflections occur. FIG. 16 illustrates an example fingerprint sensor 1600 where three different interfaces between layers are indicated which may give result in interfacial reflections and contributing to non-uniformities in the background image during darkfield capture operations.

Fingerprint sensor 1600 includes substrate 1610, CMOS layer 1620, sensing layer 1630, acoustic coupling layer 1640, and contact layer 1650. In some embodiments, fingerprint sensor 1600 also includes adhesion layer 1612 at the interface 1614 of substrate 1610 and CMOS layer 1620 and adhesion layer 1642 at the interface 1644 of acoustic coupling layer 1640 and contact layer 1650. A third interface 1654 is illustrated at the interface between contact layer 1650 and ambient air.

Embodiments described herein provide a sensing layer 1630 comprised of a two-dimensional array of ultrasonic transducers (e.g., PMUTs). Although embodiments are described with respect to an array of ultrasonic transducers, the methods and techniques may be applied to other ultrasound sensing architectures where the control of the operational conditions or operating parameters of different segments of the sensors can be adjusted separately. For example, in some embodiments, sensing layer 1630 may be comprised of multiple layers, where one layer is for transmitting ultrasonic signals and another layer is for receiving reflected ultrasonic signals.

During operation of fingerprint sensor 1600, sensing layer 1630, under the control of CMOS layer 1620, transmits ultrasonic signals through acoustic coupling layer 1640, adhesion layer 1642, and contact layer 1650. In some embodiments, ultrasonic signals are also transmitted through CMOS layer 1620, adhesion layer 1612, and substrate 1610. Sensing layer 1630 then receives reflected ultrasonic signals via the same transmission paths, passing through the same layers and interfaces. It should be appreciated that the transmission properties of each layer of fingerprint sensor 1600 may be different, and that the ultrasonic signals can be reflected at the interfaces, due to different materials of the different layers and/or the acoustic impedance change between the layers at the interfaces. Moreover, the ToF for the different layers and interfaces may be impacted by temperature changes of fingerprint sensor 1600, thus impacting the timing of the sensor. For example, a finger being placed on contact layer 1650 may cause a change in the temperature of fingerprint sensor 1600.

Figure 17:
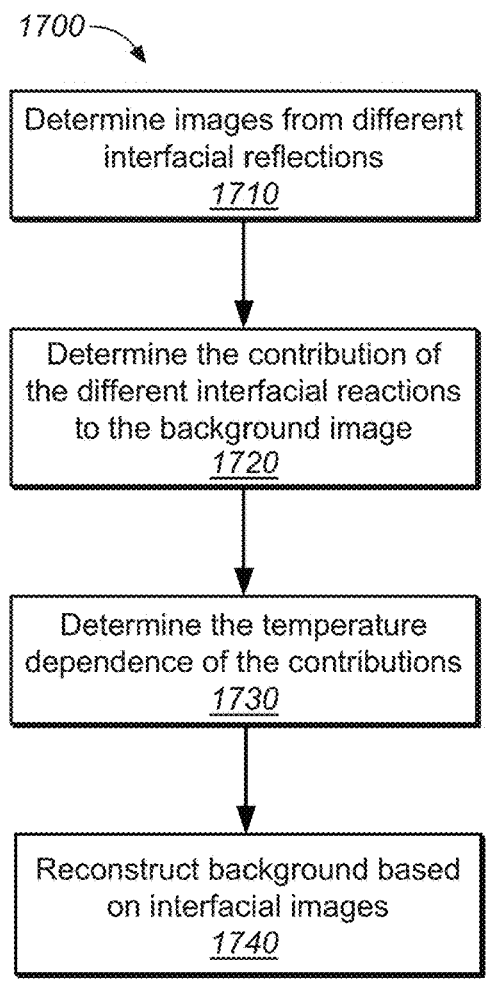
FIG. 17 illustrates a flow diagram of the procedures to predict and reconstruct the darkfield image over varying temperature, according to embodiments.

FIG. 17 illustrates a flow diagram 1700 of the procedures to predict and reconstruct the darkfield image over varying temperature. At procedure 1710, a plurality of base darkfield images are determined for different conditions. In one embodiment, the plurality of darkfield images is captured at different ToF windows. This may be done at a single fixed temperature, e.g., at room temperature, or for a series of temperatures covering a desired temperature range. Alternatively, the plurality of darkfield images at different ToF windows are determined for different temperatures, and are then averaged over a temperature range. Based on the intensity of the reflections and ToF the main contributions representing interfacial reflection pattern can be determined with minimum correlation. In one embodiment, the minimum number of darkfield images is equal to the number of interfaces of the sensor. For example, considering too many darkfield images can result in overfitting and loss of robustness of the fitted values for image weights in the superposition. The full ToF window is divided into different segments that cover the different interfacial reflections. Moreover, in some embodiments, other reflection within the layers, e.g., due to impurities, may also be covered in the different ToF segments. In general, embodiments described herein divide the reflections that contribute to the darkfield image into various reflection components such that the contributions of these different reflection components can be predicted over temperature to reconstruct the darkfield image at any temperature. It should be appreciated that prior to capturing the plurality of darkfield images, it should be confirmed that no object is on the surface (e.g., void detection).

In one embodiment, the determination to model the darkfield candidate image is also based at least in part on making a determination that a minimum amount of time has passed since a most recent darkfield candidate image modeling. For example, if a darkfield candidate image was recently modeled, it may not be necessary to capture another darkfield candidate image as there would be none or negligible changes. In another embodiment, the determination to model the darkfield candidate image is also based at least in part on making a determination that a temperature change since a most recent darkfield candidate image model has exceeded a temperature threshold. For example, if the temperature has been relatively constant, it may not be necessary to model another darkfield candidate image as there would be none or negligible changes. It should be appreciated that in some embodiments, the determination to model the darkfield candidate image may be based on a combination of time passed since the last darkfield candidate image was modeled and the temperature of the sensor.

At procedure 1720, the contribution of the different darkfield images to the modeled darkfield image is determined. As described in Equation 1, the darkfield image $IMG_{BG}$ may be defined as a sum of a series of background images caused by different interfacial reflections (linear superposition):

$$IMG_{BG} = \Sigma C_i(T) * IMG_{BG,i} \qquad (1)$$

where $IMG_{BG,i}$ is the contribution to the darkfield image due to interfacial reflection at interface i, and $C_i(T)$ represents the contribution coefficient for $IMG_{BG,i}$ to the complete or estimated darkfield image $IMG_{BG}$. It is assumed herein that the darkfield image $IMG_{BG,i}$ does not change over temperature (e.g., the base pattern remains the same), only its contribution to the complete darkfield image changes, represented by temperature dependence of $C_i$. Although not shown, different of additional operational conditions or parameters may be used to model the contribution coefficients. Alternative embodiments exist where the darkfield images $IMG_{BG,i}$ may also have a temperature dependence. Procedure 1720 can be done by an optimization algorithm to minimize the difference between the measured darkfield image and the reconstructed darkfield image. For example, the optimization algorithm may minimize the difference between the measured darkfield and the reconstructed darkfield, or may minimize the nonuniformity of the constructed darkfield image or nonuniformity of the difference. $IMG_{BG}$ may represent the full sensor image, or $IMG_{BG}$ may represent a partial sensor or subset of transducers/pixels, so that the process is performed in parallel for different sections of the sensor.

Once the constants $C_i$ have been determined at one temperature, their temperature dependence is determined at procedure 1730. In one embodiments, procedure 1730 is performed by repeating the procedure 1720 at different temperatures. Although not shown, different of additional operational conditions or parameters may be used. Thus, at each temperature the contributions of the different interfacial reflections are determined. At procedure 1740, the darkfield image is modeled (e.g., reconstructed) based on the interfacial background images. For example, the typical range of temperature under which the device may be operated maybe from −20 degrees Celsius to 60 degrees Celsius.

Figure 18A:
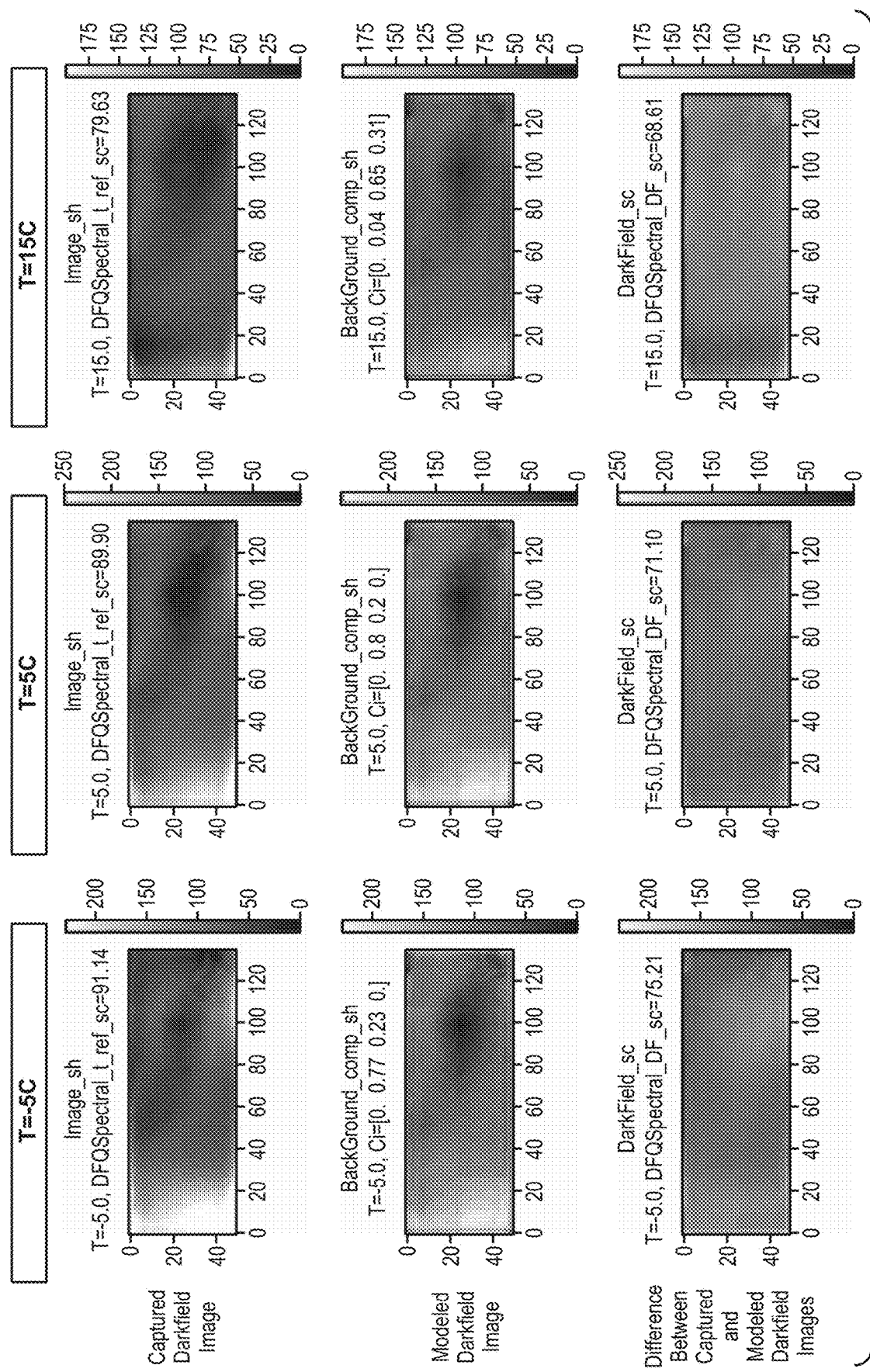
FIGS. 18A and 18B illustrate an example modeling of the background image of FIG. 17, according to embodiments.
Figure 18B:
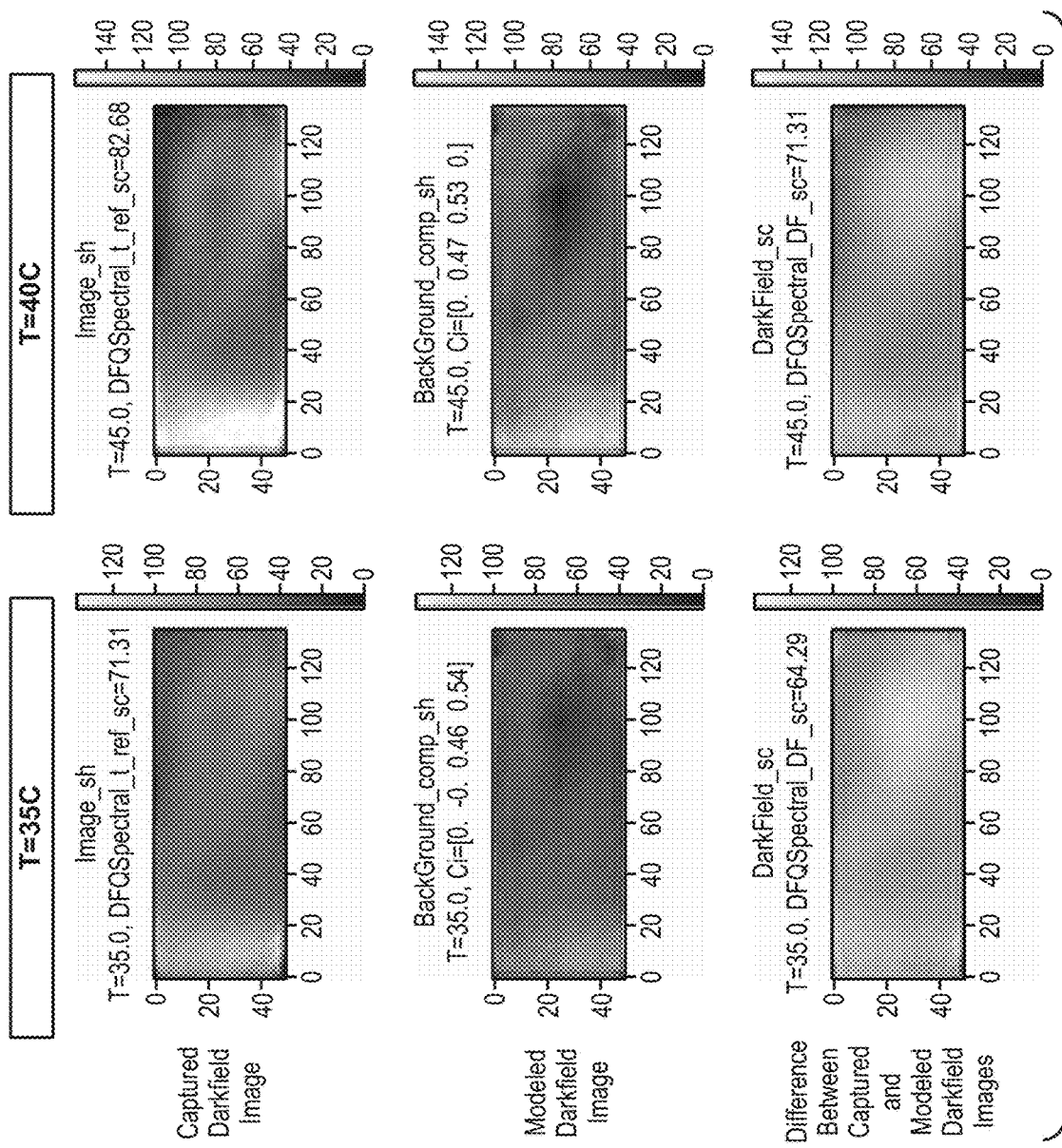

FIGS. 18A and 18B illustrate an example modeling of the background image described in flow diagram 1700. The first row of images in FIGS. 18A and 18B show the actual measured darkfield over temperature, the second row shows the reconstructed/modeled darkfield image over temperature, and the third row is the difference between measured darkfield image and the reconstructed/modeled darkfield image. The third row thus represents the remaining error/background image that could not be corrected for. If the darkfield image is correctly modeled, the difference between the modeled and measured darkfield image is small, and the difference image between the modeled and measured darkfield image is nearly uniform. If the darkfield image is not correctly modeled, the difference between the modeled and measured darkfield image increases, and the difference image between the modeled and measured darkfield image is increasingly nonuniform. Therefore, the nonuniformity of the difference image can be used as a measure for the quality of the darkfield modeling.

Figure 19:
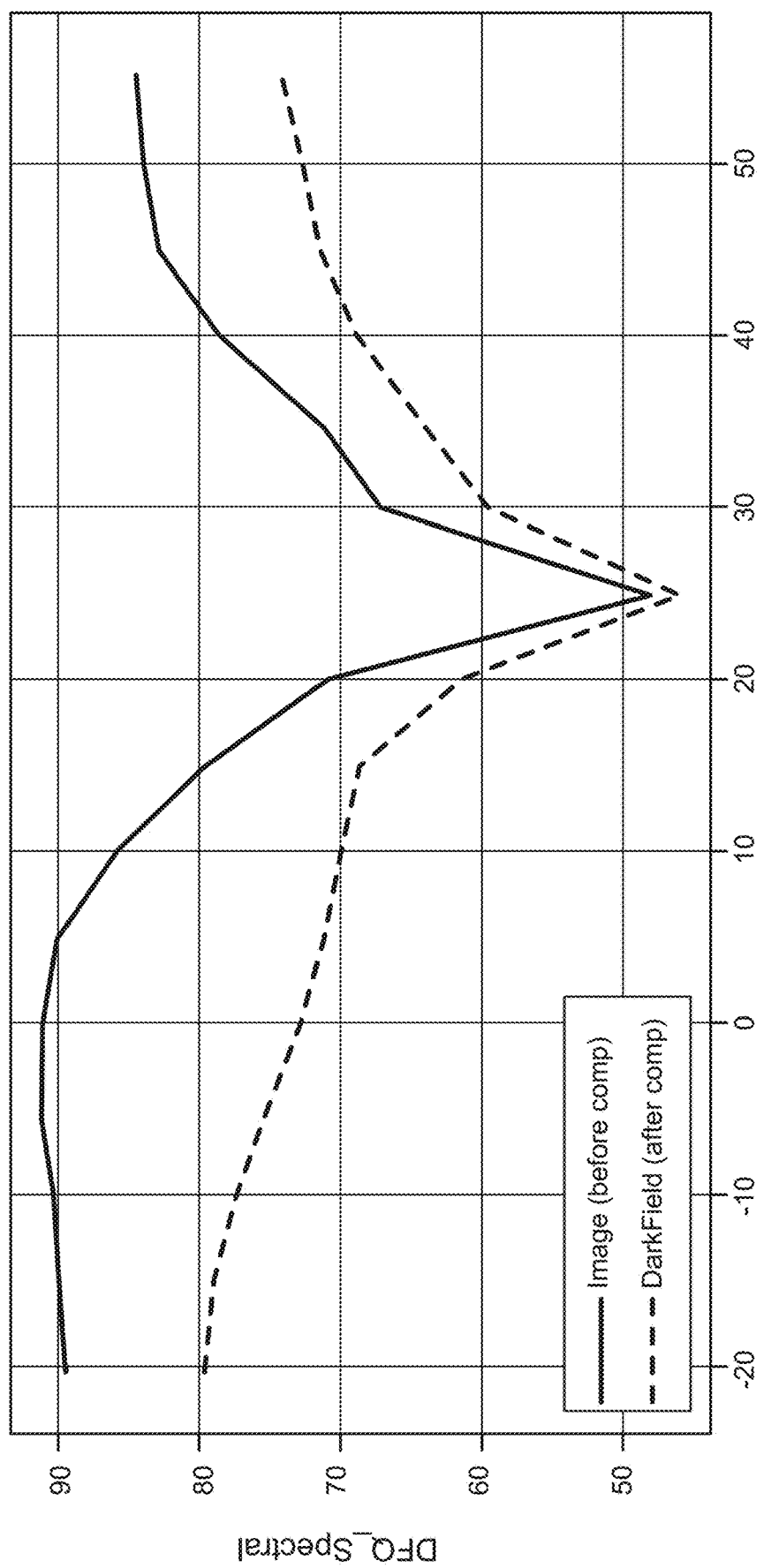
FIG. 19 illustrates an example graph of the Darkfield Field Quality (DFQ) Spectral improvement over temperature, according to embodiments.

FIG. 19 illustrates the Darkfield Field Quality (DFQ) Spectral improvement over temperature under the described embodiments, where the DFQ spectral parameter is a measure of the nonuniformity of the image. FIG. 19 shows the decrease of the nonuniformity after the darkfield correction. The minimum at 25 degrees Celsius is due to the fact that the base darkfield images $IMG_{BG,I}$ have been determined at 25 degrees Celsius, and thus the best reconstruction can be performed at that temperature. If, according to some embodiments, the base darkfield images $IMG_{BG,I}$ are averaged over a temperature range, the spectral improvement would be more uniform. A nonuniformity parameter may be used as an indication of the accuracy of the modeling and thus the accuracy of, and/or confidence in, the darkfield correction. The confidence factor may then be used to control the application of the reconstructed darkfield image. For example, if the confidence is high, the above described principles may be used to correct for the darkfield when a finger is present. On the other hand, if the confidence is low, the above described principles may not be sufficiently accurate, and the modeled darkfield may not be used at all, or more weight may be given to the last captured darkfield in a combination.

In some embodiments, the base darkfield images may not represent the different interfacial contributions, but rather represent darkfield images acquired at different temperatures. The concept here is that a darkfield at any temperature can be estimated or approximated by a combination of darkfield images at other temperatures.

Figure 20:
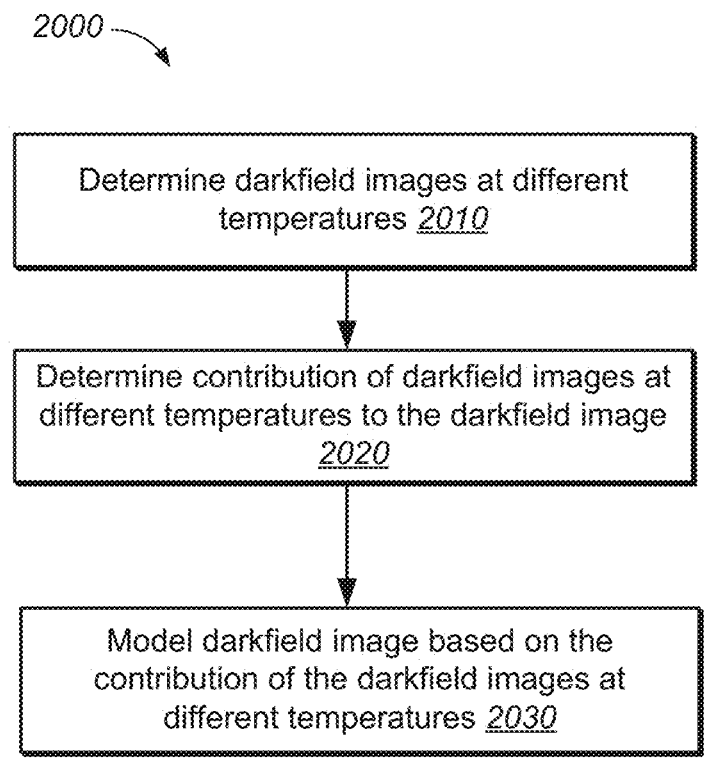
FIG. 20 illustrates a flow diagram of a process for modeling a darkfield image over varying temperature, according to an embodiment.

FIG. 20 illustrates a flow diagram 2000 of a process for modeling a darkfield image over varying temperature, according to another embodiment. As in the embodiments discussed above, and as shown at procedure 2010, the base darkfield images at different temperatures may be determined in a controlled calibration process, or may be determined opportunistically. For example, base darkfield images may be determined over a range from −20 degrees Celsius to 60 degrees Celsius, e.g., with a step of 5 or 10 degrees Celsius.

At procedure 2020, the contribution of the different darkfield images to the modeled darkfield image is determined. For example, if base darkfield images exist at 20 degrees Celsius and 30 degrees Celsius, the darkfield can be modeled for a temperature in between by a weighted combination of both darkfield images (or other darkfield images at other temperatures). The weights/coefficient may be determined and verified by comparing modeled and measured darkfield. images. If darkfield images at different temperature resemble too much (small difference), some of the darkfield images at some temperature may not need to be used because it would require additional image storages with no significant benefit.

At procedure 2030, the modeled darkfield is generated based on the measured darkfield images at different temperatures. In some embodiments, the darkfield images are not acquired and/or stored at a full resolution, and the pixels not measured/stored may be estimated based on surrounding pixels when the darkfield correction is performed.

It should be appreciated that the temperature dependence of the different contributions is determined so that this information can be used to predict and model the darkfield image at any temperature while considering any temperature change when the user is touching the sensor. The temperature dependence can be determined using controlled temperature condition, e.g., during a manufacturing, characterization, or calibration stage using a temperature chamber where the temperature of the sensor can be controlled. Alternatively, the contribution calculations at different temperatures can be done in an opportunistic way. When the sensor is at a certain temperature, and there is nothing touching the sensor, flow diagram 1700 can be performed to determine the contributions of the different interfacial reflections at that temperature. To avoid measuring while there are temperature gradients over the sensor package, the temperature change should not be too fast or large. As more and more situations with the sensor at different temperatures are encountered, the temperature dependence is determined over a larger range, or with more accuracy, if the darkfield image needs to be modeled at a temperature that has not been measured yet, the contributions may be interpolated or extrapolated, or determined in any other way using the already known contribution coefficients.

In an alternative embodiment, the contribution coefficients and their temperature dependence may be determined for a collection of sensors, e.g., for one or a few sensors in a production batch, and then the coefficient may be applied to all the sensors in the batch if the coefficients are comparable for the different sensors. This means that the interfacial reflections will be determined for each sensor, but that their relative contributions and the temperature dependences will be assumed to be similar for all sensors in a production batch. The assumption here is that the base darkfield images may differ between different sensors, but that the coefficient and/or the temperature dependence of the coefficients is comparable for the collection of sensors. These assumptions may be validated during the life of the sensor, by performing the actual measurements opportunistically at different temperatures as explained above. The coefficient and the temperature dependence are stored on the sensor and retrieved during the modeling process, in combination with the base darkfield images as determined for the sensor.

Figure 21:
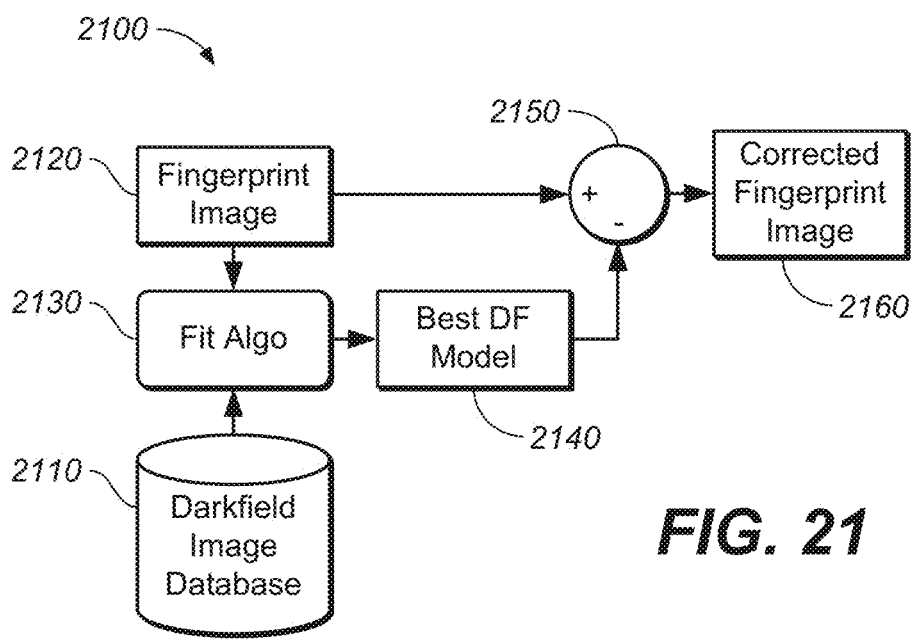
FIG. 21 illustrates an example system for modeling a darkfield image based on a best fit model, according to embodiments.

In some embodiments, the darkfield modeling may be based on fitting the best darkfield image to the captured fingerprint image. FIG. 21 illustrates an example system 2100 for modeling a darkfield image based on a best fit model, according to embodiments. For example, a best fit model may be used where the best fit is determined between the captured fingerprint image and a combination of darkfield images (verified to be free of contamination). These darkfield images are selected from a database 2110 of darkfield images, which may have been verified to be free of contamination, or may have been generated in a (controlled) calibration process. For example, the database 2110 may comprise darkfield images captured at regular temperature intervals, and a plurality of contamination-free darkfield images captured at different temperature may serve as a basis for the fit. The captured fingerprint image 2120 may be processed before calculating the best fit, For example, the best darkfield information may be present in the valleys of the fingerprint, and as such the process may only take into account these areas to determine the best fit. Therefore, in some embodiments, the valley information is extracted from the captured fingerprint images. Selecting the best areas of the fingerprint to be used may be performed through filtering or more complicated image processing techniques. For example, if the ridges have high gray values, and the valleys have low pixel value, low pass filtering may be used to remove the ridges, so that only the information from the valleys is left. A best fit algorithm 2130 may then be applied to the (processed) fingerprint image. The best fit algorithm 2130 may select a single image from the darkfield database 2110, or may select any combination for the darkfield database 2110. The darkfield images for the fit may also be selected based on the operating condition of the sensor. For example, if the sensor is at a certain temperature, darkfield images from the database for a temperature range around the determined temperature may be selected. As shown in FIG. 21, once the best fit darkfield image/model 2140 is determined, the darkfield correction 2150 may be applied by correcting the fingerprint image 2120 with the best fit darkfield image 2140, generating corrected fingerprint image 2160.

Figure 22:
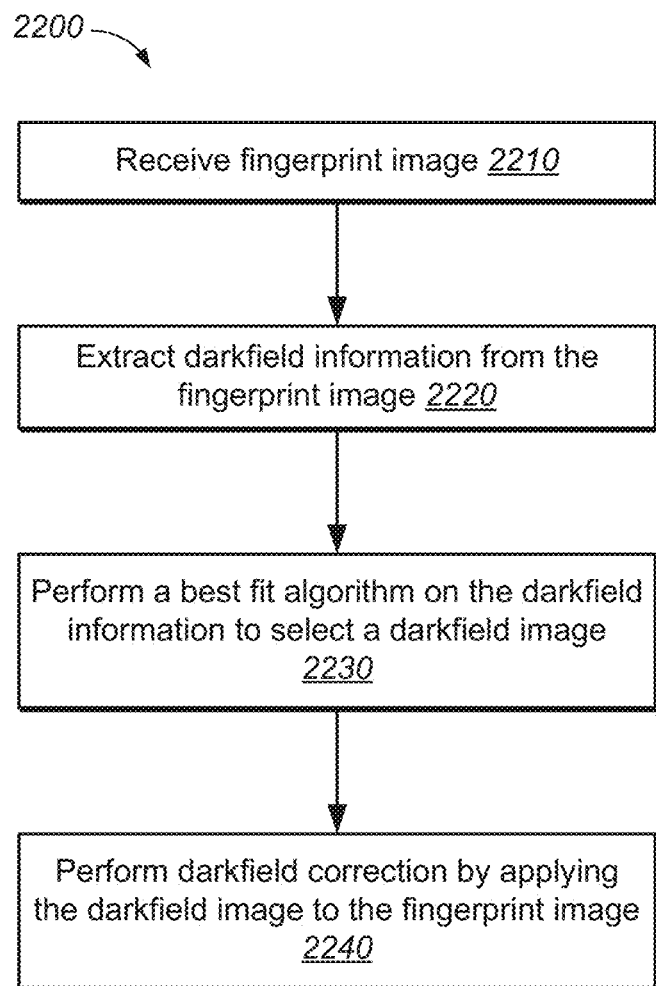
FIG. 22 illustrates a flow diagram of a process for modeling a darkfield image using a best fit algorithm corresponding to the example system of FIG. 21, according to embodiments.

FIG. 22 illustrates a flow diagram 2200 of a process for modeling a darkfield image using a best fit algorithm corresponding to example system 2100 of FIG. 21, according to an embodiment. As in the embodiments discussed above, and as shown at procedure 2210, a fingerprint image is received. At procedure 2220, darkfield information is extracted from the fingerprint image (e.g., the valley information). At procedure 2230, a best fit algorithm is performed on the darkfield information from the fingerprint image to select a darkfield image (e.g., from a database of darkfield images). At procedure 2240, darkfield correction is performed by applying the selected darkfield image to the fingerprint image.

In some embodiments, once a darkfield image has been modeled, the modeled darkfield image can be compared to a previously captured darkfield (e.g., a most recent captured darkfield image). Based on this comparison, a confidence can be determined in the accuracy of the modeled darkfield image. A confidence threshold may be used, and if the determined confidence is below this threshold it may be that the modeled darkfield is not accurate enough for use in correcting a fingerprint image. It should be appreciated that the confidence threshold may vary over time. For example, the confidence threshold may be less restrictive as the time since the darkfield image was captured, such that a darkfield model generated closer to the time of capture of the captured darkfield image should be closer to the captured darkfield image than a darkfield model generated farther from the time of capture of the captured darkfield image.

As presented above, the modeling of the darkfield image presented herein may be used to determine the darkfield image when the user puts his or her finger on the sensor. It should be appreciated that the darkfield image modeling can work in combination with another algorithm or process that measures the darkfield image when there is nothing touching the sensor, e.g., the darkfield tracking as described above in FIGS. 9 through 15. The darkfield image can only be captured when it has been verified that nothing is touching the sensor surface, which can be performed, e.g., by the above-described void detection. The captured darkfield image (or darkfield estimate) may be used when the user puts his or her finger on the sensor and the temperature of the sensor does not change significantly. However, if there is a significant change in temperature, the captured darkfield image (or darkfield estimate) may not be appropriate anymore, and so the system must switch to the darkfield image modeling. It should be appreciated that the switch between darkfield capturing and darkfield modeling may be based on detecting contact with the sensor, a temperature, a temperature change, a time interval, or any other relevant parameter. The temperature data may come from temperature sensor build into the sensor, or may come from a temperature sensor of the host device.

Example Darkfield Contamination Detection and Prevention

As presented above, the darkfield image of a sensor is used to correct captured fingerprint images for variations from the background. In order to effectively use a darkfield image (or darkfield estimate) to correct a fingerprint image, the darkfield image should be free from contamination. For instance, the darkfield image should only remove the undesired background from the image, and not otherwise influence the fingerprint image or other aspects of the authentication, such as the matching. Therefore, it is important that the darkfield image only includes information related to the background, and does not get contaminated with other information, e.g., fingerprint-related or resembling features or any material contamination present on the sensor surface. Any problems with the darkfield image may result in degraded performance, or even in false negatives, meaning that authentication will fail for an authorized user who should be allowed access. Moreover, problems with the darkfield image may result in false positives, meaning that a non-authorized user who should not be allowed access is authenticated, resulting in a security risk.

Embodiments described herein provide systems and methods to detect and prevent possible darkfield contamination. As such, the dynamic updates of the fingerprint templates and the determination of the darkfield image become more robust, more accurate, and has a higher precision and performance.

As described above in FIG. 8, flow diagram 800 of an example method for capturing a darkfield image is shown. Flow diagram 800 results in the capturing of a darkfield image (e.g., a darkfield candidate image) when no object is present on the sensor, e.g., a void is detected. Flow diagram 1200 of FIG. 12 describes an example method for void detection. Once it is determined that that there is no object on the sensor surface, e.g., a void is detected, a darkfield candidate image is captured. In some embodiments, the darkfield candidate image is merged with a previously stored darkfield image, e.g., a darkfield estimate.

In the case of an ultrasonic fingerprint sensor, the darkfield image may include non-uniformities, e.g., due to ultrasound reflections within the sensor stack and not due to any object on the sensor surface. The sensor surface is the part of the device where the user is expected to put his or her finger in order to acquire the fingerprint. A captured fingerprint image is corrected using a darkfield image or darkfield estimate to correct for these non-uniformities, resulting in a corrected fingerprint image.

In order to properly correct for non-uniformities, the darkfield should be free of any contamination. For example, subsequent capturing a darkfield candidate image and prior to merging with the existing darkfield estimate, the darkfield candidate image is evaluated for quality, defects, and/or possible contamination. If a contaminated darkfield candidate image is merged into the darkfield estimate, the darkfield estimate is contaminated, resulting in potential authentication and performance errors of the matcher.

In some embodiments, after the void detector has determined a void, and a darkfield candidate image has been captured, the darkfield candidate image may be merged with a previously determined darkfield image (e.g., darkfield estimate). In some embodiments, only the last acquired darkfield candidate image may be used, without performing any merging. Merging the newly acquired darkfield candidate image with previously recorded darkfield images provides a more gradual evolution of the darkfield estimate. In some embodiments, the merging may be implemented as averaging the darkfield candidate image into the recorded darkfield estimate. This may reduce, or remove, the temporal noise contribution. Many different types of averaging or merging may be used. For example, a recursive average filter may be used where the latest darkfield candidate image contribute with more weight than older darkfield images.

Merging of the darkfield candidate image and the darkfield estimate may also be referred to as performing the darkfield update.

An additional darkfield quality verification step and/or contamination verification step may be applied before merging the recently acquired darkfield candidate image, e.g., before performing the darkfield update. For example, an image analysis may be applied to scan for any image contributions that are not likely to constitute a darkfield image. The image analysis may comprises looking for features resembling a fingerprint, spatial frequencies related to a fingerprint, or any other fingerprint characteristics. If such features are present, the darkfield candidate image may not be used, or used with a lesser weight. A darkfield quality factor may be determined, and the weight of the darkfield candidate image in the merger may depend on the quality factor. The quality factor may also express a confidence in the fact that no object was detected. It may also be determined if the quality of the darkfield estimate will be negatively affected by the merger of the darkfield candidate image, and based on this determination, the weight of the darkfield candidate image may be adapted.

The stored darkfield image (e.g., darkfield estimate) after the merger may be subtracted from the recently acquired fingerprint image, since this represents the latest acquired darkfield image of the sensor. If the darkfield capture procedure is working properly, the corrected fingerprint image should be nearly uniform in situations where no object, such as a finger, is present on the sensor surface. The uniformity of the image may be determined to analyze the quality of the darkfield correction, and any issue or errors may be used as feedback to automatically adapt the darkfield correction process.

In some embodiments, the corrected fingerprint image may then be sent to a matcher for authentication. The matcher is the part of the fingerprint authentication system that compares the corrected fingerprint image to the stored fingerprint images acquired during enrollment of the user for authenticating the user of the sensor. These stored fingerprint images acquired during enrollment may be referred to as the fingerprint templates, or templates. These images are used as reference images for authentication, and may be referred to as authentication references images. In some embodiments, these fingerprint templates may be updated after enrollment, referred to herein as a dynamic update of the fingerprint templates. In order to ensure the accuracy of the authentication, the dynamic update should be performed using corrected fingerprint images, such that fingerprint images that include or are impacted by the use of a contaminated darkfield image are to be avoided.

Figure 23:
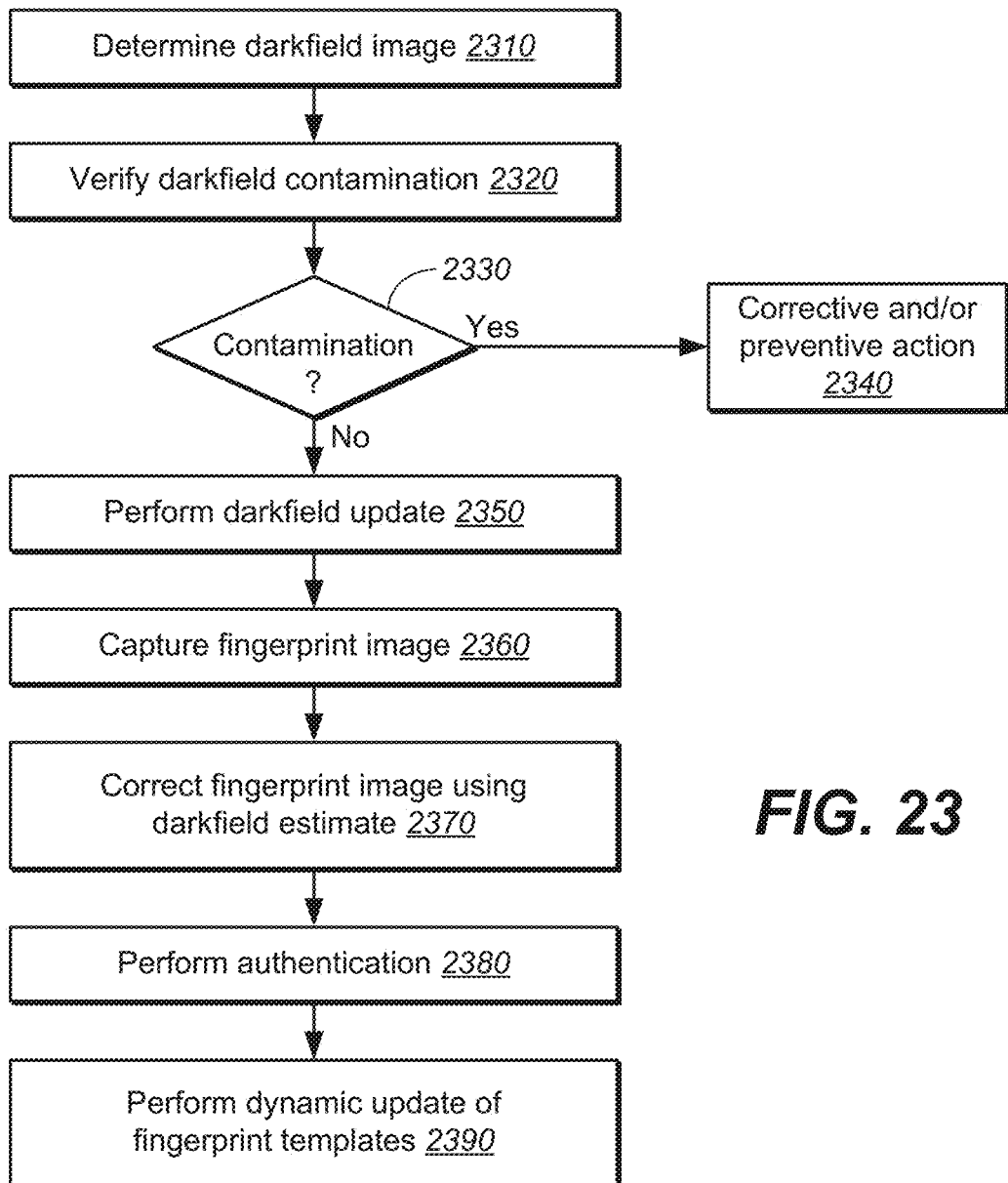
FIG. 23 illustrates a flow diagram of an example method for determining darkfield contamination and performing dynamic updates of the fingerprint templates of a fingerprint authentication system, according to embodiments.

FIG. 23 illustrates a flow diagram 2300 of an example method for determining darkfield contamination and performing dynamic updates of the fingerprint templates of a fingerprint authentication system, according to embodiments. At procedure 2310, a darkfield image is determined or captured. The determined darkfield image may be considered a darkfield candidate image for the darkfield update. In some embodiments, this is performed using a single darkfield image acquired by the sensor, or this may be accomplished through a combination of multiple darkfield images acquired over time. Once a darkfield image has been determined, as shown at procedure 2320, darkfield contamination evaluation process is initiated where a check is performed if the darkfield is contaminated in any way. Embodiments of the darkfield contamination verification are discussed in detail below. At procedure 2330 it is determined whether the darkfield image includes any contamination.

The darkfield contamination verification may be performed using many different methods. In some embodiments, the contamination may be investigated based on image analysis techniques, for example, by searching for image characteristics of the various possible contaminations. In other embodiments, the contamination investigation may be performed by comparing the darkfield candidate images to a database containing possible contaminations, and determine the resemblance between the darkfield candidate and the images of the database. In yet other embodiments, the darkfield contamination may be investigated by monitoring changes in the darkfield candidate. These changes may be monitored as a function of the operating conditions of the sensor. The following description and figures describe some exemplary embodiments in detail. These examples are not intended to represent an exhaustive list of possible methods for investigating the darkfield contamination. It should be appreciated that the darkfield contamination verification, in some embodiments, may also take into consideration a contamination threshold such contamination is determined if an amount of contamination exceeds a contamination threshold. This allows for minor contamination to be disregarded. Moreover, multiple contamination thresholds may be utilized for different applications. For example, a first contamination threshold may be used for determining whether to use a darkfield candidate image for correcting a fingerprint image during authentication (e.g., at procedure 2380) and a second contamination threshold may be used for determining whether to perform a dynamic update of the fingerprint template (e.g., procedure 2390), where the second contamination threshold is lower than (e.g., stricter than) the first contamination threshold.

As shown at procedure 2340, if a contamination is detected, corrective or preventive actions may be undertaken. In some embodiments, corrective action may include removing or reducing the contamination from the darkfield image, e.g., using a filter or other image enhancement techniques. In some embodiments, preventive actions may include determining the conditions under which the current darkfield image was determined and trying to avoid acquired darkfield images under future similar conditions. Such conditions may include any data and/or measurements from the fingerprint sensor, or any other sensor in the device that can help determine the condition or context of the device and/or user. In some embodiments, the corrective action can include adjusting the determination of whether and object is interacting with the fingerprint sensor. In some embodiments, the corrective action is adjusting the capture of the fingerprint image. In some embodiments, the corrective action may be to select another darkfield image, which may be, e.g., a previously captured darkfield image or a modeled darkfield image. In some embodiments, the corrective action may be to adjust the weight of the darkfield image in the update in order to limit the effect of the contamination on the darkfield estimate. The weight may be based on a determination of the quantify, quality, or type of contamination. For example, contamination resembling fingerprint patterns with ridge/valley type structures and/or spatial frequencies may have a more detrimental effect, than other type of contamination, for example, with spatial frequencies lower than typical fingerprints. As such, darkfield candidate images with contamination may still be used in the darkfield update, once it has been determined their incorporation does not negatively affect the sensor performance. In some embodiments, when it is determined that the darkfield image is contaminated, e.g., the contamination quantity is above a threshold, the darkfield candidate image may be replaced by a modeled darkfield image, as described above in accordance with the described darkfield modeling. The modeled darkfield image may then be merged with the darkfield estimate, or used instead of the darkfield estimate. The contamination threshold may depend on the need for a new darkfield images. For example, if a long time has passed since the last darkfield capture was performed, the threshold may be lower.

As shown at procedure 2350, if a contamination is not detected, and it is determined that the darkfield is not contaminated, the darkfield update is performed. In some embodiments, the darkfield update consists of merging the darkfield candidate image with the darkfield estimate, as discussed above. The darkfield estimate is then used in combination with a fingerprint image captured at procedure 2360, to correct the fingerprint image for the darkfield in procedure 2370. The fingerprint image may be captured before the darkfield image or after the darkfield image.

As shown in procedure 2380, the corrected fingerprint image may be used to perform user authentication. The authentication may be performed by comparing the corrected fingerprint image to the stored finger template(s) of users with allowed access. the user authentication is successful, the corrected fingerprint image may be used for the dynamic update of the fingerprint templates.

As shown in procedure 2390, a dynamic update of the fingerprint templates may be performed using the corrected fingerprint image. Dynamic update of fingerprint templates adds a recent fingerprint image to the templates. The dynamic update may take into consideration the quality of the fingerprint image. For example, any results of the darkfield contamination determination may be used to determine the weight of the corrected fingerprint image in the dynamic update, similar to the darkfield update discussed above. Dynamically updating the fingerprint template allows for improved fingerprint recognition, thereby improving reliability and performance. This means that when the darkfield image is not contaminated it will not negatively influence the actual fingerprint image. It should be appreciated that the allowed contamination content for using images in the dynamic update may be lower than the allowed contamination content for validating user access. In other words, the quality and accuracy requirements before any fingerprint images and/or darkfield images, are used in the dynamic update are strict so as to protect against any contamination impacting the fingerprint images and/or darkfield images.

FIG. 23 shows the different steps of the process in an example order, and many different variations with a different order, with additional steps, or with omitted steps are possible. In some embodiments, the capture of the fingerprint image may be performed before the darkfield contamination verification. In this case, the contamination verification is not performed every time a darkfield is captured, but only after the user puts a finger on the sensor and a fingerprint image is acquired. This may reduce the use of system resources. In FIG. 23, the darkfield contamination verification is shown at procedure 2320 that is before the darkfield update of procedure 2350, but, as an alternative, or in addition, the darkfield contamination verification may also be performed after the update to investigate if a contamination is present in the darkfield estimate.

In flow diagram 2300, the darkfield contamination verification of procedure 2320 is shown before the user authentication of procedure 2380. However, the contamination verification may take a certain amount of time, and may therefore add additional latency to the user authentication, which may be undesired, Therefore, in some embodiments, the contamination verification may be performed after, or in parallel, with the user authentication process. Should authenticated access be provided, and afterwards it is determined that a contamination is detected, access may be revoked, especially if the contamination contains fingerprint images (from the user). This means that the system may block the user and require a new authentication procedure. For example, the system may ask the user to take a new fingerprint image. In some embodiments, a new darkfield image may be acquired, and this may comprise asking the user to remove his or her finger in order to acquire the darkfield image.

In some embodiments, the darkfield contamination verification of procedure 2320 is performed once candidate dynamic updates of the fingerprint templates are generated, e.g., after procedure 2390. This means that a candidate dynamic update of the fingerprint templates is generated by combining the newly acquired fingerprint image with the existing fingerprint templates. The candidate dynamic update of the fingerprint templates and/or the applied darkfield, is then checked for possible contamination. If no contamination is detected, the candidate dynamic update can be validated and used as the new updated fingerprint template. If it is determined that contamination is present, no dynamic update may be performed. The contamination verification may also comprises comparing the darkfield image to the candidate dynamic update, and if there is a match is means that the darkfield is contaminated with fingerprint pattern, possible of the authenticated user.

In some embodiments, if the darkfield contamination verification of procedure 2320 reveals a contaminated darkfield, a decision whether or not to allow authentication may be based on the level of contamination (e.g., at procedure 2340). For example, for minor contamination, the authentication may be allowed, but the dynamic update may not be allowed. When a serious contamination is detected, other measures may be taken. For example, it may be decided not to do any darkfield correction, because no correction may yield better results than a correction with an incorrect darkfield. Alternatively, a different darkfield may be selected, e.g., an older darkfield. This different darkfield may be selected from a database of darkfield images acquired under similar conditions as the current operating conditions. In some embodiments, a new darkfield may be determined, through measurement or simulation/modelling. When a new measurement is required, the system may ask the user the remove his or her finger in order to acquire a correct darkfield.

Figure 24:
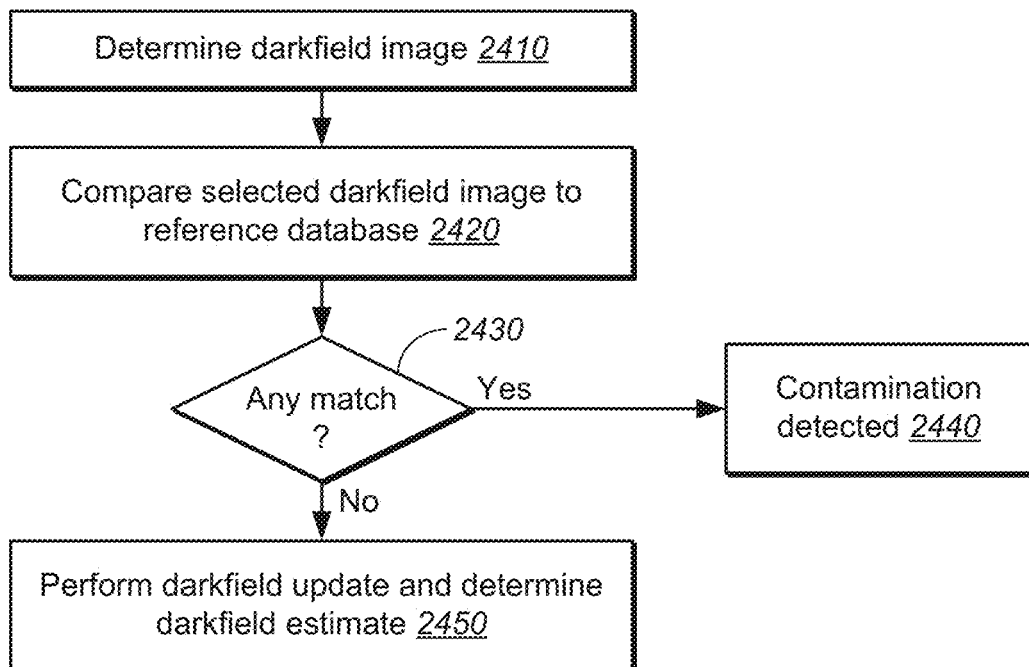
FIG. 24 illustrates a flow diagram of an example method for evaluating a darkfield image for contamination, according to embodiments.

FIG. 24 illustrates a flow diagram 2400 of an example method for evaluating a darkfield image for contamination, according to embodiments. In some embodiments, flow diagram 2400 is performed subsequent capturing a darkfield candidate image and prior to updating a darkfield estimate with the darkfield candidate image, e.g., between procedures 830 and 840 of flow diagram 800 or between procedures 1240 and 1250 of flow diagram 1200, to confirm the darkfield candidate image is free of contamination.

At procedure 2410 of flow diagram 2400, a darkfield image is determined or captured. For example, this selected darkfield image may be the last acquired darkfield image or may be a merged darkfield image. At procedure 2420, the selected darkfield image is compared to a reference database. This reference database may be a database containing any possible contamination artifacts. Different types of contamination may result in typical artifacts in the darkfield. For example, the reference database may include images or partial images of fingerprints or other contamination from other objects and/or artifacts on the sensor surface, such as, and without limitation: dust, dirt, (sticky) liquids such as water, or (sticky) solids with adhesive properties. It should be appreciated that the reference database may include information for identifying any type of contamination artifact that might appear on the contact surface of the sensor. The reference database can include images, models, or descriptions of such artifacts to identify contamination. Some contamination of the darkfield image may occur if the void detector is not working properly. For example, if the void detector indicates a void is detected, but in reality, the user has a finger on the sensor surface, a (partial) fingerprint of the user may be captured in the darkfield candidate image. Embodiments dealing with this problem are described below in more detail. The reference database may be a single reference database with all possible types of contamination, or several reference databases may be used for different types of contamination. In the latter case, a series for comparisons may be performed.

It should be appreciated that additional processing may be required or desired before the darkfield is compared to the reference database at procedure 2420. Any filtering or image processing may be used to prepare the darkfield for the comparison. For example, high-pass or low-pas filtering, contrast enhancement, level correction, inversion, or any similar or other techniques may be used.

At procedure 2430, it is determined if any of the images of the reference database are detected within the selected darkfield image, e.g., is there a match or resemblance between the reference database and the selected darkfield image. It should be appreciated that a match can occur based on a thresholding operation, and that an exact match may not be necessary, but rather a match as defined by thresholding criteria (e.g., substantially similar). If there is any match between the darkfield image and the reference database, as illustrated at procedure 2440, it is determined that the darkfield is contaminated. If there is not a match between the darkfield image and the reference database, as illustrated at procedure 2450, no contamination is detected. In one embodiment, responsive to determining that contamination of the selected darkfield image is not detected, the darkfield image can be used as is or merged with a darkfield estimate. In one embodiment, responsive to determining that contamination of the selected darkfield image is not detected, a dynamic update of the fingerprint template may be performed. Newly detected contaminations, which are not yet in the reference database, may be added to update the database of contaminations.

It should be appreciated that the contamination may be quantified and/or classified, e.g., to indicate the parts of the sensor surface affected, and the seriousness/importance of the contamination. This information may then be used to decide whether or not to perform the darkfield update and/or the information may be used in the darkfield update process. For example, the importance of the contamination may be used as a weight in the darkfield update. If only part of the image of contaminated, only the parts non-contaminated may be used in the darkfield update.

Figure 25:
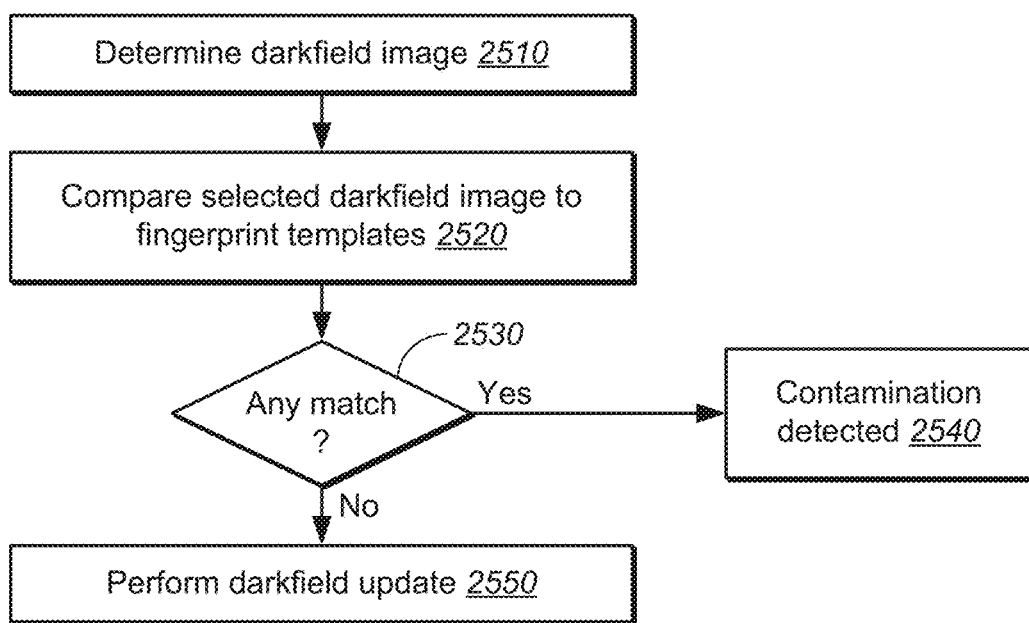
FIG. 25 illustrates a flow diagram of an example method for performing a darkfield contamination verification, according to embodiments.

FIG. 25 illustrates a flow diagram 2500 of an example method for performing a darkfield contamination verification, according to embodiments. In this embodiment, the fingerprint templates are used as a reference database such that the darkfield image is compared to the fingerprint images acquired during enrollment or from a previous dynamic update procedure. As such, flow diagram 2500 detects and prevents any incorrectly determined darkfield images, where a darkfield image was acquired while the finger of the user was on the sensor. Any fingerprint images that incorrectly get included in the darkfield images, e.g., merged, can lead to false positives and related types of security risks.

At procedure 2510, a darkfield image is determined or captured. In some embodiments, this is performed using a single darkfield image acquired by the sensor, or this may be accomplished through a combination of multiple darkfield images acquired over time. Once a darkfield image has been determined, as shown at procedure 2520, the darkfield image is compared to the fingerprint images acquired during enrollment or from a previous dynamic update procedure. As an alternative to comparing the darkfield image to the fingerprint templates, in other embodiments, any other image analysis may be used to test for the presence of fingerprint like features, e.g., frequency or spatial analysis to detect the typical ridge/valley pattern of a fingerprint.

At procedure 2530 it is determined whether the darkfield image matches the fingerprint template, e.g., of an authorized user. In one embodiment, the darkfield image may be run through the matcher to verify if the darkfield image matches the fingerprint template of any authorized user. At procedure 2540, if the darkfield image matches or is substantially similar to the fingerprint template, contamination is detected. In one embodiment, when contamination is detected, the darkfield image can be discarded and not used for updating the darkfield estimate. At procedure 2550, if the darkfield image does not match the fingerprint template, contamination with authorized fingerprints is not detected, and the darkfield estimate can be updated using the darkfield candidate image. In one embodiment, the darkfield image is merged with the darkfield estimate. As described above, when it is determined that the darkfield image is contaminated, e.g., the contamination quantity is above a threshold, the darkfield candidate image may be replaced by a modeled darkfield image. The modeled darkfield image may then be merged with the darkfield estimate, or used instead of the darkfield estimate.

In some embodiments, contamination in a darkfield candidate image is evaluated by comparing the darkfield candidate image to a best fit model of previously acquired darkfield images. For example, in one embodiment the darkfield candidate image is compared to a best fit model based on eight previously acquired darkfield images. It should be appreciated that the previously acquired darkfield images are assumed as not including contamination. The best fit model is then compared to the darkfield estimate, and the residue is a measure of how good the fit is. Any contamination will increase the residue.

Upon a determination that the darkfield candidate image does not include contamination, the darkfield candidate image can be add to the registered darkfield images for use of the correction of the fingerprint image.

In some embodiments, the darkfield contamination is determined by comparing the captured darkfield image with a predicted or modeled darkfield images. By analyzing a difference between the captured darkfield image and the modeled darkfield image the contamination is determined. If the difference is small, and both images are similar, no contamination is detected. If the difference is large, contamination is detected. In some embodiments, the modeling can be performed according to the embodiments described above. For example, the operating condition of the sensor is determined, for example the temperature, and the darkfield is modeled based on the operating condition.

Figure 26:
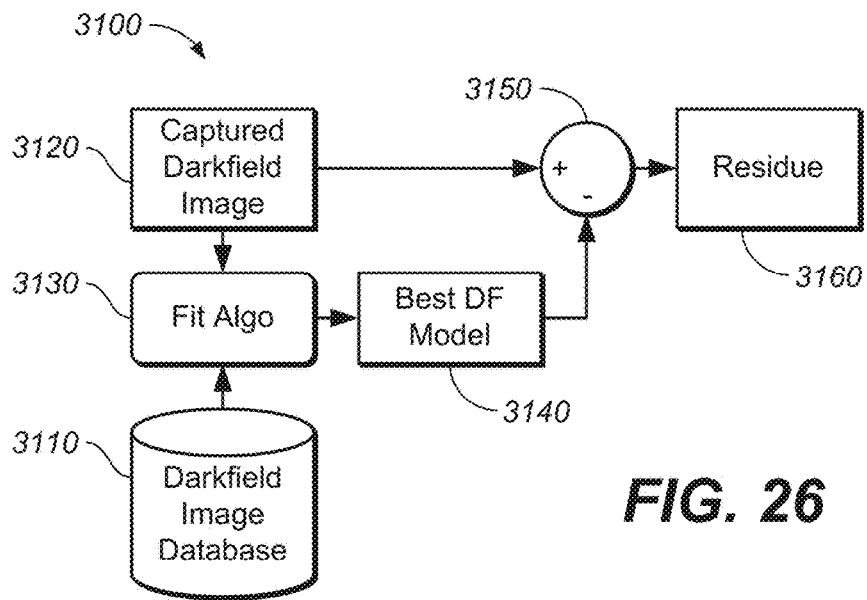
FIG. 26 illustrates an example system for evaluating a darkfield image for contamination based on a best fit model, according to embodiments.

In another embodiment, a best fit model is used where the best fit is determined between the captured darkfield image and a combination of darkfield images (verified to be free of contamination), which may have been captured or modeled previously. FIG. 26 illustrates an example system 2600 for evaluating a darkfield image for contamination based on a best fit model, according to embodiments. For example, a best fit model may be used where the best fit is determined between the captured darkfield image and a combination of darkfield images (verified to be free of contamination). These darkfield images are selected from a database 2610 of darkfield images, which may have been verified to be free of contamination, or may have been generated in a (controlled) calibration process. For example, the database 2610 may comprise darkfield images captured at regular temperature intervals, and a plurality of contamination-free darkfield images captured at different temperature may serve as a basis for the fit. The captured darkfield image 2620 may be processed before calculating the best fit. For example, in case the contamination is a (partial) fingerprint, the best darkfield information may be present in the valleys of the fingerprint, and as such the process may only take into account these areas to determine the best fit. Selecting the best areas of the fingerprint to be used may be performed through filtering or more complicated image processing techniques.

A best fit algorithm may be applied to the captured darkfield image in procedure 2630. The best fit algorithm 2630 may select a single image from the darkfield database 2610, or may select any combination for the darkfield database 2610, The difference between the best fit 2640 and the captured darkfield image 2620 may be determined in 2650. This difference, or residue 2660, may be quantified to determine the extent of any possible contamination, and may be compared to a residue threshold to determine if a contamination is present. In some embodiments, if the residue exceeds the residue threshold, the darkfield candidate image is modeled. The difference or difference image may be analyzed to analyze the (type of) contamination. Similar to the embodiment discussed above, the difference image may be compared to a reference database. For example, the difference image may be compared to a fingerprint database to determine if the darkfield image is contaminated with a fingerprint (from an authorized use). If it is determined that a contamination is present, the modeled darkfield or best-fit darkfield may be used for the darkfield correction instead of the captured darkfield.

In some embodiments, the darkfield contamination check is performed by monitoring the changes and evolution of the darkfield image over time. Since the darkfield image should only change gradually over time, any fast or abrupt change can be an indication of contamination. Furthermore, the changes and evolution of the darkfield image may also be monitored as a function of the operating conditions of the sensor. Again, when the operating conditions change gradually, it is expected that there is no abrupt change in the darkfield image. Therefore, darkfield contamination can be checked by comparing changes in the darkfield image to changes in the operating condition, and/or by determining the speed of darkfield changes. For the latter, a darkfield image difference may be determined with one or more previous captured darkfield images. The darkfield image difference may be normalized for the time since the previous capture. If the darkfield difference is above a threshold, contamination may be present. The darkfield image difference may be expressed, for example, as the variance of the difference image, or as a difference of the variance of the different images. Any other quantification of the image difference may be used.

Figure 27:
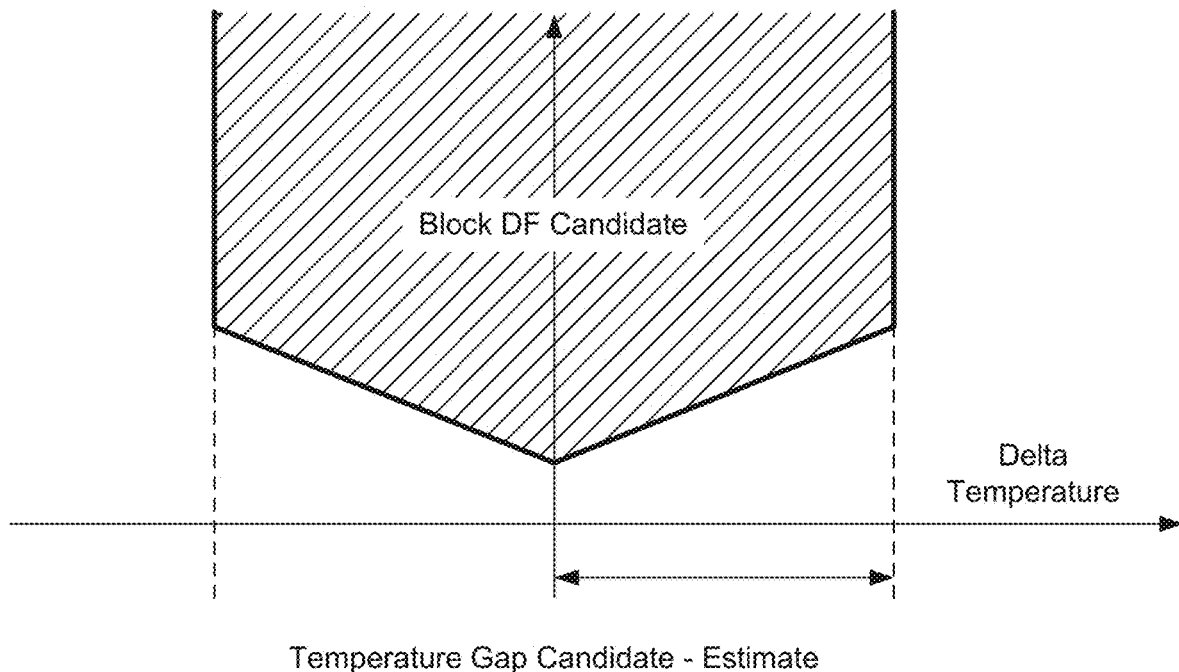
FIG. 27 shows an example of an example defined temperature range for an allowed variance in darkfield changes, according to embodiments.

In some embodiments, the operating condition comprises the temperature of the sensor, and the darkfield changes are monitored as a function of the temperature or as a function of the temperature change. For example, the change in darkfield image with respect to a previous darkfield image may be determined as a function of the temperature change since the previous darkfield image. If the change in darkfield image is within a certain range, it may be determined that the darkfield is contaminated. FIG. 27 shows an example of an example defined temperature range for an allowed variance in darkfield changes, where the difference between the darkfield image candidate (e.g., current darkfield image) and the darkfield image estimate (e.g., a previous darkfield image), is shown as a function of the temperature difference between the candidate and the estimate. The difference is expressed, in the example, as the difference between the variance of the candidate and the variance of the estimate. FIG. 27 shows that for small temperature changes the boundary is set at a small variance difference, while the boundary increases as the temperature difference increases. If the variance difference is above the boundary, it is determined that there is a high likelihood that a contamination is present. FIG. 27 also shows that above a certain temperature change no decision about the contamination can be made because the amount of change in darkfield due to change in the operating conditions may be comparable to the amount of change due to contamination.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A method for evaluating a darkfield image for contamination, the method comprising:
    determining whether an object is interacting with an ultrasonic fingerprint sensor;
    provided an object is not interacting with the ultrasonic fingerprint sensor, capturing a darkfield candidate image at the ultrasonic fingerprint sensor, wherein the darkfield candidate image is an image absent an object interacting with the ultrasonic fingerprint sensor;
    evaluating the darkfield candidate image for contamination; and
    based on the evaluating, determining whether the darkfield candidate image comprises contamination.

2. The method of claim 1, wherein the evaluating the darkfield candidate image for contamination comprises:
    comparing the darkfield candidate image to a reference database of contamination artifacts; and
    based on the comparing, determining whether the darkfield candidate image comprises contamination by a contamination artifact.

3. The method of claim 1, wherein the evaluating the darkfield candidate image for contamination comprises:
    comparing the darkfield candidate image to a reference database of fingerprint images; and
    based on the comparing, determining whether the darkfield candidate image comprises contamination by a fingerprint.

4. The method of claim 3, wherein the reference database comprises fingerprint images of authorized users.

5. The method of claim 1, wherein the evaluating the darkfield candidate image for contamination comprises:
    comparing a best fit model of previously acquired darkfield image to a darkfield estimate based at least in part on the darkfield candidate image;
    based on the comparing, determining a residue between the best fit model and the darkfield estimate, wherein the residue is a measure of accuracy of the best fit model; and
    based on the residue, determining whether the darkfield candidate image comprises contamination.

6. The method of claim 5, further comprising:
    determining one of a level of contamination and a type of contamination based on the residue.

7. The method of claim 1, wherein the determining whether the darkfield candidate image comprises contamination comprises:
    determining whether the contamination is above a contamination threshold; and
    provided the contamination is above a contamination threshold, determining that the darkfield candidate image comprises contamination.

8. The method of claim 1, further comprising:
    provided the darkfield candidate image comprises contamination, discarding the darkfield candidate image.

9. The method of claim 1, further comprising:
    provided the darkfield candidate image comprises contamination, modeling a darkfield candidate image.

10. The method of claim 1, further comprising:
    provided the darkfield candidate image does not comprise contamination, updating a darkfield estimate with the darkfield candidate image.

11. The method of claim 10, wherein the updating a darkfield estimate with the darkfield candidate image comprises:
    merging the darkfield candidate image into the darkfield estimate.

12. The method of claim 11, wherein the merging is based on one of a level of contamination and a type of contamination.

13. The method of claim 1, further comprising:
    acquiring a fingerprint image at the ultrasonic fingerprint sensor; and
    provided the darkfield candidate image does not comprise contamination, correcting the fingerprint image using the darkfield candidate image.

14. The method of claim 13, further comprising:
    provided the contamination is below a first contamination threshold, performing authentication using the fingerprint image corrected using the darkfield candidate image and a fingerprint template.

15. The method of claim 14, further comprising:
    provided the contamination is below a second contamination threshold, performing a dynamic update of the fingerprint template using the fingerprint image corrected using the darkfield candidate image, wherein the second contamination threshold is lower than the first contamination threshold.

16. The method of claim 1, wherein evaluating the darkfield candidate image for contamination comprises:
    comparing a change in the darkfield candidate image with a change in operating conditions of the ultrasonic fingerprint sensor.

17. The method of claim 16, wherein the comparing a change in the darkfield candidate image with a change in the operating conditions of the ultrasonic fingerprint sensor comprises:
    determining a difference between the darkfield candidate image and a previous darkfield image;
    calculating a difference in sensor temperature for the darkfield candidate image and the previous darkfield image;
    obtaining a difference threshold based on the difference in sensor temperature; and
    evaluating whether the darkfield candidate image comprises contamination by comparing the difference with the difference threshold.

18. An electronic device comprising:
    an ultrasonic fingerprint sensor;
    a memory; and
    a processor configured to:
        determine whether an object is interacting with the ultrasonic fingerprint sensor;

capture a darkfield candidate image at the ultrasonic fingerprint sensor provided an object is not interacting with the ultrasonic fingerprint sensor, wherein the darkfield candidate image is an image absent an object interacting with the ultrasonic fingerprint sensor;

evaluate the darkfield candidate image for contamination; and determine whether the darkfield candidate image comprises contamination based on evaluating the darkfield candidate image for contamination.

19. The electronic device of claim 18, wherein the processor is further configured to:

compare the darkfield candidate image to a reference database of contamination artifacts and fingerprint images; and determine whether the darkfield candidate image comprises contamination based on comparing the darkfield candidate image to the reference database.

20. The electronic device of claim 18, wherein the processor is further configured to:

compare a best fit model of a previously acquired darkfield image to a darkfield estimate based at least in part on the darkfield candidate image;

determine a residue between the best fit model and the darkfield estimate based on comparing the best fit model to the darkfield estimate, wherein the residue is a measure of accuracy of the best fit model; and determine whether the darkfield candidate image comprises contamination based on the residue.

21. The electronic device of claim 18, wherein the processor is further configured to:

compare a change in the darkfield candidate image with a change in operating conditions of the ultrasonic fingerprint sensor.

22. A non-transitory computer readable storage medium having computer readable program code stored thereon for causing a computer system to perform a method for evaluating a darkfield image for contamination, the method comprising:

determining whether an object is interacting with an ultrasonic fingerprint sensor;

provided an object is not interacting with the ultrasonic fingerprint sensor, capturing a darkfield candidate image at a ultrasonic fingerprint sensor, wherein the darkfield candidate image is an image absent an object interacting with the ultrasonic fingerprint sensor;

evaluating the darkfield candidate image for contamination; and based on the evaluating, determining whether the darkfield candidate image comprises contamination, wherein the determining whether the darkfield candidate image comprises contamination comprises:

determining whether the contamination is above a contamination threshold; and provided the contamination is above a contamination threshold, determining that the darkfield candidate image comprises contamination.

* * * * *